US012794557B2

(12) United States Patent
Buckley et al.

(10) Patent No.: US 12,794,557 B2
(45) Date of Patent: Nov. 10, 2026

(54) OPTICAL ENCODER DEVICES AND SYSTEMS

(71) Applicant: Lawrence Livermore National Security, LLC, Livermore, CA (US)

(72) Inventors: Brandon Walter Buckley, Walnut Creek, CA (US); David Simon Perlmutter, Oakland, CA (US); Peter Thomas Setsuda DeVore, Livermore, CA (US); Apurva Shantharaj Gowda, Mountain View, CA (US); Jason Thomas Chou, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 173 days.

(21) Appl. No.: 18/438,779

(22) Filed: Feb. 12, 2024

(65) Prior Publication Data

US 2024/0187096 A1 Jun. 6, 2024

Related U.S. Application Data

(60) Continuation of application No. 18/159,054, filed on Jan. 24, 2023, now Pat. No. 11,996,889, which is a (Continued)

(51) Int. Cl.
*H04B 10/2557* (2013.01)
*G02F 1/21* (2006.01)
(Continued)

(52) U.S. Cl.
CPC ........... *H04B 10/2557* (2013.01); *G02F 1/21* (2013.01); *G02F 1/365* (2013.01); *G02F 2/004* (2013.01); *G02F 1/212* (2021.01); *G02F 2/006* (2021.01)

(58) Field of Classification Search
None
See application file for complete search history.

(56) References Cited

U.S. PATENT DOCUMENTS

| | | | |
|---|---|---|---|
| 4,709,978 | A | 12/1987 | Jackel |
| 5,148,503 | A | 9/1992 | Skeie |

(Continued)

FOREIGN PATENT DOCUMENTS

| | | | |
|---|---|---|---|
| CN | 108768528 | A | 11/2018 |
| EP | 4000230 | A1 | 5/2022 |

(Continued)

OTHER PUBLICATIONS

Abo, M., A., et al., "A 1.5-V, 10-bit, 14.3-MS/s CMOS Pipeline Analog-to-Digital Converter," IEEE Journal of Solid-State Circuits, vol. 34, No. 5, May 1999.

(Continued)

*Primary Examiner* — Darren E Wolf
(74) *Attorney, Agent, or Firm* — Workman Nydegger

(57) ABSTRACT

Devices, systems and methods for encoding information using optical components are described. An example photonic filtered sampler includes a spectral shaper configured to receive an optical pulse train, a dispersive element positioned to receive an output of the spectral shaper and to expand spectral contents thereof in time, and a modulator configured to receive an output of the dispersive element and a radio frequency (RF) signal, and to produce a modulated output optical signal in accordance with the RF signal. In this configuration, one or more characteristics of the modulated output optical signal is determined based on a spectral shape provided by the spectral shaper and dispersive properties of the dispersive element.

6 Claims, 60 Drawing Sheets

Related U.S. Application Data division of application No. 17/500,777, filed on Oct. 13, 2021, now Pat. No. 11,575,438, which is a division of application No. 16/846,143, filed on Apr. 10, 2020, now Pat. No. 11,184,087.

(60) Provisional application No. 62/884,649, filed on Aug. 8, 2019.

(51) Int. Cl.
*G02F 1/365* (2006.01)
*G02F 2/00* (2006.01)

(56) References Cited

U.S. PATENT DOCUMENTS 5,249,243 A 9/1993 Skeie
5,339,185 A * 8/1994 Kaede .................. H04L 7/0075 398/154
5,408,544 A 4/1995 Seino
5,627,637 A 5/1997 Kapteyn
6,259,552 B1 7/2001 Boffi et al.
6,339,489 B1 1/2002 Bruyere et al.
6,462,844 B1 10/2002 Kai et al.
6,661,975 B1 * 12/2003 Hall .................... H04B 10/118 398/189
6,671,298 B1 12/2003 Delfyett et al.
6,724,783 B2 4/2004 Jalali et al.
6,738,181 B1 5/2004 Nakamoto et al.
6,744,553 B1 6/2004 Islam et al.
7,133,135 B2 11/2006 Dorrer
7,209,664 B1 4/2007 McNicol
7,259,901 B2 8/2007 Parsons et al.
7,352,504 B2 4/2008 Hirooka et al.
7,391,969 B2 6/2008 Shpantzer et al.
7,522,842 B1 4/2009 McNicol
7,587,144 B2 9/2009 Ilchenko et al.
7,643,212 B1 1/2010 Sokoloff et al.
7,787,779 B2 8/2010 Weiner et al.
7,868,799 B1 1/2011 Price et al.
7,877,020 B1 1/2011 Hayes et al.
7,940,380 B1 5/2011 Benner
8,164,819 B2 4/2012 Tu et al.
8,442,402 B1 5/2013 Zanoni et al.
8,446,305 B1 5/2013 Zanoni et al.
8,456,336 B1 6/2013 Zanoni et al.
8,478,132 B1 7/2013 Jepsen et al.
8,503,887 B2 8/2013 Kikuchi
8,548,331 B1 10/2013 Zanoni et al.
8,779,955 B1 7/2014 Zanoni et al.
8,909,061 B1 12/2014 Varadarajan
8,934,058 B2 1/2015 Chou et al.
8,965,211 B1 2/2015 Zanoni et al.
9,077,455 B2 7/2015 Randel
9,118,423 B1 8/2015 Zanoni et al.
9,197,471 B1 11/2015 Zanoni et al.
9,356,704 B1 5/2016 Zanoni et al.
9,645,291 B1 5/2017 Sommer et al.
9,843,398 B1 12/2017 Zanoni et al.
9,857,660 B1 * 1/2018 DeVore ................. G02F 1/3511
9,888,303 B1 2/2018 Jepsen et al.
10,063,320 B2 8/2018 Clark et al.
10,069,619 B1 9/2018 Zanoni et al.
10,075,154 B1 9/2018 Hsieh
10,139,704 B1 11/2018 Shamee et al.
11,184,087 B2 11/2021 Buckley et al.
2001/0046077 A1 11/2001 Akiyama et al.
2002/0067747 A1 6/2002 Jalali et al.
2002/0167721 A1 11/2002 Caplan
2002/0176152 A1 11/2002 Parolari et al.
2003/0016439 A1 1/2003 Courtois
2003/0058499 A1 3/2003 Reingand et al.
2003/0175037 A1 9/2003 Kimmitt et al.
2004/0004780 A1 1/2004 Watanabe
2004/0085620 A1 5/2004 Kawanishi et al.
2006/0127004 A1 6/2006 Waters
2007/0070493 A1 3/2007 Kim et al.
2007/0110442 A1 * 5/2007 Peer ...................... H04J 14/005 398/78
2007/0133918 A1 6/2007 Cho et al.
2007/0140705 A1 6/2007 Shpantzer et al.
2007/0273958 A1 11/2007 Hirooka et al.
2008/0030846 A1 2/2008 Starodoumov et al.
2008/0212166 A1 * 9/2008 Lett ...................... G02F 1/3536 359/326
2008/0285977 A1 11/2008 Caplan
2009/0142070 A1 6/2009 Boduch et al.
2010/0209121 A1 8/2010 Tanimura
2011/0064411 A1 3/2011 Eiselt
2011/0097085 A1 4/2011 Oda et al.
2011/0129230 A1 6/2011 Zanoni et al.
2011/0141478 A1 6/2011 Sasaki et al.
2011/0150478 A1 6/2011 Winzer
2012/0069854 A1 3/2012 Suzuki
2012/0082414 A1 * 4/2012 Sakamaki .............. H04B 10/65 385/31
2012/0134667 A1 5/2012 Westlund et al.
2012/0148264 A1 6/2012 Liu et al.
2012/0212360 A1 8/2012 Kanter et al.
2012/0213532 A1 8/2012 Hironishi et al.
2012/0251031 A1 10/2012 Suarez et al.
2012/0263456 A1 * 10/2012 Tanaka ............... H04B 10/5055 398/25
2012/0274937 A1 11/2012 Hays et al.
2012/0288286 A1 11/2012 Houtsma et al.
2013/0062508 A1 3/2013 Kanter et al.
2013/0209089 A1 8/2013 Harley et al.
2013/0315597 A1 11/2013 Shaver et al.
2014/0146234 A1 5/2014 Chou et al.
2014/0233963 A1 8/2014 Le Taillandier De Gabory
2015/0016827 A1 1/2015 Wilkinson et al.
2015/0110494 A1 4/2015 Ghelfi et al.
2015/0207567 A1 7/2015 Bogoni et al.
2015/0341121 A1 11/2015 Yue et al.
2016/0248515 A1 8/2016 Zheng et al.
2017/0250776 A1 8/2017 Morsy-osman et al.
2018/0006730 A1 1/2018 Kuo et al.
2018/0034550 A1 2/2018 Rakich et al.
2018/0209851 A1 7/2018 Bartels et al.
2018/0294946 A1 10/2018 Sinclair et al.
2019/0041267 A1 2/2019 Burghoff et al.
2019/0072833 A1 3/2019 Nejadriahi et al.
2019/0097734 A1 3/2019 Inagaki et al.
2019/0187198 A1 6/2019 Anderson et al.
2019/0199443 A1 6/2019 Zamani et al.
2020/0150346 A1 5/2020 Cavaliere et al.
2020/0295838 A1 9/2020 Gordon et al.
2021/0021349 A1 1/2021 Devore et al.
2021/0021914 A1 1/2021 Perlmutter et al.
2021/0044253 A1 2/2021 Chao et al.
2022/0085887 A1 3/2022 Buckley et al.
2022/0100047 A1 3/2022 Gowda et al.
2022/0231760 A1 7/2022 Devore et al.
2022/0337317 A1 10/2022 Devore et al.
2023/0163850 A1 5/2023 Buckley et al.

FOREIGN PATENT DOCUMENTS

JP 2001053684 A 2/2001
JP 2007256323 A 10/2007
JP 2008141689 A 6/2008
JP 2012068673 A 4/2012
WO 9613104 A1 5/1996
WO 2007112449 A2 10/2007
WO 2010059257 A1 5/2010
WO 2017030532 A1 2/2017
WO 2018059338 A1 4/2018
WO 2019053296 A1 3/2019

OTHER PUBLICATIONS

Amir Rashidinejad et al: "Recent Advances in Programmable Photonic-Assisted Ultrabroadband Radio-Frequency Arbitrary Wave-

(56) References Cited

OTHER PUBLICATIONS form Generation," arxiv.org, Cornell University Library, 201 Olin Library Cornell University Ithaca, NY 14853, Oct. 13, 2015.
Bao, X., et al., "Recent Progress in Distributed Fiber Optic Sensors," Sensors 2012, 12, 8601-8639.
Batagelj, B., et al., "Key Properties and Design Issues for an Opto-Electronic Oscillator," ICTON 2015.
Burns, K., W., et al., "Second Harmonic Generation in Field Poled, Quasi-Phase-Matched, Bulk LiNbO3," IEEE Photonics Technology Letters, vol. 6. No. 2, Feb. 1994.
Chen, Y., K., et al., "Integrated Photonic Digital-to-Analog Converter for Arbitrary Waveform Generation," Bell Laboratories, Alcatel-Lucent, 600 Mountain Avenue, New Jersey, U.S.A.
Chen, Ying, et al., "Sub-Nyquist Sampled Analog-to-Digital Conversion Based on Photonic Time Stretch and Compressive Sensing with Optical Random Mixing," Journal of Lightwave Technology vol. 31, No. 21, p. 3395-3401, 2013.
Davari, B., et al., "CMOS Scaling for High Performance and Low Power—The Next Ten Years," Proceedings of the IEEE, vol. 83, No. 4, Apr. 1995.
De La Rosa, E., et al., "All-fiber absolute temperature sensor using an unbalanced high-birefringence Sagnac loop," Optics Letters, vol. 22, No. 7, Apr. 1, 1997.
Devore, S., T., P., et al., "Enhancing electrooptic modulators using modulation instability," Phys. Status Solidi RRL 7, No. 8 (2013).
Devore, S., T., P., et al., "Light-weight flexible magnetic shields for large-aperture photomultiplier tubes," Nuclear Instruments and Methods in Physics Research A 737(2014) 222-228.
Devore, S., T., P., et al., "Near-field and complex-field time-stretch transform," Proc. of SPIE vol. 9141.
Devore, S., T., P., et al., "Rogue events and noise shaping in nonlinear silicon photonics," Journal of Optics 15, 2013.
Devore, S., T., P., et al., "Stimulated supercontinuum generation extends broadening limits in silicon," Appl. Phys. Lett. 100, 101111 (2012).
Devore, S., T., P., et al., Coherent Time-Stretch Transform for Near-Field Spectroscopy, IEEE Photonics Journal, vol. 6, No. 2, Apr. 2014.
Dumin, J., D., et al., "Oxide Wearout, Breakdown, and Reliability," International Journal of High Speed Electronics and Systems, vol. 11, No. 3 (2001) 617-718.
Eickhoff, W., "Temperature sensing by mode-mode interference in birefringent optical fibers," Optics Letters, vol. 6, No. 4, Apr. 1981.
Eliyahu, D., et al., "Tunable, Ultra-Low Phase Noise YIG Based Opto-Electronic Oscillator," IEEE MTT-S Digest, 2003.
Extended European Search Report mailed Aug. 21, 2023 for European Patent Application No. 20852592.3 (16 pages).
Extended European Search Report mailed Jul. 10, 2023 for European Patent Application No. 20840963.1.
Extended European Search Report mailed Jul. 11, 2023 for European Patent Application No. 20840844.3.
Extended European Search Report mailed Jul. 18, 2023 for European Patent Application No. 20844606.2.
Extended European Search Report mailed Oct. 5, 2023 for European Patent Application No. 20840956.5 (23 pages).
Fard, M., A., et al., "Impact of Optical Nonlinearity on Performance of Photonic Time-Stretch Analog-to-Digital Converter," Journal of Lightwave Technology, vol. 29, No. 13, Jul. 1, 2011.
Fortier, M., T., "Generation of ultrastable microwaves via optical frequency division," Nature Photonics, vol. 5, Jul. 2011.
Fortier, M., T., et al., "Optically referenced broadband electronic synthesizer with 15 digits of resolution," Laser Photonics Rev. 10, No. 5, 780-790 (2016).
Garcia, Juan C., "Driving the Analog Input of the HI5812 Family of 12-Bit Analog to Digital Converters." Dec. 2001; Intersil Technical brief; pp. 1-2. (Year: 2001).
Gee, M., C., et al., "Spurious-Free Dynamic Range of a High-Resolution Photonic Time-Stretch Analog-To-Digital Converter System," Microwave and Optical Technology Letters, vol. 54, No. 11, Nov. 2012.
Gee, M., C., et al., Spurious-Free Dynamic Range of a High-Speed Photonic Time-Stretch A/D-Converter System, Advanced Photonics Congress © 2012.
Golani, Ori, et al., "A photonic analog-to-digital converter using phase modulation and self-coherent detection with spatial oversampling," Optics Express vol. 22, No. 10, 2014.
Gregers-Hansen, V., et al., "A Stacked A-to-D Converter for Increased Radar Signal Processor Dynamic Range," Radar Division, Naval Research Laboratory Washington, DC 20375.
Han, Yan, et al., "Photonic Time-Stretched Analog-to-Digital Converter: Fundamental Concepts and Practical Considerations," Journal of Lightwave Technology, vol. 21, No. 12, 2003, pp. 3085-3103.
Ikeda, K., et al., "Optical quantizing and coding for ultrafast A/D conversion using nonlinear fiber-optic switches based on Sagnac interferometer," May 30, 2005, vol. 13, No. 11, Optics Express 4297.
International Searching Authority, International Search Report and Written Opinion, PCT Patent Application PCT/US/2020/042664, mailed Oct. 4, 2020, 8 pages.
International Searching Authority, International Search Report and Written Opinion, PCT Patent Application PCT/US2020/042422, mailed Nov. 17, 2020, 8 pages.
International Searching Authority, International Search Report and Written Opinion, PCT Patent Application PCT/US2020/042425, mailed Nov. 4, 2020, 7 pages.
International Searching Authority, International Search Report and Written Opinion, PCT Patent Application PCT/US2020/042649, mailed Nov. 18, 2020, 10 pages.
International Searching Authority, International Search Report and Written Opinion, PCT Patent Application PCT/US2020/045336, mailed Mar. 10, 2021, 8 pages.
Jiang, Y., et al., "Analog optical computing primitives in silicon photonics," Optics Letters, vol. 41, No. 6, Mar. 2016.
Jung, K., et al., "All-fibre photonic signal generator for attosecond timing and ultralow-noise microwave," Scientific Reports, 5:16250, DOI: 10.1038/srep16250.
Juodawlkis, W., P., et al., "Optically Sampled Analog-to-Digital Converters," IEEE Transactions on Microwave Theory and Techniques, vol. 49, No. 10, Oct. 2001.
Kazovsky, L.G et al., "All-fiber 90° optical hybrid for coherent communications", Applied Optics, vol. 26, No. 3, Feb. 1987 (Year: 1987).
Kim, H., et al., "Sub-20-Attosecond Timing Jitter Mode-Locked Fiber Lasers," IEEE Journal of Selected Topics in Quantum Electronics, vol. 20, No. 5, Sep./Oct. 2014.
Kitayama, K, et al., "Ultrafast All-Optical Analog-to-Digital Conversion using Fiber Nonlinearity," ECOC 2009, Sep. 20-24, 2009, Vienna, Austria.
Kobrinski H. et al: "Wavelength-tunable optical filters: applications and technologies", IEEE Communications Magazine, IEEE Service Center, Piscataway, US, vol. 27, No. 10, Oct. 1, 1989 (Oct. 1, 1989), pp. 53-63.
Liang, Yu, et al., "Demonstration of an All-Optical 2-to-4 Level Encoder Based no an Optical Parametric Amplifier," Research Letters in Optics, vol. 2009, 4 pages.
Liao, J., et al., "Novel Photonic Radio-frequency Arbitrary Waveform Generation based on Photonic Digital-to-Analog Conversion with Pulse Carving," Department of Electronic Engineering, Tsinghua University, Beijing, I 00084, China.
Linde, D., et al., "Characterization of the Noise in Continuously Operating Mode-Locked Lasers," Appl. Phys. B 39, 201-217 (1986).
Luennemann, M., et al., "Electrooptic properties of lithium niobate crystals for extremely high external electric fields," Appl. Phys. B 76, 403-406 (2003).
Miyoshi, Y., et al., "Multiperiod PM-NOLM With Dynamic Counter-Propagating Effects Compensation for 5-Bit All-Optical Analog-to-Digital Conversion and Its Performance Evaluations," Journal of Lightwave Technology, vol. 28, No. 4, Feb. 15, 2010.
Miyoshi, Y., et al., "Performance Evaluation of Resolution-Enhanced ADC Using Optical Multiperiod Transfer Functions of NOLMs," IEEE Journal of Selected Topics in Quantum Electronics, vol. 18, No. 2, Mar./Apr. 2012.

(56) References Cited

OTHER PUBLICATIONS

Moazzami, R., et al., "Projecting Gate Oxide Reliability and Optimizing Reliability Screens," IEEE Transactions on Electron Devices. vol. 37. No. 7. Jul. 1990.
Reilly, R., D., et al., "Undersampling a photonic analog-to-digital converter containing an optical hybrid combiner," Optics Communications 288 (2013) 31-37.
Robinson, R., "Polarization modulation and splicing techniques for stressed birefringent fiber," Rochester Institute of Technology RIT Scholar Works, Thesis/Dissertation Collections, Jan. 1995.
Rodwell, W., J., M., et al., "Subpicosecond Laser Timing Stabilization," IEEE Journal of Quantum Electronics, vol. 25, No. 4. Apr. 1989.
Sefler, George A., et al., "Demonstration of speckle-based compressive sensing system for recovering RF signals," Aug. 2018; Optics Express; pp. 1-13. (Year: 2018).
Sherman, A., et al., "Optical under-sampling by using a broadband optical comb with a high average power," Optical Society of America, Jun. 2014, vol. 22.
Stern, Liron, et al., "Controlling the interactions of space-variant polarization beams with rubidium vapor using external magnetic fields," Optics Express, vol. 24, No. 5, 2016.
Su, Feiran et al., "Photonic analog-to-digital conversion with equivalent analog prefiltering by shaping sampling pulses," Jun. 2016; Optics Letters; pp. 1-4. (Year: 2016).
Valley, George C., "Photonic analog-to-digital converters," Optics Express vol. 15, No. 5, 2007, pp. 1955-1982.
Wang, Q. et al., "Optimal design of planar wavelength circuits based on Mach-Zehnder Interferometers and their cascaded forms", Journal of Lightwave Technology, [Online] vol. 23, No. 3, Mar. 1, 2005 (Mar. 1, 2005), pp. 1284-1290.
Wei, J., et al., "All-fiber-photonics-based ultralow-noise agile frequency synthesizer for X-band radars," vol. 6, No. 1 / Jan. 2018 / Photonics Research.
Xiang, P. et al., "Photonic generation of 5,6 BFSK RF signals based on optical pulse shaping," Optoelectronics Letters, Tianjin University of Technology, Heidelberg, vol. 8, No. 5, Sep. 13, 2012 (Sep. 13, 2012), pp. 368-371.
Xiao, J., et al., "High-Frequency Photonic Vector Signal Generation Employing a Single Phase Modulator," IEEE Photonics Journal, vol. 7, No. 2, Apr. 2015.
Xie, X., et al., "Photonic microwave signals with zeptosecond-level absolute timing noise," Nature Photonics, vol. 11, Jan. 2017.
Xie, Xinggang, et al., "Photonic Time-Stretch Analog-to-Digital Converter Employing Phase-Modulation and Envelope Removing," Proc. of SPIE vol. 9043, 2013.
Xu, Hongnan, et al., "Ultra-broadband silicon polarization splitter-rotator based on the multi-mode waveguide," Jul. 2017; Optics Express; pp. 1-7. (Year: 2017).
Yao, S., X., et al., "Converting light into spectrally pure microwave oscillation," Optics Letters, vol. 21, No. 7, Apr. 1996.
Yao, S., X., et al., "Optoelectronic Oscillator for Photonic Systems," IEEE Journal of Quantum Electronics, vol. 32, No. 7, Jul. 1996.
Zhou, D., et al., "Single-shotBOTDA based on an optical chirp chain probe wave for distributed ultrafast measurement," Light: Science & Applications (2018) 7:32, Official journal of the CIOMP 2047-7538.
Zou, W., et al., "One-laser-based generation/detection of Brillouin dynamic grating and its application to distributed discrimination of strain and temperature," Optics Express 2363, vol. 19, No. 3, Jan. 2011.

* cited by examiner

4500

4600

4700

OPTICAL ENCODER DEVICES AND SYSTEMS

CROSS-REFERENCE TO RELATED APPLICATIONS

This patent application is a continuation application of U.S. patent application Ser. No. 18/159,054, filed on Jan. 24, 2023, which is divisional application of U.S. patent application Ser. No. 17/500,777, entitled "OPTICAL ENCODER DEVICES AND SYSTEMS", filed on Oct. 13, 2021, now U.S. Pat. No. 11,575,438, which is a further divisional application of U.S. patent application Ser. No. 16/846,143, filed on Apr. 10, 2020, issued Nov. 23, 2021 as U.S. Pat. No. 11,184,087, which claims priority to and benefits of U.S. Provisional Patent Application No. 62/884,649, entitled "ALL OPTICAL HELIX ENCODER," filed on Aug. 8, 2019. The entire contents of the before-mentioned patent applications is incorporated by reference as part of the disclosure of this patent document.

STATEMENT REGARDING FEDERALLY SPONSORED RESEARCH OR DEVELOPMENT

This invention was made with Government support under Contract No. DE-AC52-07NA27344 awarded by the United States Department of Energy. The Government has certain rights in the invention.

TECHNICAL FIELD

This patent document is directed generally to optical encoding techniques, and more particularly, to methods, systems and devices for encoding information into optical signals and recovery of the same.

BACKGROUND

Electronic signals are notorious for being prone to noise and interference. To mitigate this issue, analog optical links offer a promising technology for applications such as radiofrequency (RF)-over-fiber, antenna remoting, and photonic assisted analog-to-digital converters (ADCs). Optics offers advantages over all-electronic technologies including low jitter, true time delay, and resilience to electromagnetic interference. However, one of the primary limitations of analog optical link technology is high noise figures (NF) stemming from the noise added in the optical regime. One method for reducing this NF is to increase the modulation depth of the modulated RF signal. In doing so, the effective gain of the analog link is increased, resulting in a higher signal-to-noise ratio (SNR). Many electro-optic modulation techniques exist that strive for high modulation efficiency. However, fundamental limitations exist for all such technologies, resulting in tradeoffs in RF bandwidth, optical power handling, and/or insertion loss.

SUMMARY

The disclosed embodiments relate to methods, devices and systems for encoding information using optical techniques.

In some embodiments, intensity information of a first optical signal (e.g., an optical pump) is encoded onto the phase of a second optical signal (e.g., an optical probe) using cross phase modulation (XPM) in a non-linear optical medium. The intensity information of the pump can be of any kind, including intrinsic noise from the optical source, or a signal of interest (e.g. electrical, optical, X-ray, or high energy particle) directly or externally modulated onto the pump. The pump and probe are multiplexed together into the nonlinear optical medium. The index of refraction of the medium is modified via optical Kerr effect by a factor proportional to the pump's intensity. The probe experiences the modified index of refraction as it propagates through the medium and thus accumulates a phase change proportional to the intensity of the pump. Thus, the intensity information of the pump is mapped to the phase of the probe. By using large pump intensity, highly non-linear media, and long non-linear interaction length, the efficiency of intensity-to-phase conversion can be made very large. The disclosed embodiments can be incorporated into larger components and systems to enable various applications in many fields such as scientific diagnostics, radar, remote sensing, wireless communications and quantum computing that utilize or can benefit from encoding and generation of low noise/high resolution signals.

BRIEF DESCRIPTION OF THE DRAWINGS

FIG. 8(*b*) illustrates one implementation of an optical encoder that uses an interferometer in a Mach-Zehnder configuration and produces complementary outputs.

FIG. 14(*b*) illustrates the optical encoder of FIG. 14(*a*) that uses balanced photodetectors in accordance with an example embodiment.

FIG. 15(*b*) illustrates the optical encoder of FIG. 15(*a*) that uses balanced photodetectors in accordance with an example embodiment.

FIG. 24(*b*) illustrates a block diagram and associated plots for a filtered photonic sampler in accordance with another example embodiment.

FIG. 24(*c*) illustrates a block diagram and associated plots for a filtered photonic sampler in accordance with yet another example embodiment.

FIG. 25(*b*) illustrates a block diagram of a filtered photonic encoder in accordance with another example embodiment FIG. 26(*a*) illustrates a set of optical paths for dual function hybrid in accordance with an example embodiment.

FIG. 26(*c*) illustrates a set of backward propagating optical paths in a dual function hybrid in accordance with an example embodiment.

FIG. 27(*b*) illustrates polarization states of optical beams in a dual function hybrid in a backward propagating direction in accordance with an example embodiment.

FIG. 28(*b*) illustrates yet another implementation of an optical dual function hybrid in accordance with another example embodiment.

FIG. 31(*b*) illustrates a set of forward propagating optical paths in a dual function hybrid that utilizes optical circulators in accordance with an example embodiment.

FIG. 31(*c*) illustrates a set of backward propagating optical paths in a dual function hybrid that utilizes optical circulators in accordance with an example embodiment.

FIG. 32(*b*) illustrates an implementation of dual function hybrid in a Sagnac interferometer in accordance with an example embodiment.

FIG. 34(*b*) illustrates an optical amplifier for compensating a non-reciprocal loss or gain of a non-linear medium in accordance with an example embodiment.

FIG. 34(*c*) illustrates Faraday rotators with a polarization dependent loss or gain element for compensating a non-reciprocal loss or gain of a non-linear medium in accordance with an example embodiment.

FIG. 34(*d*) illustrates two circulators and an attenuator for compensating a non-reciprocal loss or gain of a non-linear medium in accordance with an example embodiment.

FIG. 35(*b*) illustrates a configuration for producing a multiplexed filtered sampling optical source in accordance with an example embodiment.

FIG. 35(*c*) illustrates another configuration for producing a multiplexed filtered sampling optical source in accordance with an example embodiment.

FIG. 35(*d*) illustrates yet another configuration for producing a multiplexed filtered sampling optical source in accordance with an example embodiment.

FIG. 35(*c*) illustrates an alternate configuration for a delay line interferometer in accordance with an example embodiment.

FIG. 37(*b*) illustrates a configuration for producing a multiple band filtered sampling optical source in accordance with an example embodiment.

FIG. 37(*c*) illustrates another configuration for producing a multiple band filtered sampling optical source in accordance with an example embodiment.

FIG. 40(*c*) illustrates an example phase offset caused by both jitter and carrier envelope offset.

FIG. 41(*b*) illustrates a different example version of a timing measurement apparatus in accordance with the present technology.

FIG. 42(*b*) illustrates a different example version of a timing measurement apparatus in accordance with the present technology.

FIG. 43(*b*) illustrates a different example version of a timing measurement apparatus in accordance with the present technology.

DETAILED DESCRIPTION OF EXAMPLE EMBODIMENTS

Figure 1:
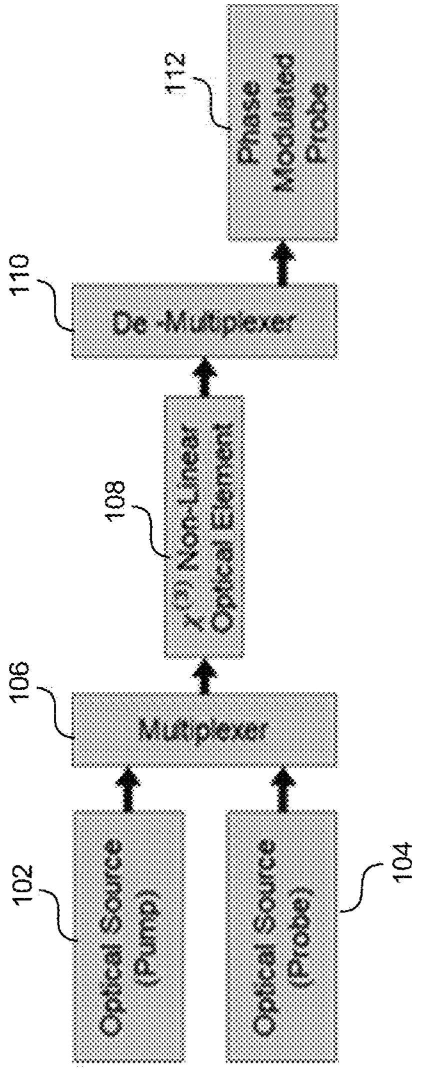
FIG. 1 illustrates an optical encoder that comprises two optical sources and a non-linear optical medium.

In this document, the word "coupled" is used to convey direct or indirect connectivity between two components or elements.

As noted earlier, optical systems and components offer a promising technology for applications such as radiofrequency (RF)-over-fiber, antenna remoting, and photonic assisted analog-to-digital converters (ADCs) with reduce noise characteristics. To this end, in some of the disclosed embodiments intensity information carried by a first optical signal (sometimes referred to as the pump) is encoded onto the phase of a second optical signal (sometimes referred to as a probe) through all-optical cross phase modulation (XPM). The advantage of all-optical modulation is that it avoids photocurrent saturation and bandwidth limitations of optical-to-electrical (O-E) and electrical-to-optical (E-O) conversion. Additionally, with large pump power and long pump-probe interaction length, the intensity-to-phase conversion efficiency can be made very large, effectively amplifying the intensity information of the pump. Further, by converting the intensity information into phase, the magnitude of the converted information is no longer limited to 100% modulation depth, but instead can span multiple 2π radians without clipping. The disclosed optical encoder devices are sometimes referred to as helix encoders because when considered from the complex plane of the probe electric field, the mapping of intensity to phase can be viewed as encoding the pump intensity information into a helix, with the third dimension represented by the total number of 2π radian windings. Therefore, the disclosed technology enables high fidelity characterization of information encoded on the intensity of the pump.

In the disclosed embodiments, modulation efficiency of encoding is improved by modulating an RF signal onto a pump signal with an electro-optic modulator, and then mapping that intensity into the phase of a probe signal via all-optical phase modulation. The phase modulation can be performed in a low loss, highly non-linear optical fiber of up to a kilometer of length or more. The modulation efficiency can therefore be increased by orders of magnitude. Because the phase modulation relies on ultrafast Kerr non-linearity, there is no tradeoff with RF bandwidth. Additionally, optical fiber exhibits very high optical power handling. The disclosed optical encoders can be incorporated as part of larger systems that can benefit from encoding and generation of low noise, high resolution signals.

Other techniques have used all-optical cross phase modulation to map intensity information of a modulated pump signal to a probe. However, these techniques do not treat the phase encoding as an analog modulation. Instead, they use a one-bit detection scheme to determine whether the probe is on or off. Multiple of such phase encoders can be used in tandem to build an all-optical quantizer, with the number of bits equal to the number of encoders. These techniques are therefore fundamentally of a different nature than the disclosed embodiments and do not take advantage of the full benefits of the highly efficient intensity-to-phase mapping.

The disclosed technology relies on two optical signals (e.g., two laser sources producing the pump 102 and the probe 104 optical signals) and a Kerr non-linear optical medium 108, as illustrated in FIG. 1. It should be noted that in the description, the terms probe/pump and probe/pump signal are sometimes used interchangeably to facilitate the description. It is understood, however, that a pump optical signal is produced using an optical source, such as a pump laser. Similarly, a probe optical signal is produced using an optical source, such as a probe laser. In FIG. 1, the multiplexer 106 combines the two optical sources and the demultiplexer 110 receives the multiplexed optical signal after propagating through the non-linear medium 108 and provides the phase-modulated probe signal 112 at its output. Alternatively, a common source can be divided to produce both pump 102 and probe 104 signals. Information is first encoded onto the intensity of the pump 102 signal. The information can be of any kind, including intrinsic noise from the optical source, or a signal of interest directly or externally modulated onto the pump. Multiplexing can be achieved through wavelength multiplexing, polarization multiplexing, or even time multiplexing (the latter is relevant to pulsed optical sources and would include walk-off between pump and probe inside the non-linear medium 108 to ensure the pulses overlap in time). The index of refraction of the non-linear medium 108 is modified by the pump 102 via the Kerr effect. The index changes proportionally to the pump's intensity and the non-linear parameter of the medium 108. The probe 104 signal that is overlapped in time with the pump 102 signal experiences the modified index of refraction as it propagates through the medium 108 and thus accumulates a phase change proportional to the instantaneous intensity of the pump 102. Thus, the intensity information of the pump 102 is mapped to the phase of the probe 104. It is beneficial to maintain the relative polarization states of the pump 102 and probe 104 as they traverse the non-linear medium 108. This can be achieved using birefringence, such as in a polarization maintaining fiber. At the output of the non-linear medium 108, the pump 102 and probe 104 are demultiplexed and the phase information of the probe signal is recovered. The demultiplexed pump signal (not shown) can also be recovered and used for other purposes such as to facilitate a coarse signal measurement.

Figure 2:
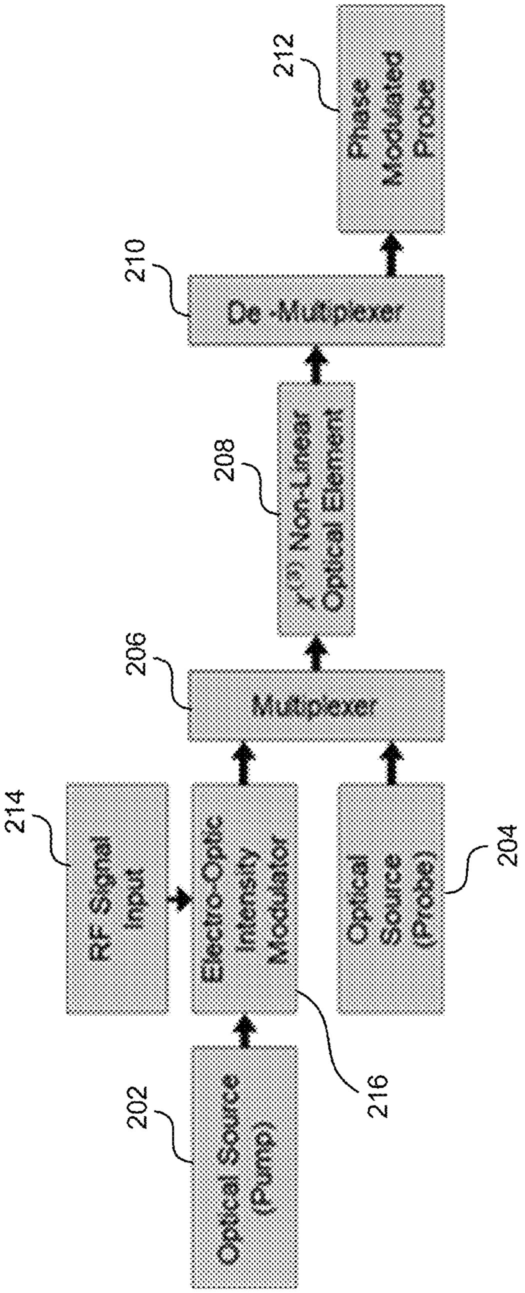
FIG. 2 illustrates an optical encoder that comprises two optical sources and a non-linear optical medium in which on optical source is modulated with a radio-frequency (RF) signal of interest.

In one implementation, an electro-optic modulator (EOM) 216 can be used to intensity modulate a radio-frequency (RF) signal 214 of interest onto the pump 202 before multiplexing with the probe 204, as shown in FIG. 2. With this implementation, the RF signal 214 is mapped onto the intensity of the pump 202 and then onto the phase of the probe 204. The remaining components and operations in FIG. 2, including the non-linear medium 208, the multiplexer 206 and the demultiplexer 210, are similar to those in FIG. 1. The phase-modulated probe 212 can be obtained at the output of the demultiplexer 210. Using a strong pump power along with a large non-linear coefficient and long interaction length, the RF signal 214 can be modulated onto the phase of the probe 204 with a modulation depth many times greater than can be achieved with state-of-the-art EOMs.

Figure 3:
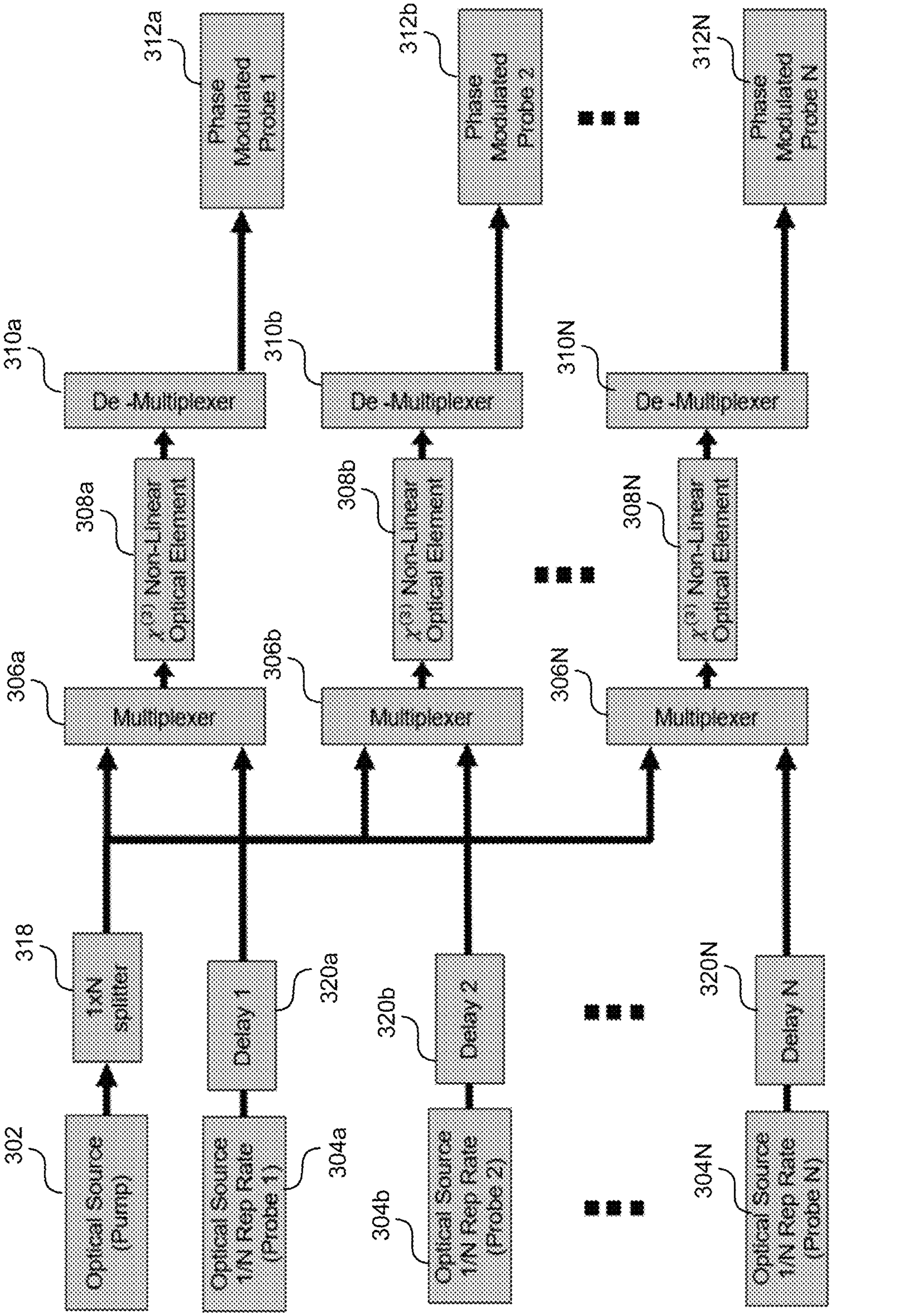
FIG. 3 illustrates an interleaved architecture in accordance with an example embodiment.

In the configurations of FIGS. 1 and 2, high repetition rate pump pulses can be used to sample high frequency RF signals. However, high repetition rates also increase the bandwidth requirements of the photodiode used to convert the optical signals into electrical signals (not shown in FIGS. 1 and 2) and the backend electronics, and can result in lower fidelity measurements. In some embodiments, lower speed probe pulses can be used in an interleaved fashion to capture the information of all the pump pulses. The interleaved probes can then be captured separately by an array of low speed photodetectors and high-resolution backend electronics. FIG. 3 illustrates one such interleaved architecture in accordance with an example embodiment. In this interleaving approach for pulse picking to reduce bandwidth requirements, the pump 302 is split into multiple copies by a 1×N splitter 318 (N≥2); each copy of the pump 302 is multiplexed with a separate lower repetition rate (i.e., 1/N repetition rate) probe signal 304*a*, 304*b*, . . . 304N, respectively, using multiplexers 306*a*, 306*b*, . . . 306N, and is sent into a corresponding separate non-linear medium 308*a*, 308*b*, . . . 308N. The 1×N splitter can be implemented as a one-by-N or M-by-N optical coupler. N demultiplexers 310*a*, 310*b*, . . . 310N are used to demultiplex each of the phase-modulated lower-rate optical signals to recover the phase encoded intensity information from the phase-modulated probe signals 312*a*, 312*b*, . . . 312N. The lower rep-rate probe signals 304*a*, 304*b*, . . . 304N in FIG. 3, prior to multiplexing with the pump signal 302, are each delayed using corresponding delay components 320*a*, 320*b*, . . . 320N (the first pump signal may have a zero delay) by a predetermined amount based on the number probes. For example, if the repetition rate of the pump source 302 is 1/Δt, delay 1 (320*a*) can have a value of Δt, delay 2 (320*b*) can have a value of 2Δt, delay 3 (not shown) can have a value of 3 Δt, and so on.

Figure 4:
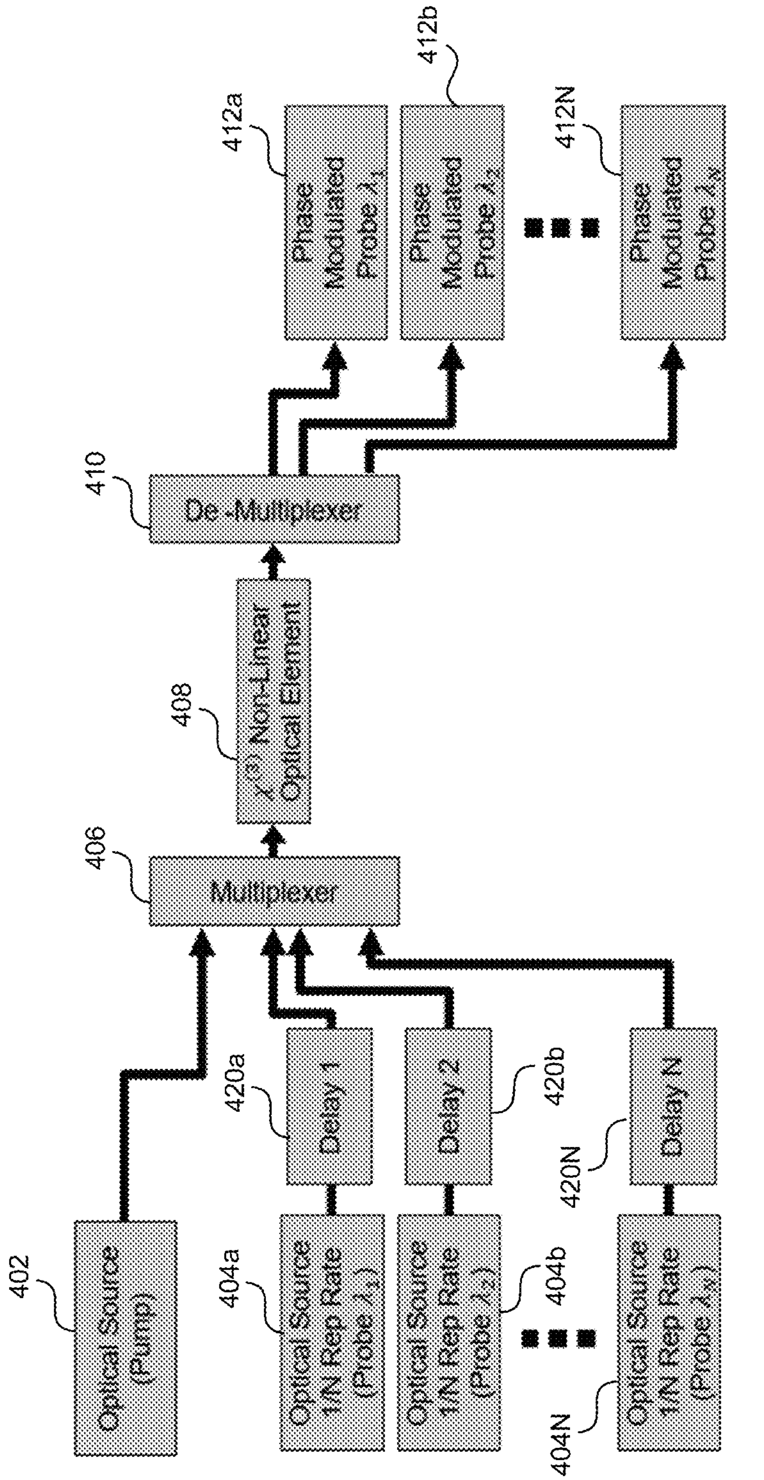
FIG. 4 illustrates another interleaved architecture in accordance with an example embodiment.

FIG. 4 illustrates another pulse picking technique to reduce bandwidth requirements of photodetector and backend electronics in accordance with an example embodiment. In this configuration, a wavelength multiplexer 406 is used to time interleave multiple lower repetition rate probe pulse trains 404*a*, 404*b*, . . . 404N (1/N pulse rate) of different wavelengths, which have been delayed using delay components 420*a*, 420*b*, . . . 420N, into the same non-linear medium 408. A wavelength demultiplexer 410 separates the optical signals after propagation through the medium 408 to produce phase-modulated probe signals at different wavelengths 412*a*, 412*b*, . . . 412N before photodetection. This wavelength multiplexing approach avoids having to split the pump source 402, thus eliminating the need for the 1/N splitter of the configuration in FIG. 3 and avoids the associated power losses, while utilizing a single non-linear medium 408. The delay value selection for the configuration of FIG. 4 can be similar to that described in connection with FIG. 3.

Figure 5:
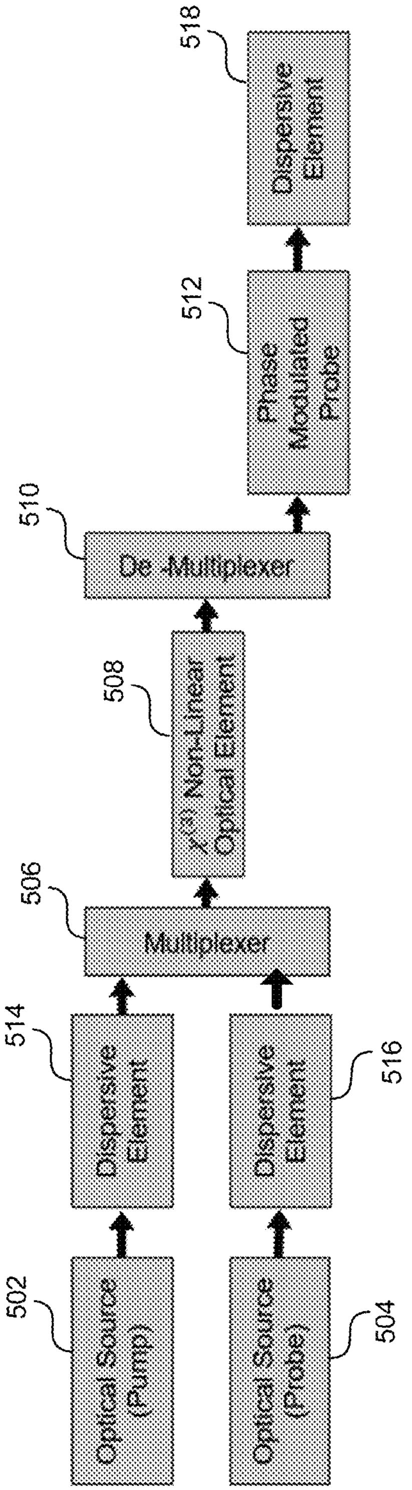
FIG. 5 illustrates an optical encoder that includes multiple optical dispersive elements to effect pulse shaping in accordance with an example embodiment.

In pulsed source implementations, it can be beneficial to use chromatic dispersion to engineer the pulse widths of the pump and probe. For instance, dispersion can be used to broaden ultrashort pulses and reduce peak powers before entering the non-linear medium. Although high peak-to-average power can be advantageous, if peak power is too high it can lead to self-phase modulation broadening or optical wave breaking, resulting in unwanted distortion. Additionally, if the pump pulse is too short relative to the probe pulse, the probe may not experience a uniform phase modulation across its full width. Therefore, properly selected dispersive elements provided in the path of the pump and probe signals before XPM (e.g., in the configuration of FIG. 3) can broaden both the pump and the probe pulses to their optimal widths. As shown in FIG. 5, two dispersive elements 514, 516 are inserted into the optical paths of the pump 502 and the probe 504 sources. In determining the desired pulse widths for the pump and the probe signals that enter the non-linear medium 508, the dispersive elements 514, 516 are selected to tune the peak pump power and the peak probe power to lower values to avoid or reduce undesirable distortions as a result of self-phase modulation broadening, optical wave breaking, while maintaining a sufficiently high peak power to produce the needed phase modulation. Further, in some implementations, the dispersive elements 514, 516 can be tuned to adjust the ratio of the pump width to the probe width in order to provide a sufficiently wide pump pulse that allows the probe signal to experience a flat phase modulation across its entire width as it propagates through the non-linear medium 508. Additionally, in the configuration of FIG. 5, a dispersive element 518 is added after phase modulation to further disperse the output phase-modulated probe signal 512. This added dispersive element 518 reduces RF bandwidth requirements and/or peak power handling requirements for the photodetector and backend electronics (not shown in FIG. 5). The operations of the modulator 506 and the demodulator 510 are similar to those described in connection with previous figures.

Figure 6:
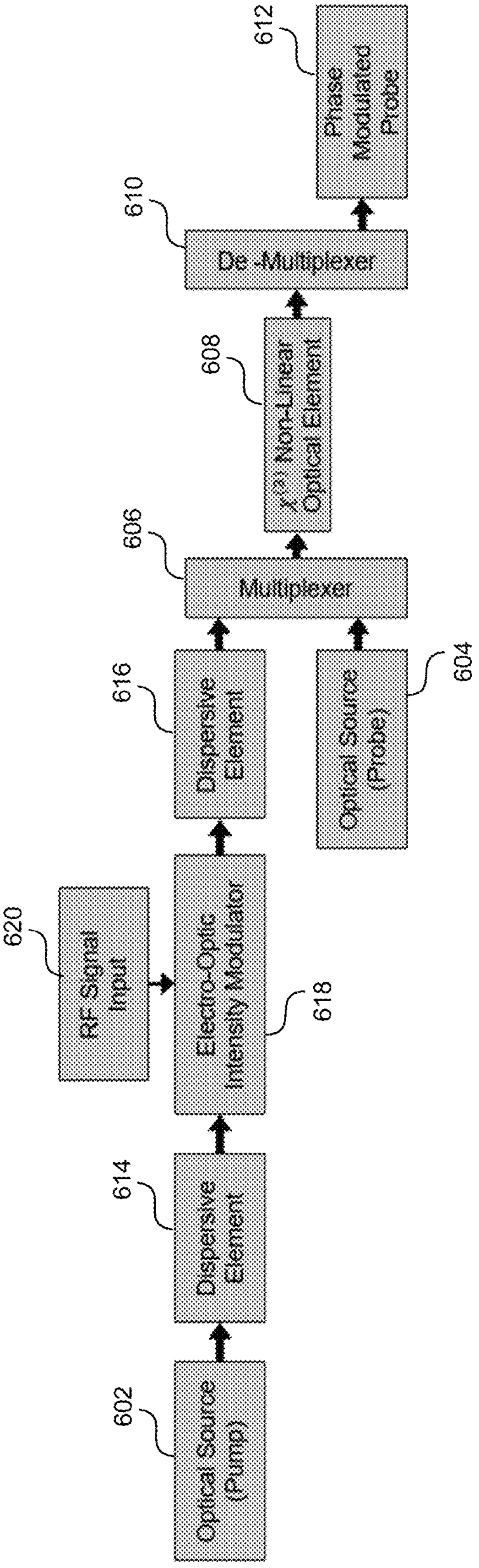
FIG. 6 illustrates an optical encoder that includes multiple optical dispersive elements in which on optical source is modulated with a radio-frequency (RF) signal of interest in accordance with an example embodiment.

FIG. 6 illustrates another embodiment of the disclosed technology that additionally utilizes chromatic dispersion. In the configuration of FIG. 6, an EOM 618 is used to modulate an RF signal 620 onto a modified version of the pump signals. In this configuration, chromatic dispersion can be added both before RS modulation (using dispersive element 614) and after modulation (using dispersive element 616). The dispersive element 614 before the EOM 618 first broadens the unmodulated pump 602, mapping optical spectrum to time. The EOM 618 then modulates the RF signal 620 onto the dispersed pump, mapping the RF signal 620 into the optical spectrum. The second dispersive element 616 (e.g., a fiber) further broadens the RF-modulated pump, stretching the modulated RF signal. In this way, the RF modulated signal on the pump can be time stretched. This can be advantageous during XPM because the probe 604 experiences a lower bandwidth RF signal, thus reducing the distortion effects associated with the finite pulse width of the probe sampling a high frequency RF signal. The remaining components and operations of FIG. 6 (including the multiplexer 606, the non-linear medium 608 and the demultiplexer 610) are similar to those previously described in connection with FIGS. 1-5. The output in FIG. 6 is the phase-modulated probe signal 612.

Figure 7:
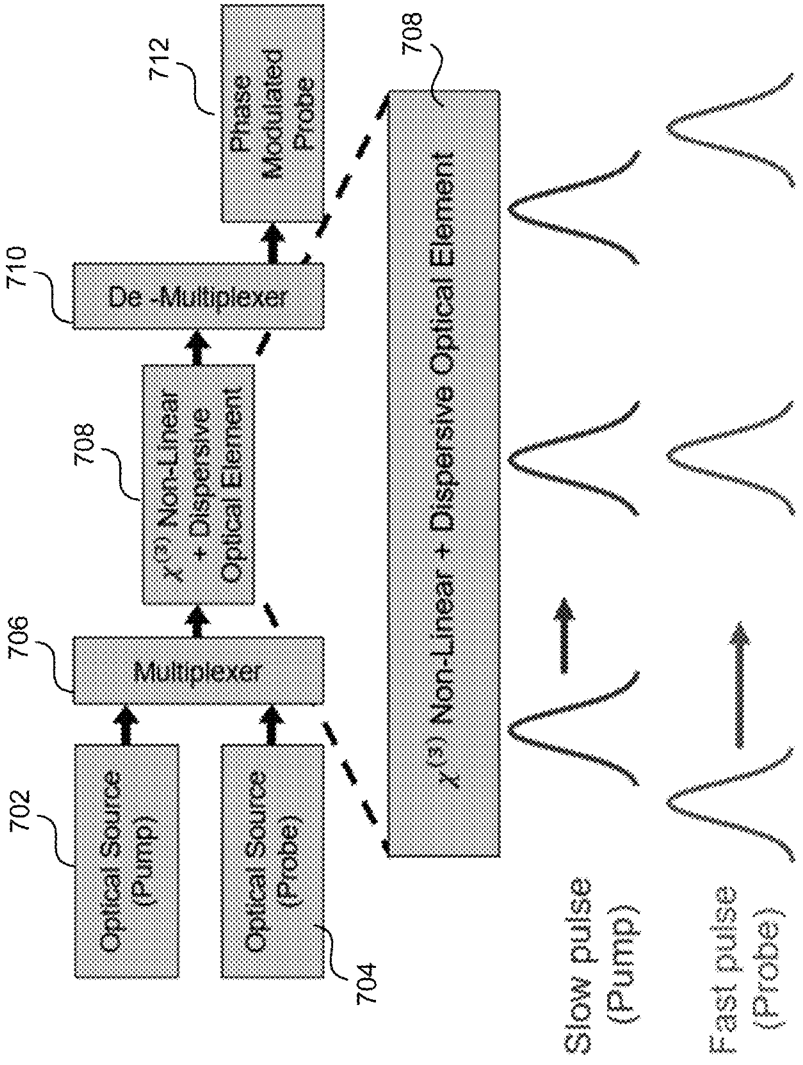
FIG. 7 illustrates an optical encoder that combines a non-linear medium and a dispersive element to impart a more uniform phase modulation in accordance with an example embodiment.

Another method of improving performance in accordance with the disclosed embodiments involves changing the relative timing between the pump and probe during XPM. One method of accomplishing this is through the use of chromatic dispersion inside of the non-linear optical medium. If the center wavelengths of the pump and probe pulses are separated from each other and lie in a region of non-zero dispersion, the two pulses will traverse the non-linear optical medium with different group velocities (one termed the fast pulse and the other the slow pulse). The pump and probe pulses therefore walk-off with respect to each other during XPM as the pulses propagate through the non-linear medium. In accordance with some embodiments, the timing of the pulses is engineered such that, at the input of the non-linear medium, the fast pulse trails the slow pulse, whereas, at the output of the non-linear medium, the fast pulse leads the slow pulse. This is illustrated by the slow and fast pulses in FIG. 7. In the configuration of FIG. 7, the non-linear optical element 708 is depicted as comprising a dispersive optical element as part thereof. As the fast pulse overtakes the slow pulse, the pulses overlap with a continuously changing relative time delay. This walk-off can be advantageous because since all parts of the probe 704 pulse are modulated by the pump 702, the probe 704 receives a more uniform phase modulation, thus eliminating or greatly reducing any unwanted ripples or non-uniformities on the phase-modulated signal. Additionally, the pump 702 signal inherently includes certain amount of noise (e.g., shot noise). The walk-off, which mathematically can be considered as a convolution operation, operates to effectively average the noise across the pump 704 pulse, thus smoothing the signal and improving the signal-to-noise ratio of the phase-modulated signal 712. In order to enable the above-described walk-off, several factors or design parameters can be taken into account, including the wavelength separation between the pump 702 and the probe 704 sources, center wavelengths of the probe 702 and the pump 704 sources, dispersive characteristics of the non-linear medium 708, and dimensions (e.g., length) of the non-linear medium 708, which can be used individually or collectively to provide the desired walk-off. For example, increasing the length of the non-linear medium 708 produces increased walk off. Thus, unlike many applications that avoid walk-off and prefer zero dispersion across the non-linear media 708, the disclosed embodiments as exemplified by the configuration of FIG. 7 utilize chromatic dispersion associated with the non-linear media 708 in a controlled way to improve phase modulation and the signal-to-noise ratio. It should be noted that while the example in FIG. 7 illustrates the probe 702 beam as the fast pulse and the pump 704 beam as the slow pulse, in some embodiments, the system can be designed to allow for the probe 704 beam to be the fast pulses and the pump 702 beam to be the slow pulse. The remaining components and operations of FIG. 7 (including the multiplexer 706 and the demultiplexer 710) are similar to those described in connection with previous figures.

Other aspects of the disclosed embodiments relate to improved interferometric techniques to recover the phase information of the probe after XPM. These techniques can utilize a low noise local oscillator or an unmodulated reference copy of the probe. In the latter case, the probe signal can be split before being multiplexed with the pump. The optical splitter can be implemented as a one-by-two or two-by-two optical coupler. The phase-modulated probe signal and unmodulated reference signal are combined and interfered, converting the phase information into amplitude information. The optical combiner can be implemented as a two-by-one or two-by-two optical coupler. The nature of the two-by-two coupler is such that the two outputs receive complementary modulation. By capturing both outputs, balanced detection can be employed in the analog or digital domain to boost the recovered signal and mitigate common mode noise. See. e.g., FIGS. 8(*b*) and 11. It should be noted that similar modifications to produce utilize complementary outputs may be made to other example embodiments disclosed herein (although explicit figures may not have been separately produced).

Figure 8A:
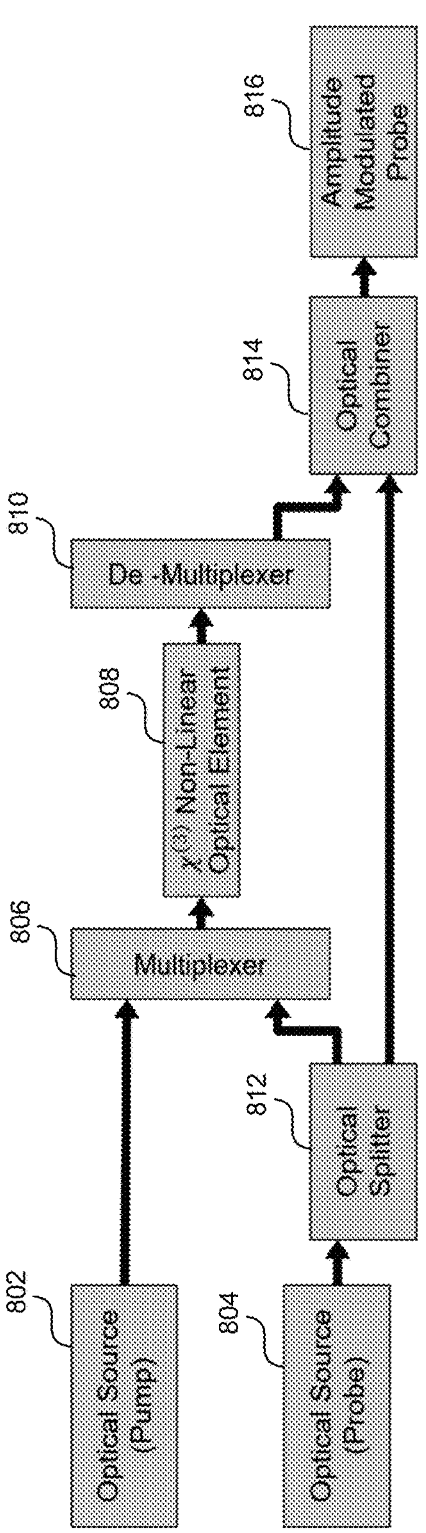
FIG. 8(*a*) illustrates one implementation of an optical encoder that uses an interferometer in a Mach-Zehnder configuration.
Figure 8B:
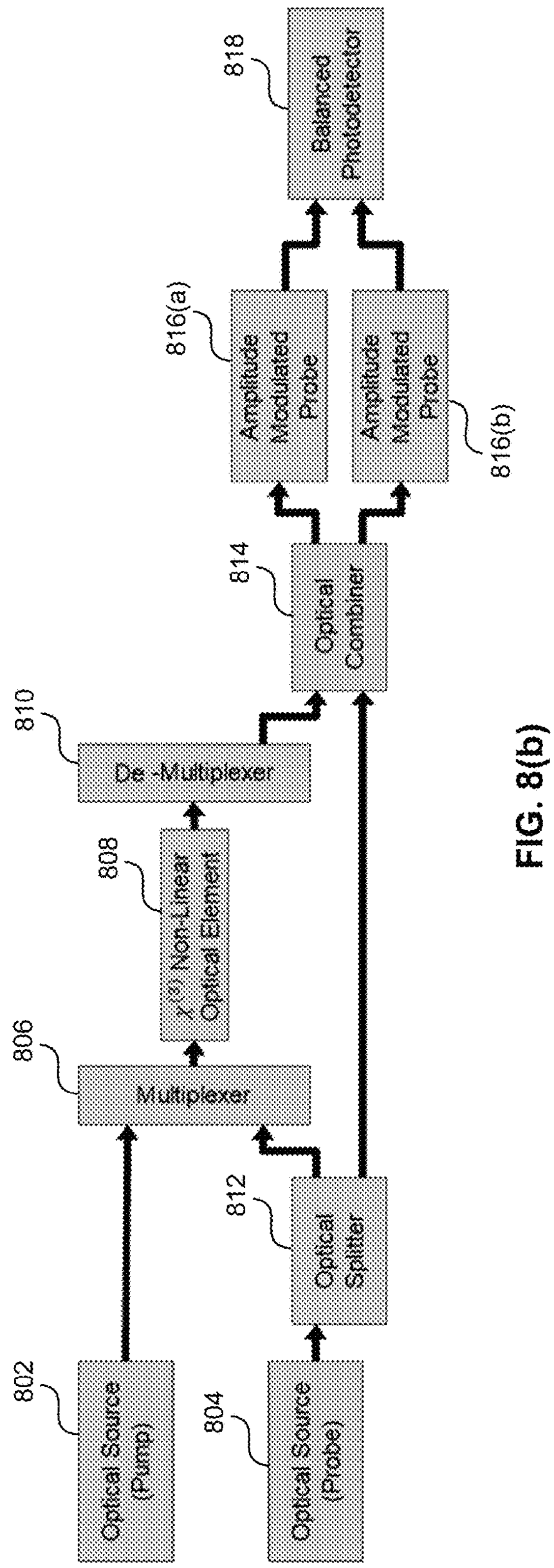

FIG. 8(*a*) illustrates one implementation of the interferometer in a Mach-Zehnder configuration. The optical splitter 812 provides a copy of the probe 804 to the optical combiner 814 (i.e., the reference path of the interferometer) that also receives the output of the demultiplexer 810 to form interference fringes corresponding to the amplitude-modulated probe 816. The other output of the optical splitter 812 in FIG. 8(*a*) is provided to the multiplexer 806, which also receives the pump 802 signal; the output of the multiplexer 806 is provided to the non-linear medium 808. FIG. 8(*b*) illustrates a similar configuration as FIG. 8(*a*) but with the complementary outputs of the combiner providing complementary amplitude-modulated probe signals 816(*a*), 816(*b*) to the balanced photodetector 818. For example, the complementary amplitude-modulated probe signals can be 180 degrees out of phase with respect to one another.

Figure 9:
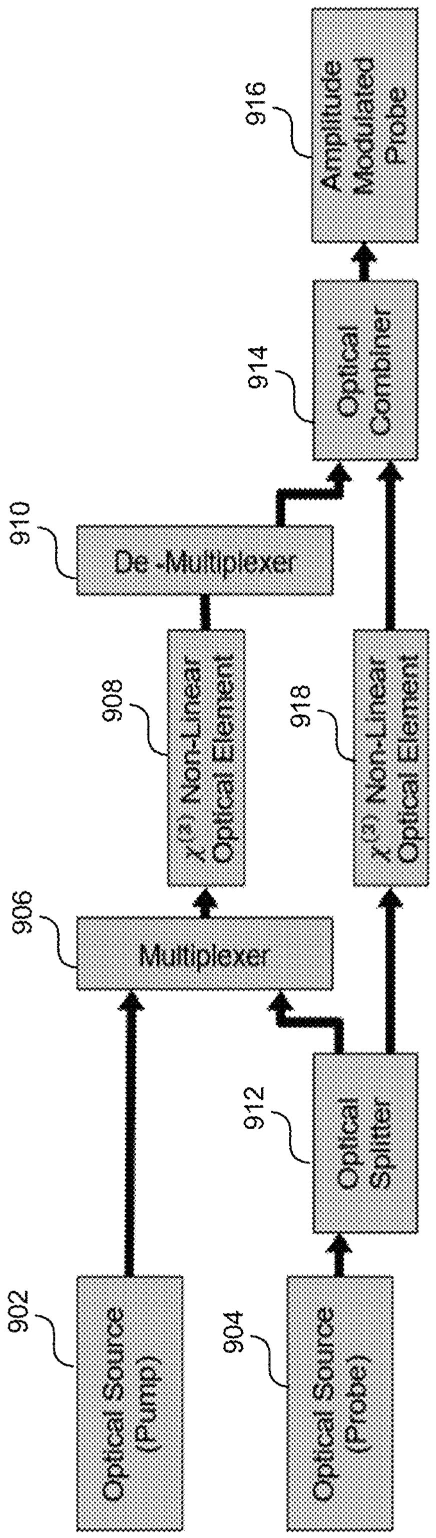
FIG. 9 illustrates an optical encoder that uses an interferometer in a Mach-Zehnder configuration with improved visibility of the interference pattern in accordance with an example embodiment.

In accordance with an example embodiment, a second non-linear optical medium is placed in the reference signal path to improve the visibility of the interference pattern at the output of the interferometer, as illustrated in FIG. 9. The second non-linear medium 918 acts to better match the optical loss, dispersion, and non-linear optical parameters experienced by the probe 902 and reference 904 signals. Since the optical non-linearity is dependent on the intensity, it is important to ensure the powers of the probe and reference signals are the same as they enter the two non-linear media 908, 918. By isolating the differences between modulated and reference signals to the phase modulation of the pump, the interference signal provided by the amplitude-modulated probe 916 signal can be made stronger (i.e., the modulation depth of the interference fringes is increased) and the information from the pump 902 can be more effectively recovered. The remaining components and operations of FIG. 9 (including the multiplexer 906, the splitter 912, the demultiplexer 910, the combiner 914) are similar to those described in connection with FIG. 8(*a*).

Figure 10:
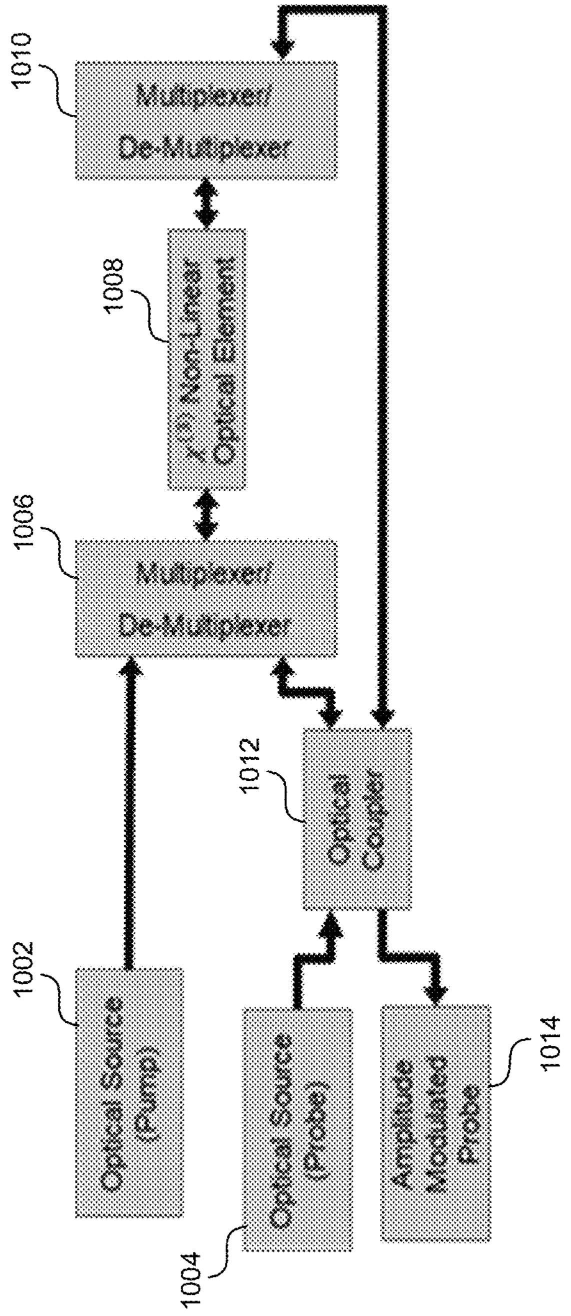
FIG. 10 illustrates one implementation of an optical encoder that uses an interferometer in a Sagnac configuration.

The interferometer can also be implemented in a Sagnac configuration, as illustrated in FIG. 10. In this configuration, the probe 1002 is provided to the multiplexer/demultiplexer 1006 via the optical coupler 1012, and the probe 1002 and reference signals propagate through the same multiplexer/demultiplexer 1006, non-linear optical medium 1008, and multiplexer/demultiplexer 1010, but in opposite directions. The probe propagates in the same direction as the pump and therefore experiences a greater phase modulation than the reference. The phase information can be recovered via the amplitude-modulated probe signal 1014 at the output of the optical coupler 1012.

Figure 11:
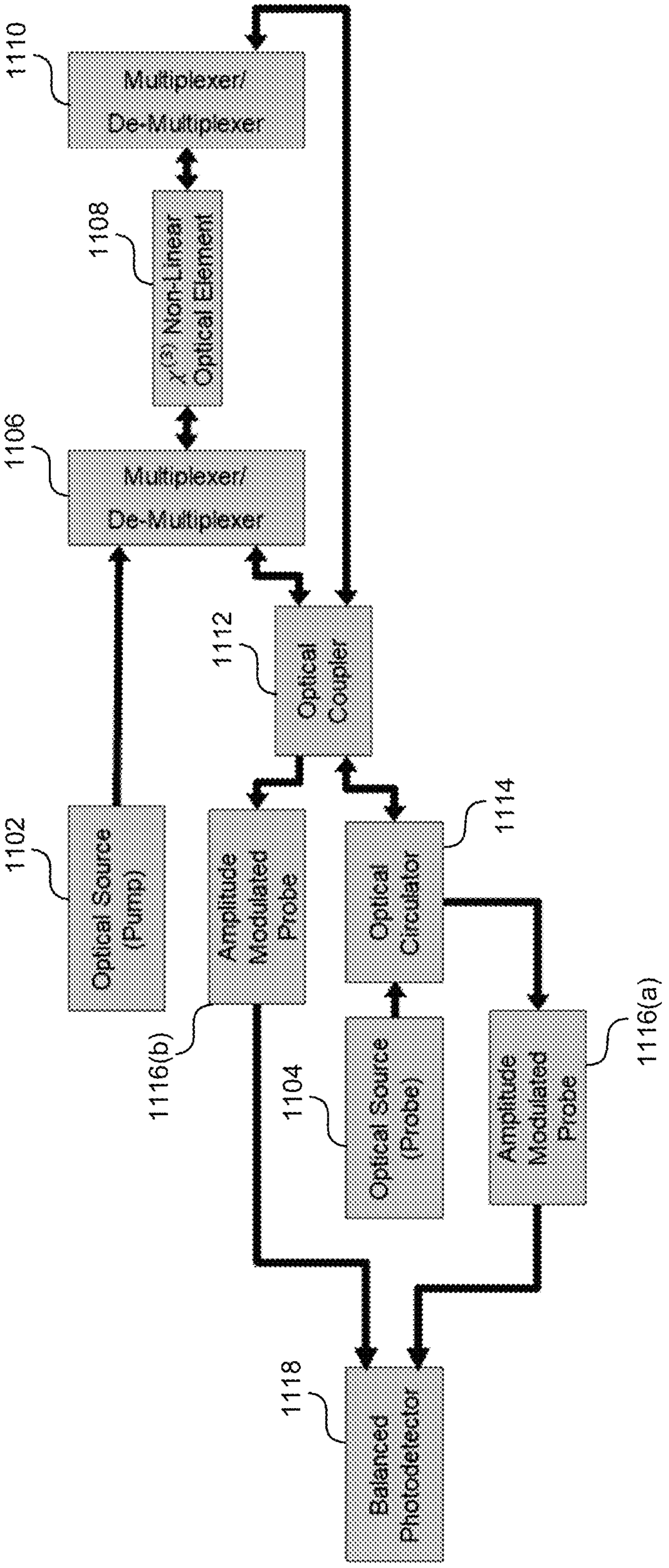
FIG. 11 illustrates an optical encoder that uses an interferometer in a Sagnac configuration to produce complementary amplitude-modulated signals in accordance with an example embodiment.

In accordance with an example embodiment, in order to take advantage of two complementary outputs of the interferometer, a circulator is used to isolate the backward propagating amplitude-modulated probe, as illustrated in FIG. 11. One benefit of the Sagnac configuration is that the probe 1102 and reference signals traverse the same optical path, automatically matching the optical parameters experienced by the two. Again, it is beneficial to match the optical power of the probe 1102 and reference as they enter the non-linear medium 1108. The Sagnac configuration, due to utilizing a shared common path, also reduces the susceptibility of phase variation due to environmental factors such as temperature, vibrations and the like, as well as due to length variations and manufacturing variability of components, thus further restricting the phase difference between probe 1102 and reference signals to the pump modulation alone. In the configuration of the FIG. 11, the optical circulator 1114 (operating to separate optical signals that travel in different directions) is connected to an optical coupler 1112 and the probe 1104 source, and enables propagation of the probe 1104 signal towards the coupler 1112 and the recovery of one of the two complementary amplitude-modulated probe signals 1116(*b*) (the other complementary output 1116(*a*) is obtained from the optical coupler 1112 similar to FIG. 10). The complementary outputs 1116(*a*), 1116(*b*) are provided to a balanced photodetector 1118. In FIG. 11, each of the multiplexers/demultiplexers 1106, 1110 is configured to operate as a multiplexer for optical beams that are input to the corresponding multiplexer/demultiplexer 1106, 1110 in one direction, and operate as a demultiplexer for a beam that is input therein in another direction.

Figure 12:
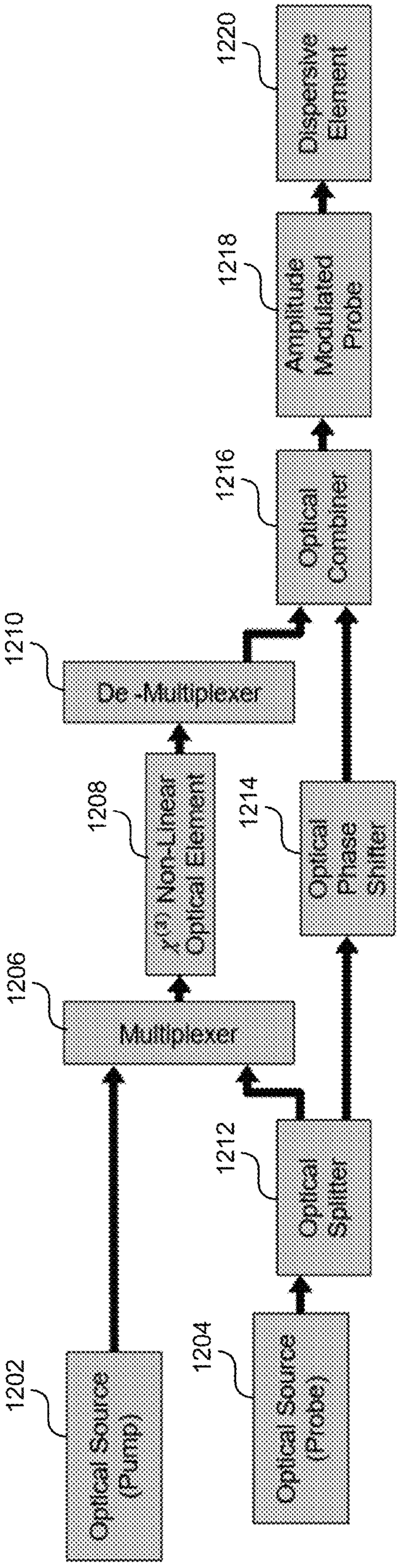
FIG. 12 illustrates an optical encoder that uses a Mach-Zehnder interferometer configuration, in which a fixed phase delay in the reference arm is implemented in accordance with an example embodiment.

In some embodiments, the interferometer configuration includes a fixed phase delay between the probe and reference signal paths, using an optical phase shifter. FIG. 12 illustrates a Mach-Zehnder interferometer configuration, in which a fixed phase delay (provided by the optical phase shifter 1214) in the reference arm is implemented in accordance with an example embodiment. For example, the fixed phase delay can be implemented based on a technique termed amplitude-to-time optical mapping (ATOM) with the aid of the dispersive element 1220 (see, U.S. Pat. No. 8,934,058 B2, which is incorporated by reference herein). The remaining components and operations of FIG. 12 (including the multiplexer 1206, the non-linear medium 1308, the demultiplexer 1310, and the optical splitter 1212 that receive and/or manipulate the optical pump 1202 and probe 1204 signals) are similar to those described in connection with FIG. 8(*a*).

Figure 13:
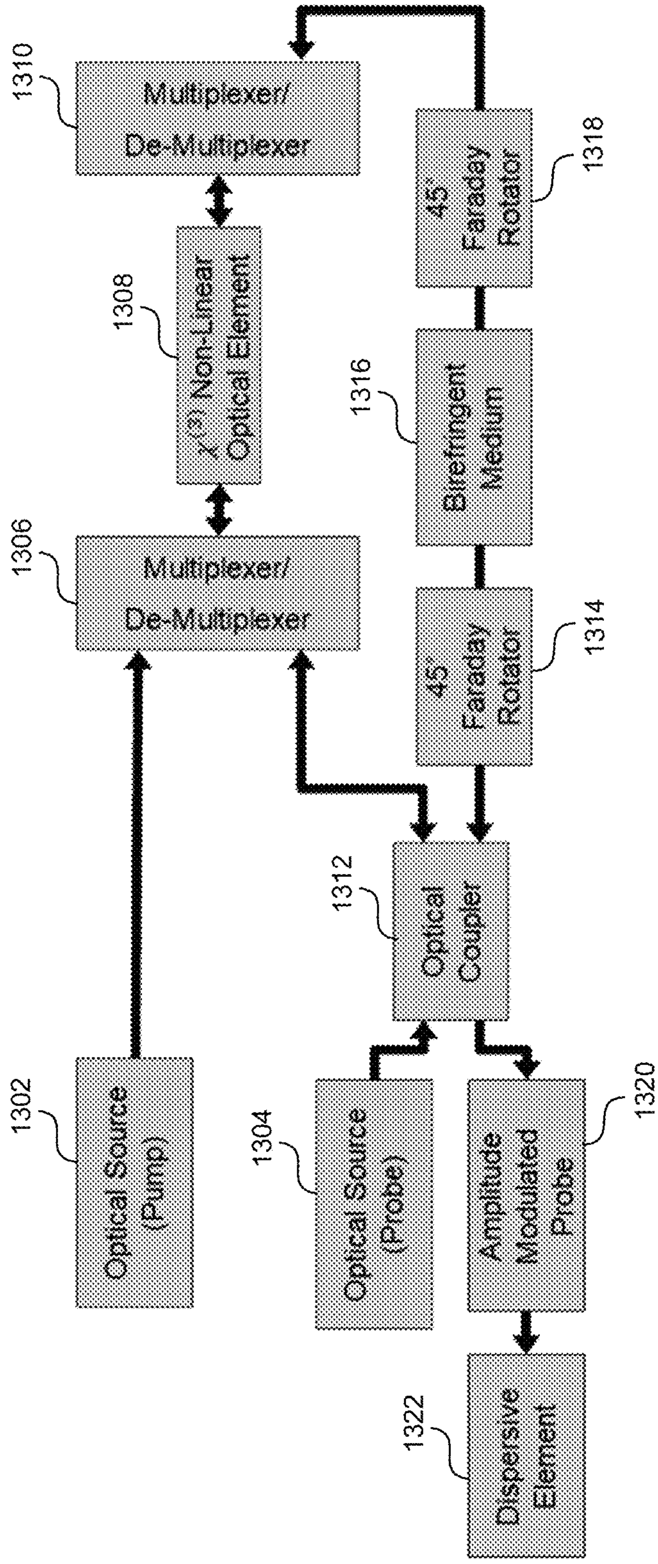
FIG. 13 illustrates an optical encoder that uses a Sagnac interferometer configuration and implements a fixed phase delay in accordance with an example embodiment.

The fixed phase delay can also be implemented in a Sagnac configuration, as illustrated in FIG. 13. In the example Sagnac configuration of FIG. 13, two non-reciprocal polarization rotators 1314, 1318 (such as Faraday rotators) and a birefringent medium 1316 can be used to create an asymmetric optical path length between forward and backwards propagating signals. The polarization rotators 1314, 1318 are non-reciprocal polarization rotators; that is, optical beams passing through the same rotator in different directions experience different polarization rotations. The combination of rotators 1314, 1318 and the birefringent medium 1316 creates a path length difference between the clockwise and counterclockwise propagation directions of the optical beam. Upon interference, this phase delay leads to a sinusoidal interference fringe in the spectral domain which can be mapped into the time domain using chromatic dispersion provided with the aid of the dispersive element 1322. The remaining components and operations of FIG. 13 (including the multiplexer/demultiplexers 1306, 1310, the non-linear medium 1308, and the optical coupler 1312 that receive and/or manipulate the optical pump 1302 and probe 1304 signals) are similar to those described in connection with FIG. 10. The resulting fringe is detected as an effective intermediate frequency (IF) signal, with an RF frequency dependent on the phase delay and the amount of chromatic dispersion. The phase-modulated information of the probe is encoded into the phase of this IF signal and can be recovered using analog or digital in-phase/quadrature (IQ) demodulation. The advantage of this technique is that the modulated phase information on the probe can span multiple factors of $2\pi$ radians and be recovered without signal degradation.

Figure 14:
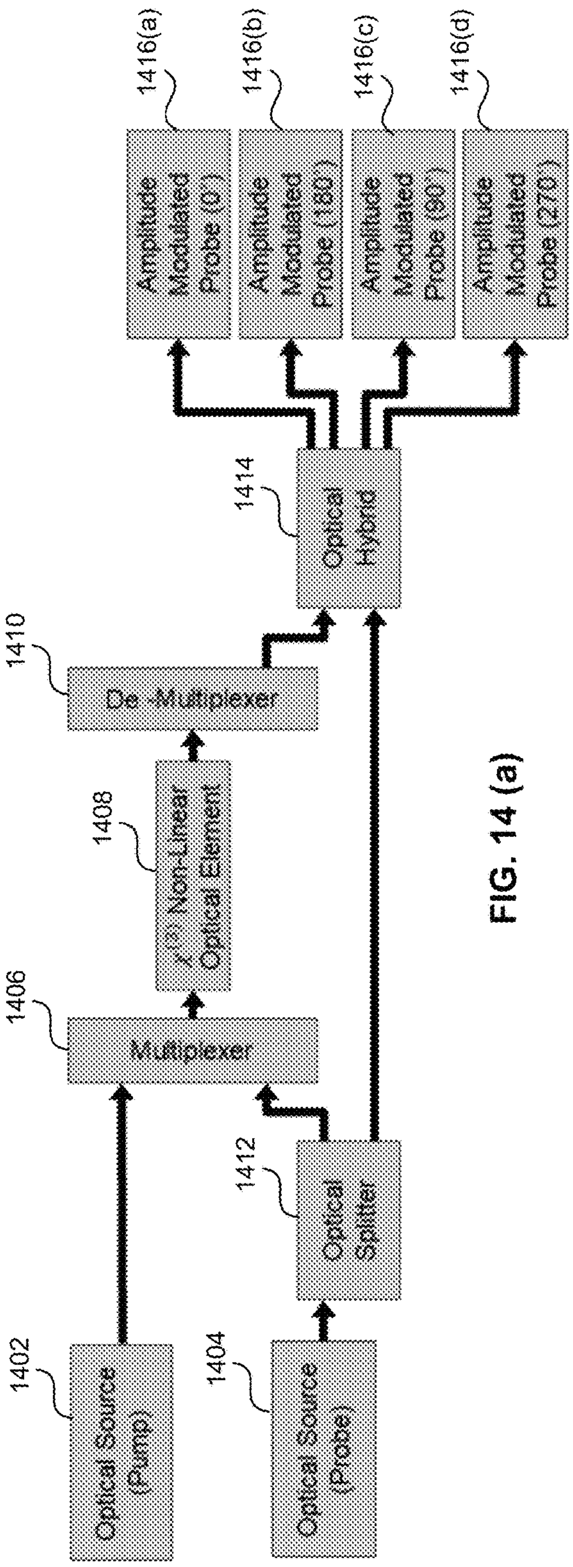
FIG. 14(*a*) illustrates an optical encoder that uses a Mach-Zehnder interferometer configuration and an optical hybrid in accordance with an example embodiment.
Figure 14:
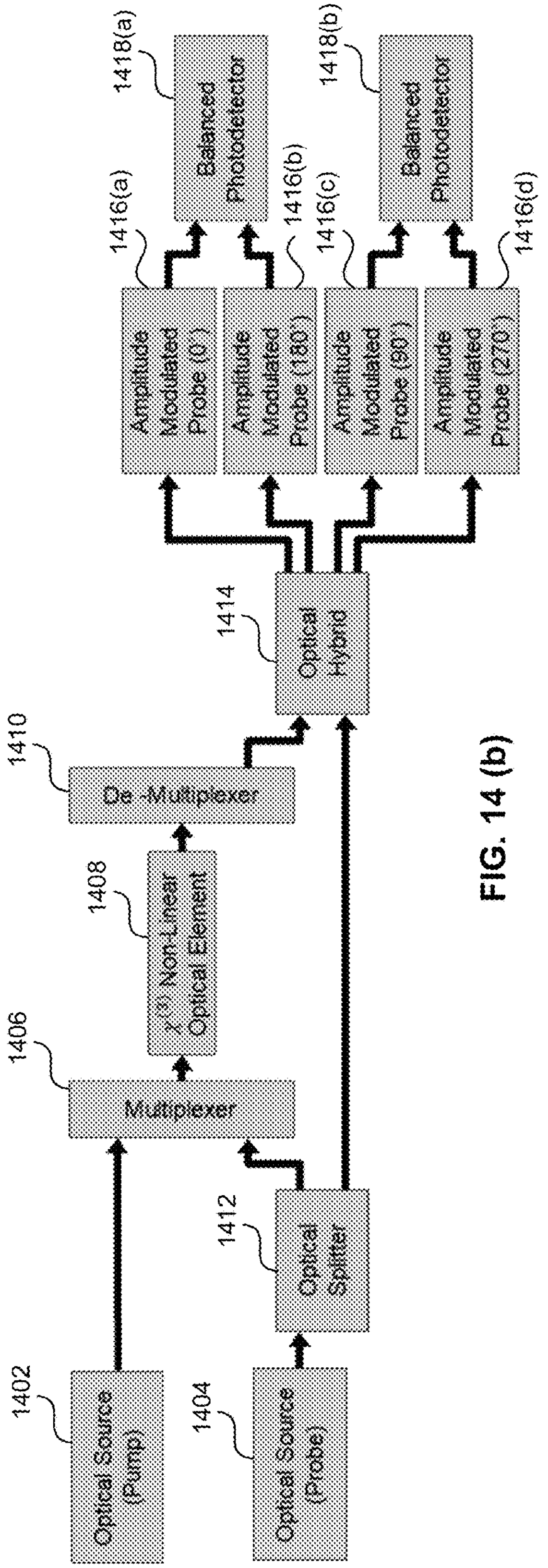
Figure 15A:
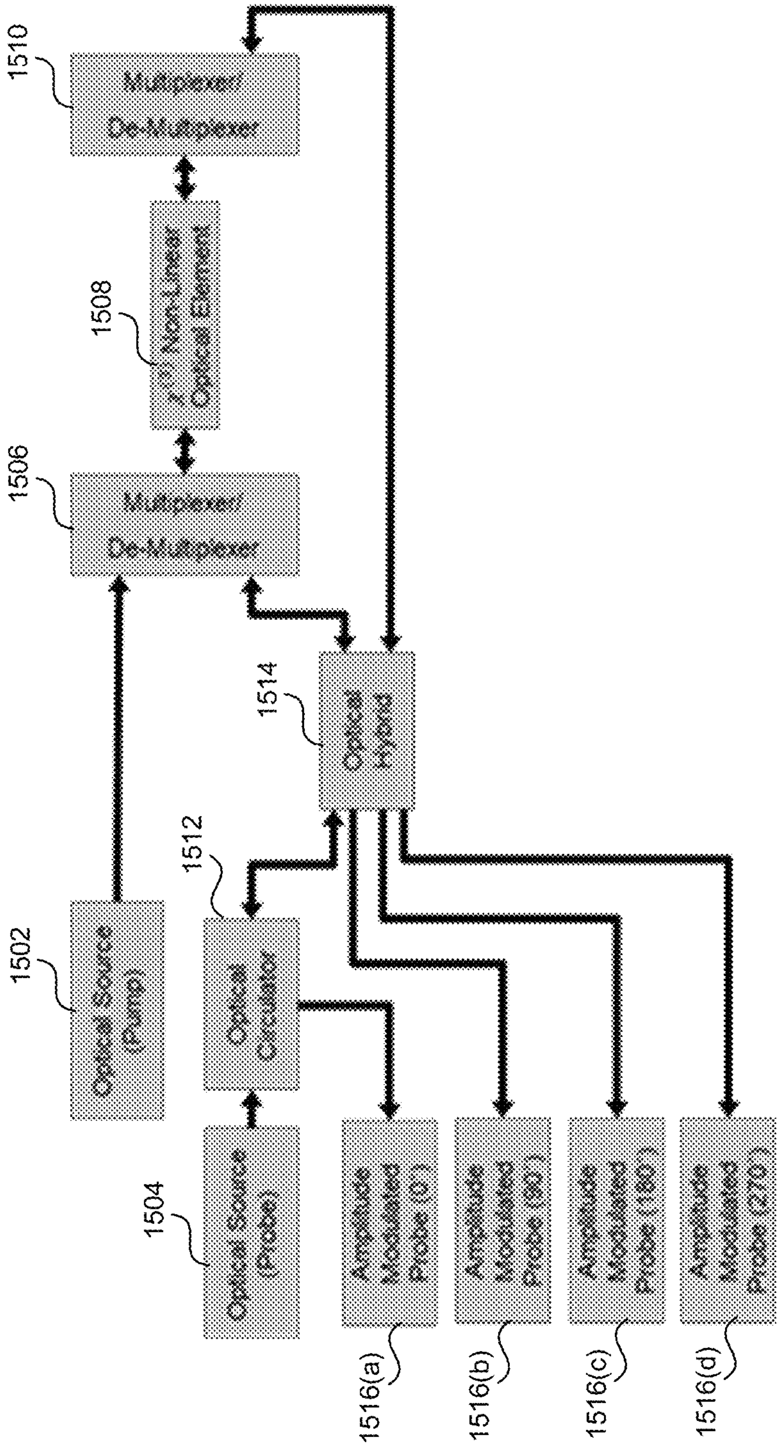
FIG. 15(*a*) illustrates an optical encoder that uses a Sagnac interferometer configuration and an optical hybrid in accordance with an example embodiment.
Figure 15:
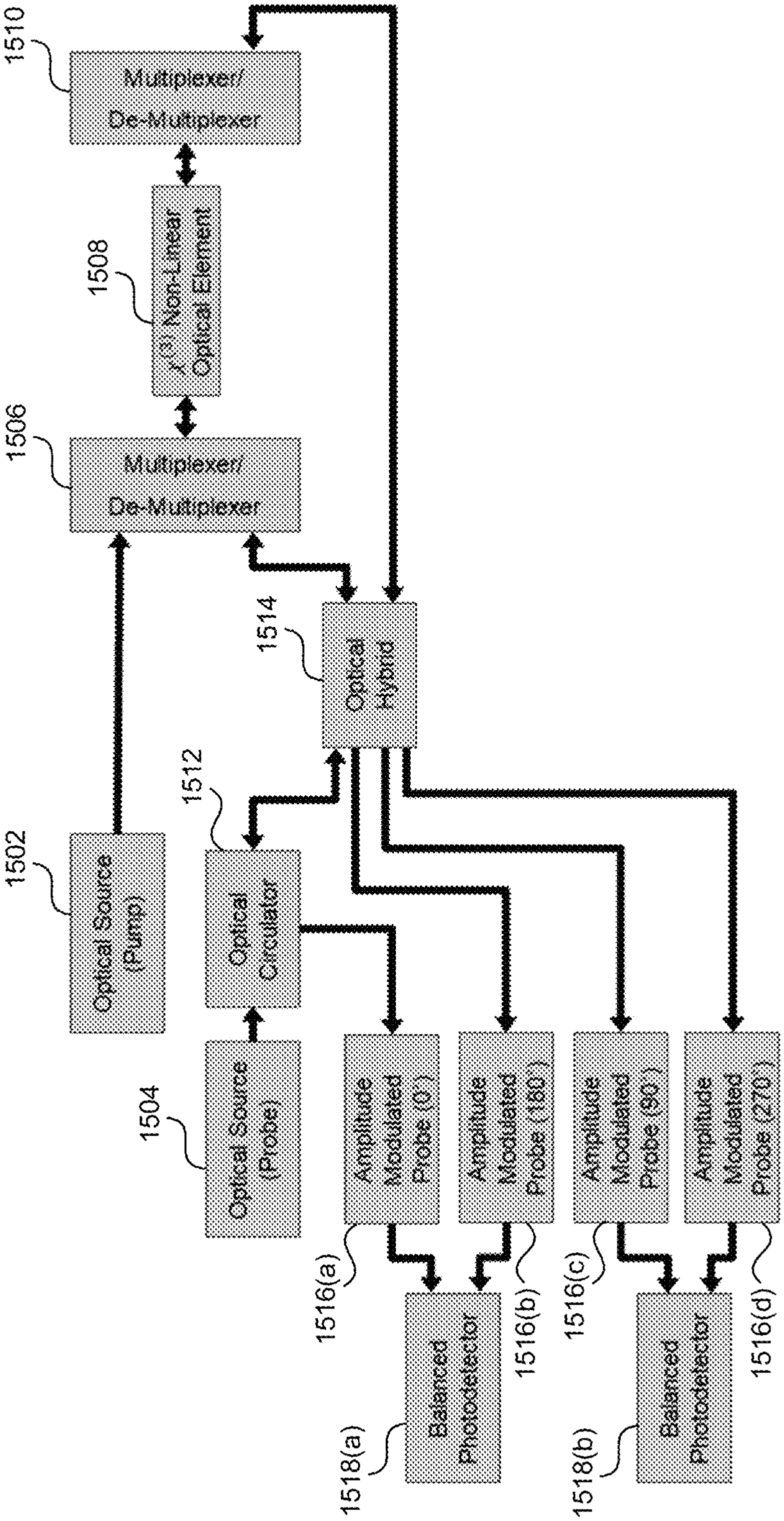

Another implementation of the interferometer configuration uses a 90-degree optical hybrid as the combiner at the output of interferometer. FIG. 14(*a*) illustrates the inclusion of the hybrid 1414 in a Mach-Zehnder interferometer configuration. FIG. 15(*a*) illustrates the inclusion of an optical hybrid 1512, as well as a circulator 1514, in a Sagnac interferometer configuration. The output of the hybrid (1414 in FIGS. 14(*a*) and 1514 in FIG. 15(*a*)) includes phase shifted copies of the phase-modulated signal (e.g., phase shifted by 0, 90, 180 and 270 degrees—shown respectively as 1416(*a*), 1416(*b*), 1416(*c*), and 1416(*d*) in FIG. 14(*a*) and as 1516(*a*), 1516(*b*), 1516(*c*), and 1516(*d*) in FIG. 15(*a*)). Hence the output includes both I and Q interference signals, achieving IQ demodulation optically without requiring a high frequency IF signal. This is advantageous as it reduces the bandwidth requirements of the photodetector and back-end electronics. The optical hybrid (1414 in FIGS. 14(*a*) and 1514 in FIG. 15(*a*)) can be used in a Mach-Zehnder configuration as in FIG. 14(*a*) or in a Sagnac configuration as in FIG. 15(*a*). In FIG. 15(*a*), the optical circulator 1512 couples the pump 1504 signal to the hybrid 1514 and provides one of the amplitude-modulated probe signals 1516(*a*). The remaining components and operations of FIG. 14(*a*) (including the multiplexer 1406, the non-linear medium 1408, the demultiplexer 1410, and the optical splitter 1412 that receive and/or manipulate the optical pump 1402 and probe 1404 signals) are similar to those previously described. Furthermore, the remaining components and operations of FIG. 15(*a*) (including the multiplexer/demultiplexers 1506, 1510, and the non-linear medium 1508 that receive and/or manipulate the optical pump 1502 and probe 1504 signals) are similar to those described previously.

FIGS. 14(*b*) and 15(*b*) illustrate similar configurations as in FIGS. 14(*a*) and 15(*a*), respectively, but further include two balanced photodetectors (1418(*a*) and 1418(*b*) in FIG. 14(*b*), and 1518(*a*) and 1518(*b*) in FIG. 15(*b*)) that are each positioned to receive two complementary outputs of in the depicted example configurations.

Figure 16:
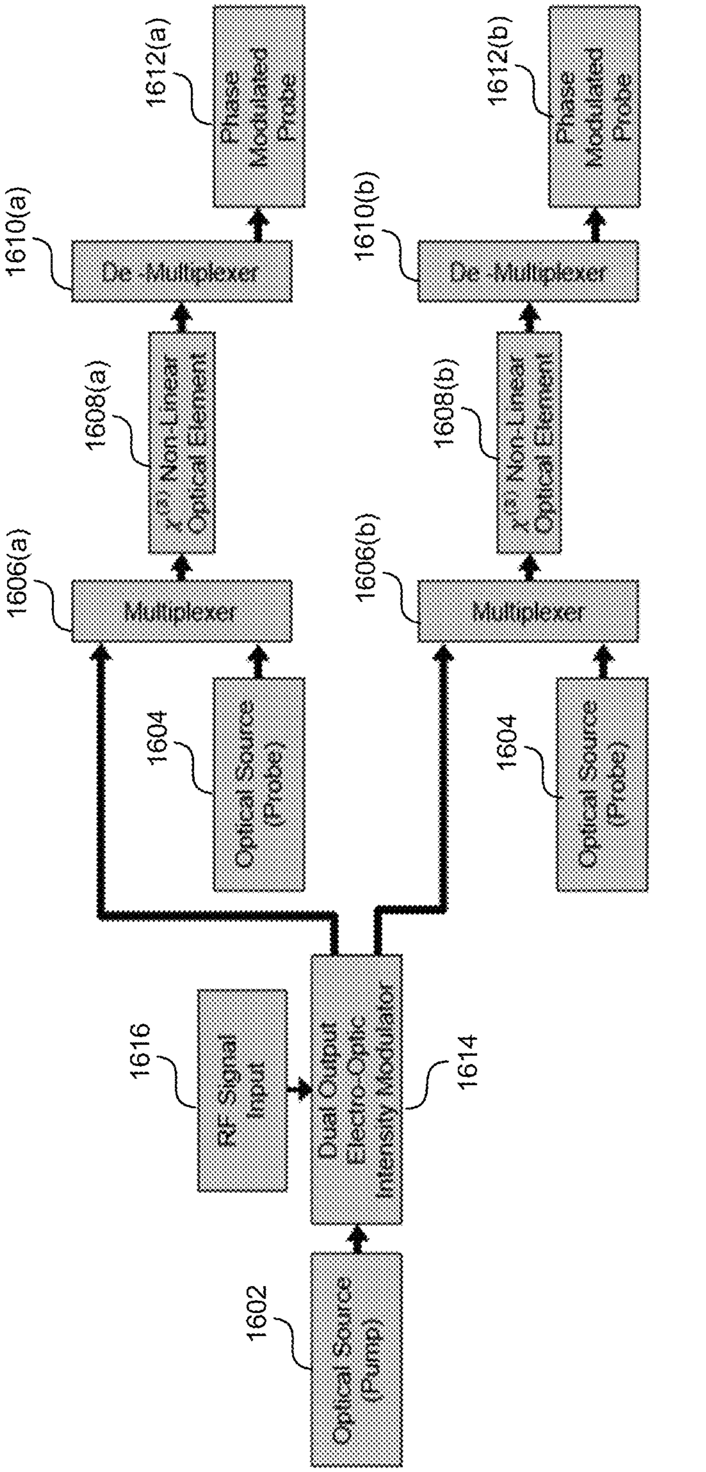
FIG. 16 illustrates an optical encoder that uses a dual output electro-optic modulator is used to encode a radio-frequency (RF) signal of interest in accordance with an example embodiment.

In some configurations, a dual output electro-optic intensity modulator is used to encode an RF signal onto the intensity of the pump, as shown in FIG. 16. The pump 1602 signal is provided to dual electro-optic intensity modulator 1614 that has two outputs. The first output of the modulator 1614 is encoded with the RF signal 1616 and the second output of the modulator 1614 is encoded with a complementary version of the RF signal 1616. These two encoded pump signals can be multiplexed using multiplexers 1606(*a*), 1606(*b*) into two separate non-linear optical media 1608(*a*), 1608(*b*), along with two separate probe signals 1604. The two phase-modulated probe signals 1612(*a*), 1612(*b*) obtained from the demultiplexers 1610(*a*), 1610(*b*) are phase-modulated with the complementary information. Upon phase recovery, the complementary information can be combined in such a way as to amplify the signal and reduce common mode noise (e.g., the common noise is canceled or normalized via subtraction or division operations). Common mode noise can include pump noise accumulated before the electro-optic modulator. The phase information can be read out by interfering each complementary modulated probe with separate local oscillators or reference signals.

Figure 17:
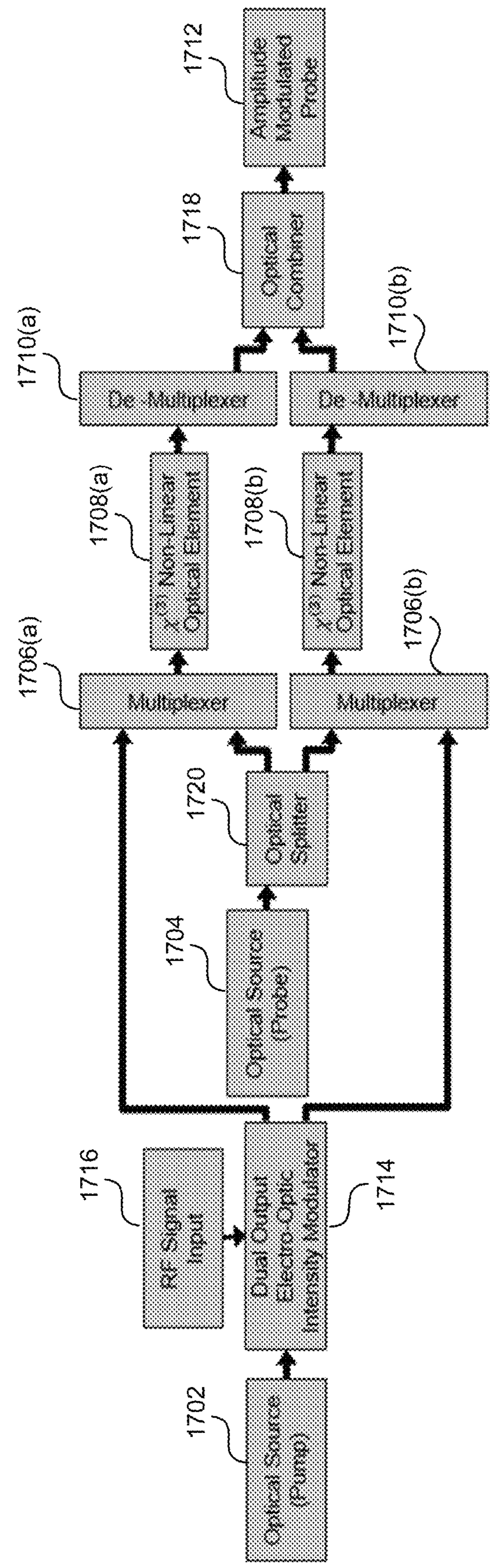
FIG. 17 illustrates an optical encoder in which two complementary modulated probe signals are interfered with each other using a Mach-Zehnder configuration in accordance with an example embodiment.

FIG. 17 illustrates a configuration in accordance with an example embodiment, in which the two complementary modulated probes are interfered with each other using a Mach-Zehnder configuration. Similar to FIG. 16, the pump 1702 signal is provided to dual electro-optic intensity modulator 1714 that has two outputs. The first output of the modulator 1714 is encoded with the RF signal 1716 and the second output of the modulator 1714 is encoded with a complementary version of the RF signal 1716. These two encoded pump signals are provided to the multiplexers 1706(*a*), 1706(*b*). Further, the probe 1704 signal is split by an optical splitter 1720 and provided to each of the multiplexers 1706(*a*), 1706(*b*). Each probe signal then undergoes a phase modulation as it propagates through each of the non-linear media 1708(*a*), 1708(*b*) in accordance with each of the complementary RF signals. An optical combiner 1718 is used to receive an output from each demultiplexer 1710(*a*), 1710(*b*) to allow the phase-modulated beams to interfere with each other to form the amplitude-modulated interference pattern 1712 at the output. By interfering the two complementary phase modulated signals, improvements in modulation efficiency and noise reduction can be achieved in the analog domain without requiring twice the number of optical couplers or photodetectors.

Figure 18:
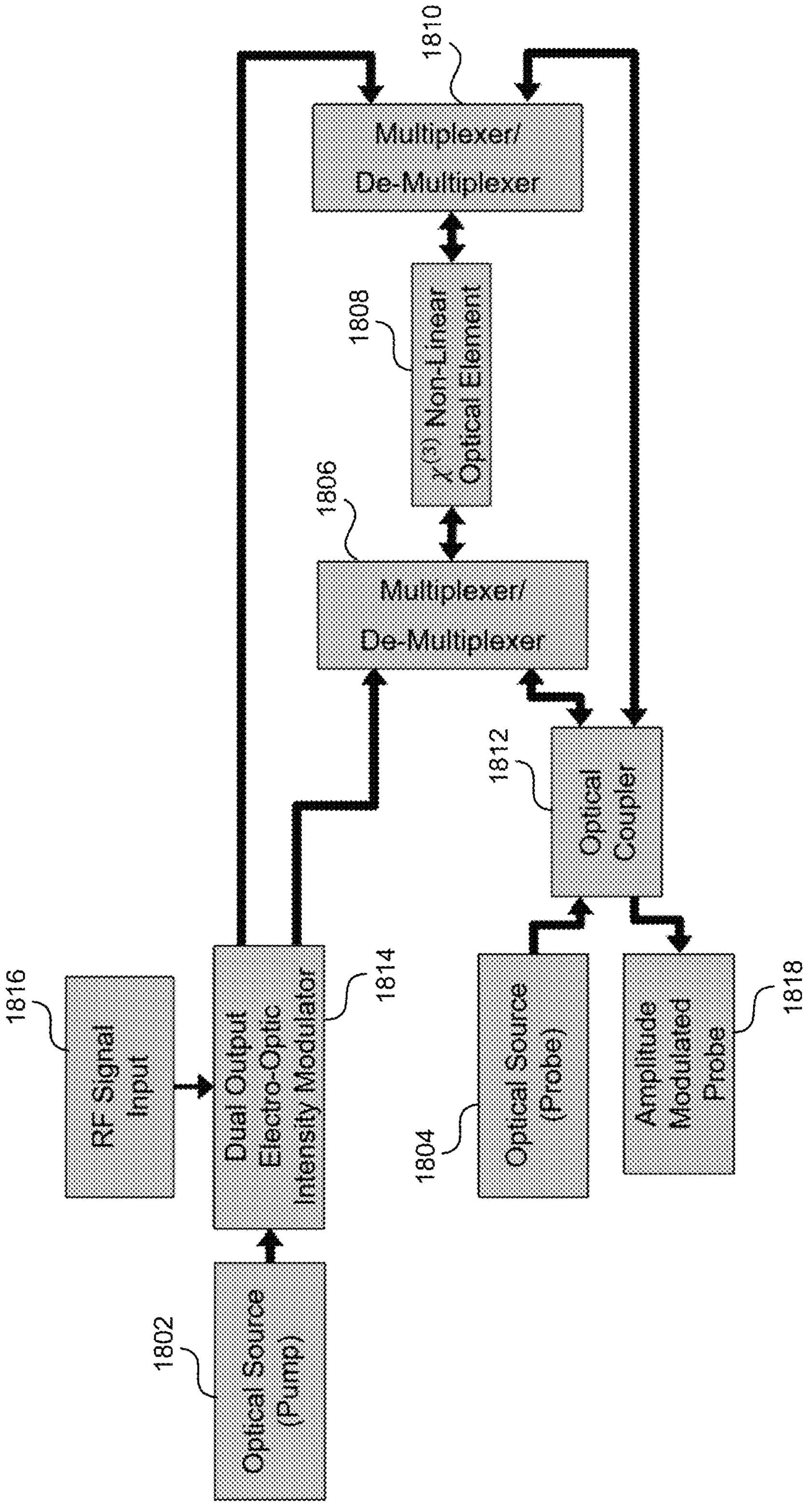
FIG. 18 illustrates an optical encoder in which two complementary modulated probe signals are interfered with each other using a Sagnac configuration in accordance with an example embodiment.

FIG. 18 illustrates an alternate embodiment in which the interference of the two complementary probes is implemented in Sagnac configuration. In this configuration, isolators or circulators can be used to isolate the forward and backwards propagating pumps. By interfering the two complementary phase-modulated signals, improvement in modulation efficiency and noise reduction can be achieved in the analog domain without requiring twice the number of optical couplers or photodetectors. Similar to the previous configurations, the pump 1802 signal is provided to dual electro-optic intensity modulator 1814 that has two outputs. The first output of the modulator 1814 is encoded with the RF signal 1816 and the second output of the modulator 1814 is encoded with a complementary version of the RF signal 1816. These two encoded pump signals are provided to the multiplexers/demultiplexers 1806(*a*), 1806(*b*). The optical coupler 1812 receives the probe 1804 signal, and is further coupled to the multiplexers/demultiplexers 1806(*a*), 1806(*b*), and also provides that amplitude-modulated probe 1818 signal.

Figure 19:
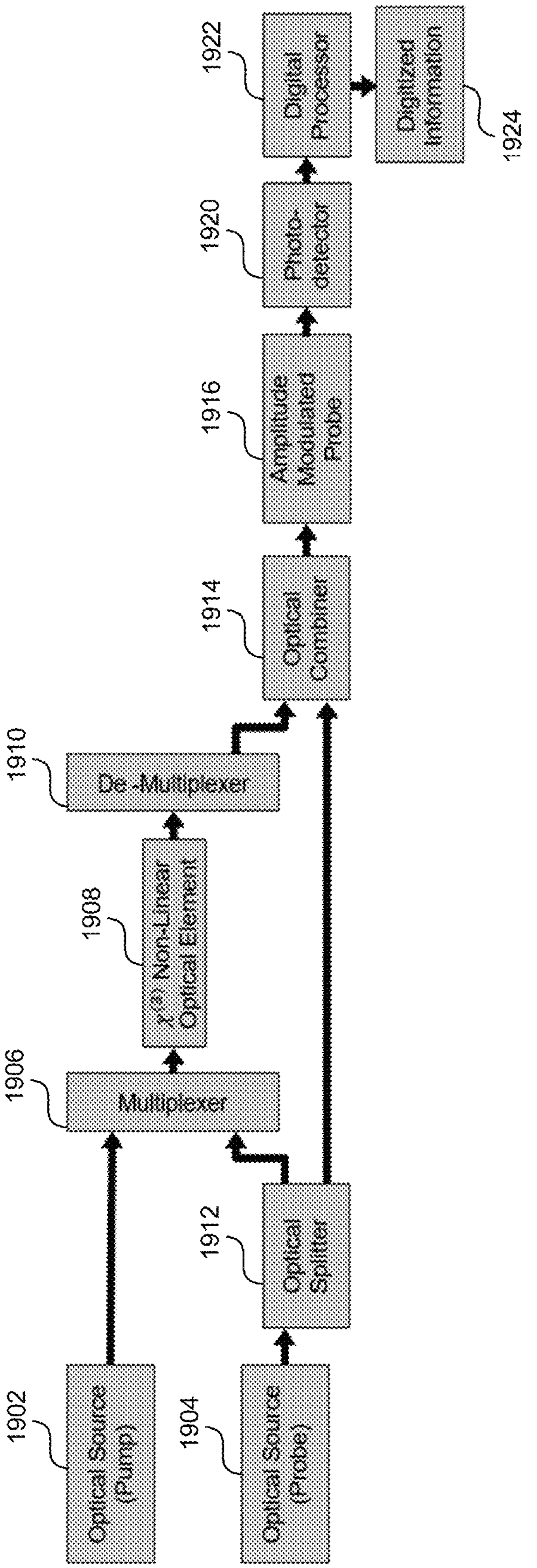
FIG. 19 illustrates an optical encoder that uses a Mach-Zehnder interferometer configuration, a photodetector and a digital process to produce digitized information in accordance with an example embodiment.
Figure 20:
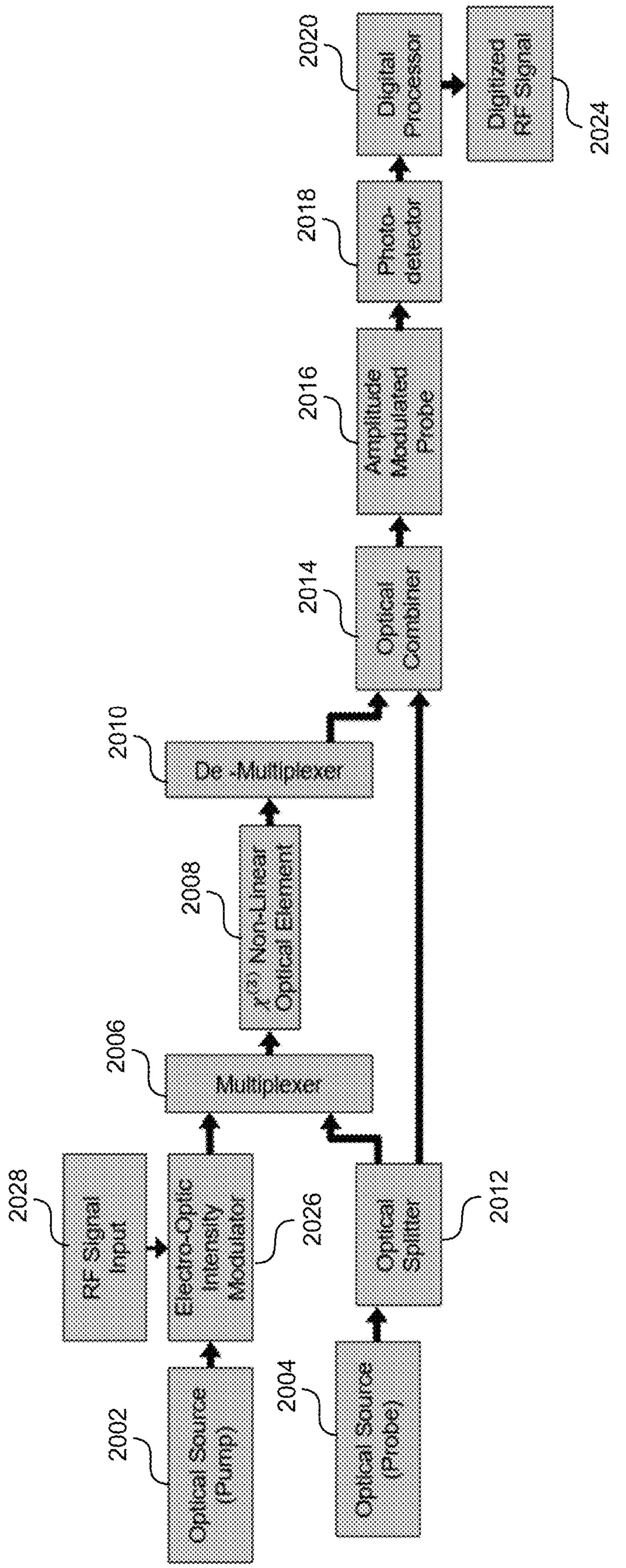
FIG. 20 illustrates an optical encoder that uses a Mach-Zehnder interferometer configuration, a photodetector and a digital process to produce a digital RF signal in accordance with an example embodiment.

Another set of embodiments use a photodetector (or multiple photodetectors) and a digital processor (or multiple digital processors) to capture the modulated probe signal(s) and to generate a digitized version of the original amplitude-encoded information of the pump, as illustrated in FIGS. 19 and 20. The photodetector (1918 and 2018 in FIGS. 19 and 20, respectively) is a device which converts an optical signal into an analog current or voltage signal. A photodetector is sensitive only to the intensity of the incident optical signal; it is not sensitive to the phase of the signal. Therefore, in these embodiments, the probe signal(s) must be interfered with a local oscillator or reference signal to convert the phase-modulated information to amplitude-modulated information. Phase-to-amplitude conversion can be done, for example, based on the previously disclosed embodiments. FIGS. 19 and 20 provide example configurations that use a Mach-Zehnder interferometer configuration. The optical combiner (1914 and 2014 in FIGS. 19 and 20, respectively) can be, for example, a single or dual output 2×2 splitter, or a 2, 3, or 4 output optical hybrid. Any and all of the amplitude-modulated probe signal outputs can be detected and processed by a photodetector (1918 and 2018 in FIGS. 19 and 20, respectively) and digital processor (1920 and 2020 in FIGS. 19 and 20, respectively). The digital processor (1920 and 2020 in FIGS. 19 and 20, respectively) can include an analog-to-digital converter to produce a raw digital version of the detected analog signal, as well as digital signal processing to undo the transfer function of the all-optical XPM and improve the fidelity of the digital signal. Digitized information (1924 in FIG. 19) and digitized RF signals (2024 in FIG. 20) can be produced by the processor. The remaining components and operations of FIGS. 19 and 20 (including the multiplexers 1906, 2006, the non-linear media 1908, 2008, the demultiplexers 1910, 2010, the optical splitters 1912, 2012 that receive, and the electro-optic intensity modulator 2026 that receive and/or manipulate the optical pump 1902, 2002, the probe 1904, 2004, and/or the RF signal 2028 signals) are similar to those previously described.

Another set of embodiments relate to improving the operations of the disclosed optical encoders and larger systems that incorporate such optical encoders based on timing error measurement methods and devices (sometimes referred to as a jitter meter (JM) or a timing measurement device). The timing measurement improve the fidelity of the recovered information by correcting for pulse-to-pulse timing jitter of the pump optical signal, probe optical signal, or both. The JM typically includes (or receives) one or more optical pulse train sources, and further includes an optical hybrid, optical filters, photodetectors, analog-to-digital converters, and a digital processor. Appendix A, at the end of this patent document, provides further details and example implementations of the timing measurement device/jitter meter.

In some embodiment, the combination of timing measurement devices and techniques with the disclosed optical encoders can improve the fidelity of the recovered information by correcting for pulse-to-pulse timing jitter. Two example embodiments that take advantage of this combination are described in connection with FIGS. 21 and 22.

Figure 21:
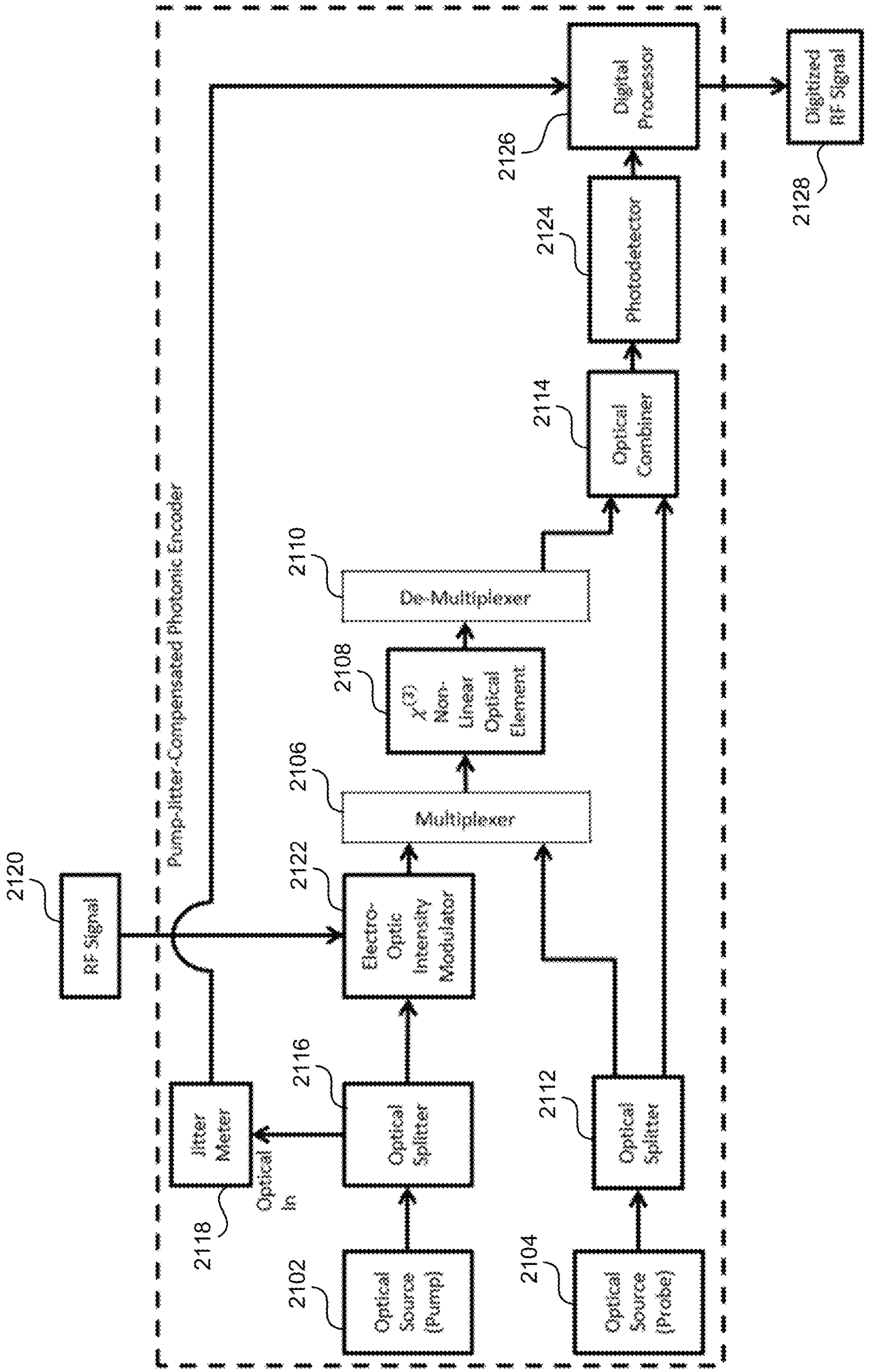
FIG. 21 illustrates a pump-jitter-compensated all-optical encoder in accordance with an example embodiment.

FIG. 21 illustrates a pump-jitter-compensated all-optical helix encoder in accordance with an example embodiment. This embodiment uses the jitter measurement of pump in the digital processor to reduce the pump-jitter-induced noise of this XPM-based RF digitization system. The configuration of FIG. 21: (1) feeds the pump 2102 into an optical splitter 2110; (2) one output of that splitter 2110 is sent into a jitter meter 2118 to measure the pump jitter; (3) the other part of pump 2102 signal power is sent into an electro-optic intensity modulator 2122 and is modulated in intensity by the RF signal 2120; (4) the intensity-modulated pump is fed into a multiplexer 2106; (5) the probe 2104 is fed into an optical splitter 2112; (6) one output of the splitter 2112 is fed into a multiplexer 2106; (7) the output of the multiplexer 2106, which includes the intensity-modulated pump and probe, is fed into the nonlinear optical element 2108 ($\chi^{(3)}$ effect); (8) in the $\chi^{(3)}$ nonlinear optical element 2108, the pump modulates the phase of the probe with its intensity modulation information; (9) the phase-modulated probe obtained at the output of the demultiplexer 2110 is combined with the probe in an optical combiner 2114, generating an intensity-modulated probe; (10) the intensity-modulated probe is provided to the photodetector 2124, the output of which comprises electrical signals indicative of the detection information; (11) the photodetected intensity-modulated probe is digitized (this can be done at the photodetector, at an input of the digital processor 2116, or via a separate conversion component; (12) the digital processor 2116 undoes the transfer function of the $\chi^{(3)}$ nonlinear optical element, removes the jitter of the pump based on the information provided by the jitter meter 2118, and undoes the transfer function of the electro-optic intensity modulator to recover the RF signal as a digitized RF signal 2128. Therefore, the configuration of FIG. 21 improves the recovery of the RF signal by accounting for the jitter of the pump that can be measured on a pulse-by-pulse basis in real time.

Figure 22:
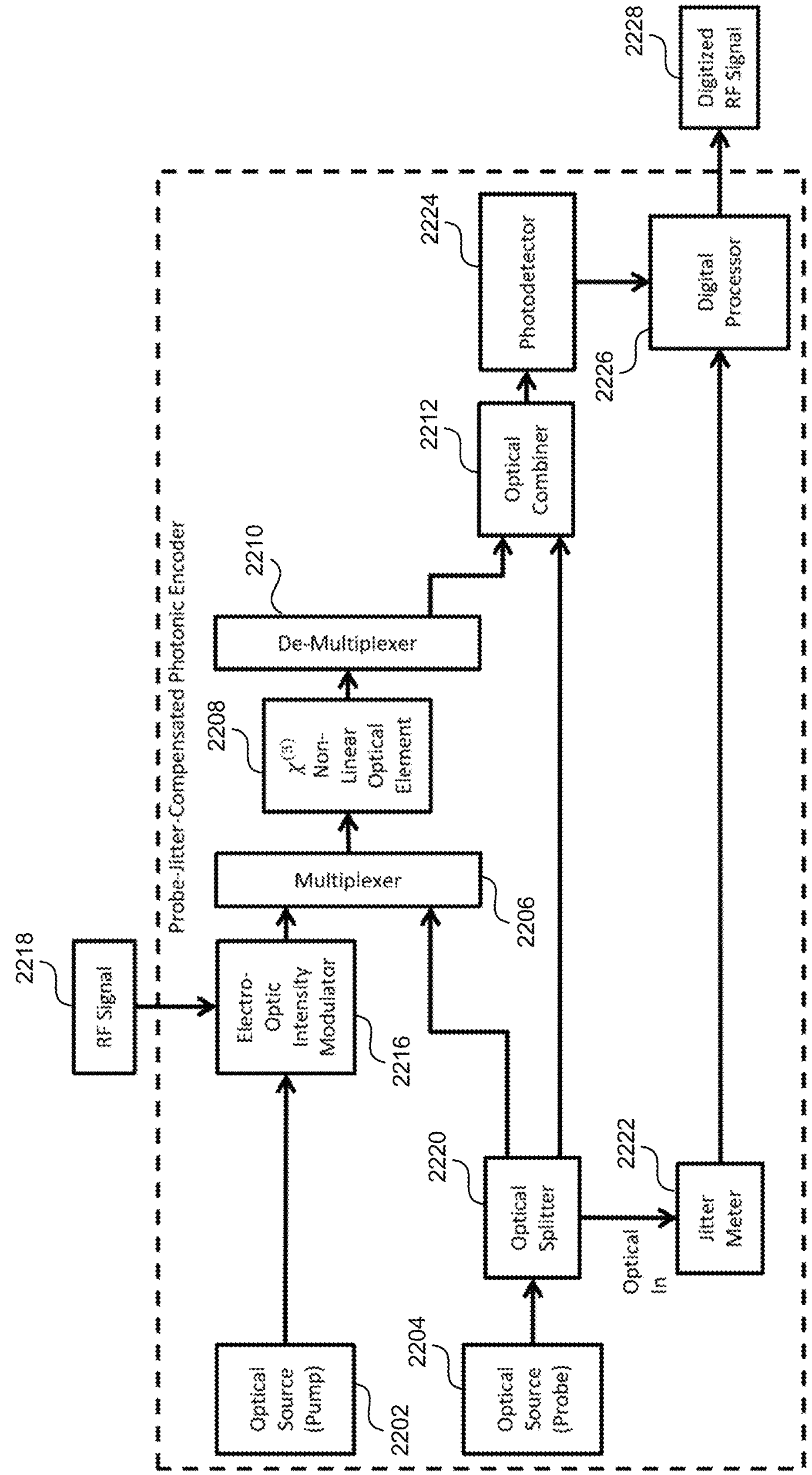
FIG. 22 illustrates a probe-jitter-compensated all-optical encoder in accordance with an example embodiment.

FIG. 22 illustrates a probe-jitter-compensated all-optical helix encoder in accordance with an example embodiment. In this configuration, (1) the jitter meter 2222 measures the jitter of the probe 2204 instead of the pump 2202 using an additional copy of the probe produced by the optical splitter 2220 that is fed into the jitter meter 2222; (2) the pump 2202 does not need to be split before the electro-optic intensity modulator 2216, the output of which along with the probe signal 2204 provided by an output for the optical splitter 2220 are received by the multiplexer 2206; (3) the optical combiner 2212 receives an output of the demultiplexer 2210 and the probe signal from the optical splitter 2220; the photodetector 2224 converts the optical signals output from the optical combiner 2212 into electrical signals and provides them to the digital processor 2226, which removes the jitter of the probe, undoes the transfer function of the $\chi^{(3)}$ nonlinear optical element 2208, and undoes the transfer function of the electro-optic intensity modulator 2216 to recover the RF signal 2218 as a digitized RF signal 2228. In this configuration, the recovery of the RF signal is improved by accounting for the jitter of the probe that can be measured on a pulse-by-pulse basis in real time. It should be noted that various disclosed embodiments can be combined to provide additional improvements.

Figure 23:
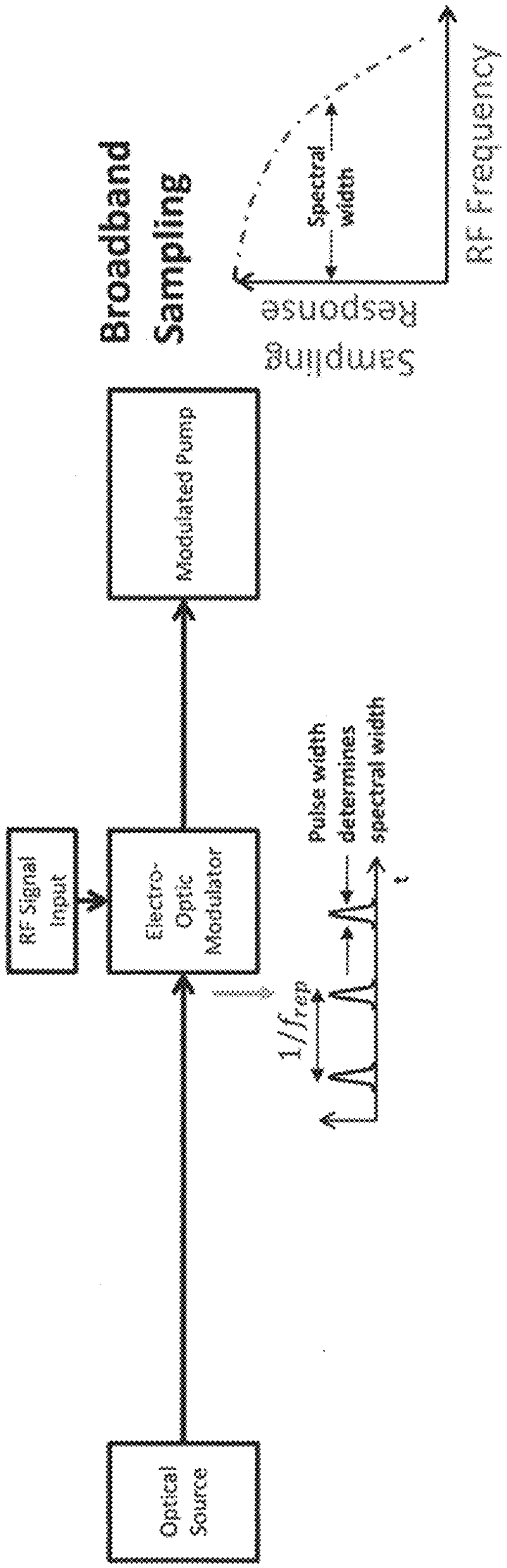
FIG. 23 illustrates a block diagram representing a traditional sampling system.

Another aspect of the disclosed embodiments relates to using a photonic filtered sampler to filter the response of the photonic sampler to the RF signal input. Traditional photonic samplers, which use an optical source and electro-optic modulator to encode RF signal information on optical pulses, have a response to RF signal input frequencies that falls off with frequency, and the spectral width of this response varies inversely with the pulse width of the optical source. A block diagram representing such traditional systems, a set of input pulses and the associated sampling response are illustrated in FIG. 23.

Figure 24A:
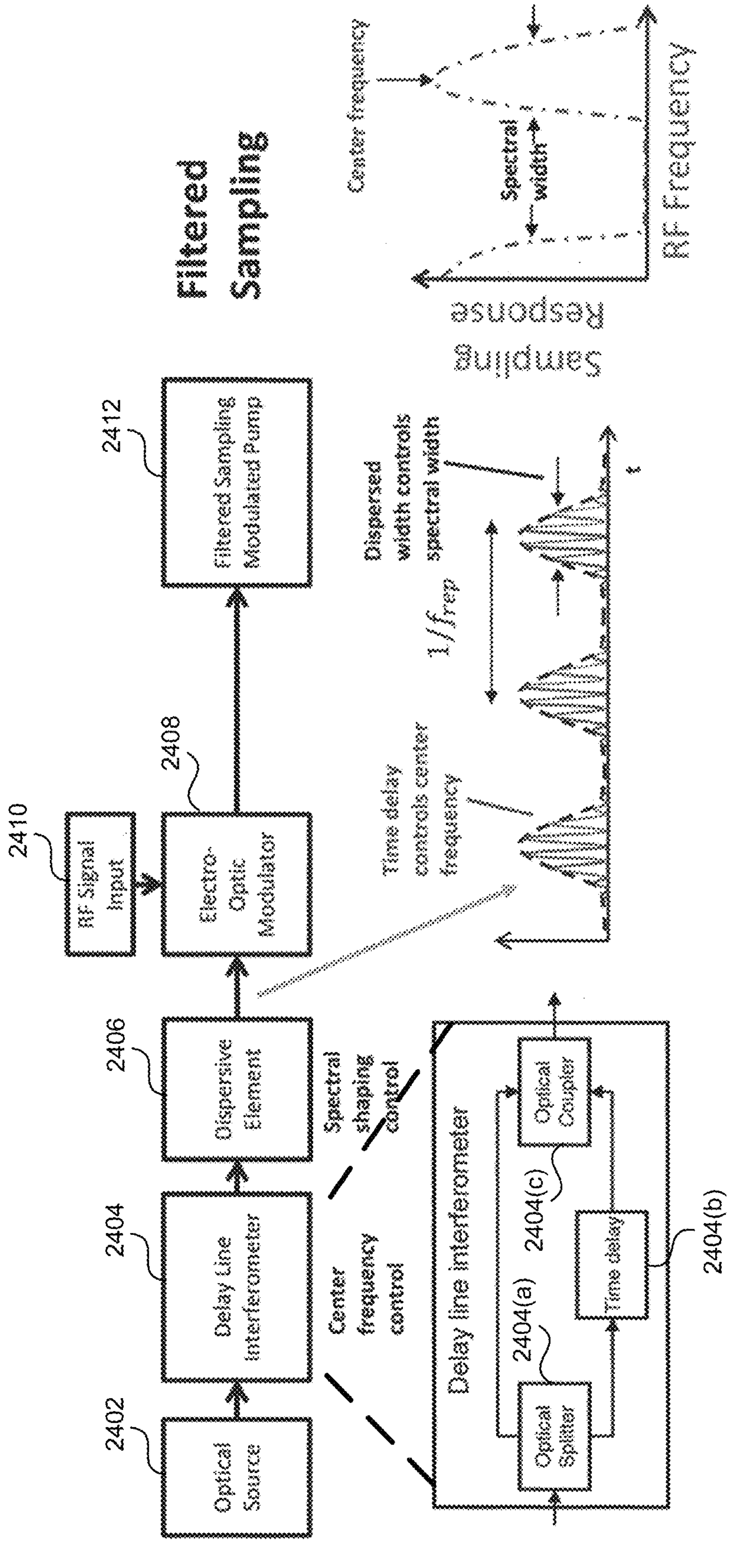
FIG. 24(*a*) illustrates a block diagram and associated plots for a filtered photonic sampler in accordance with an example embodiment.
Figure 24B:
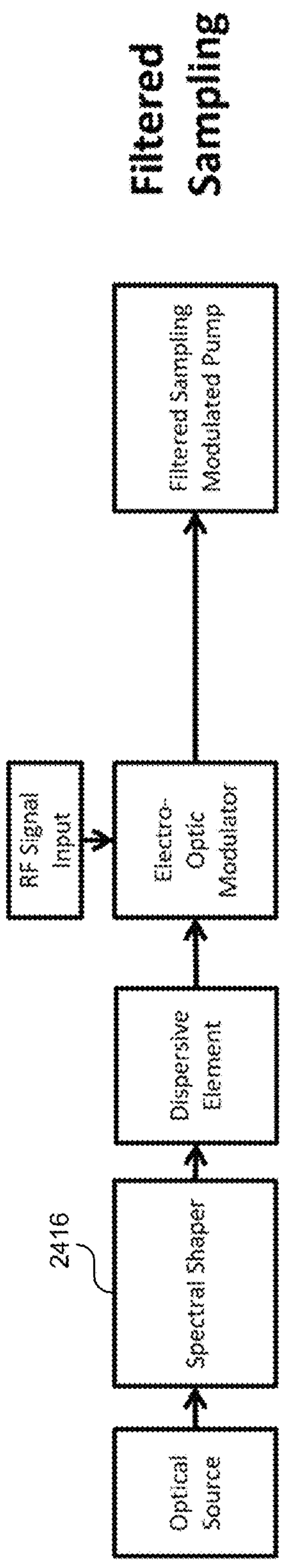
Figure 24C:
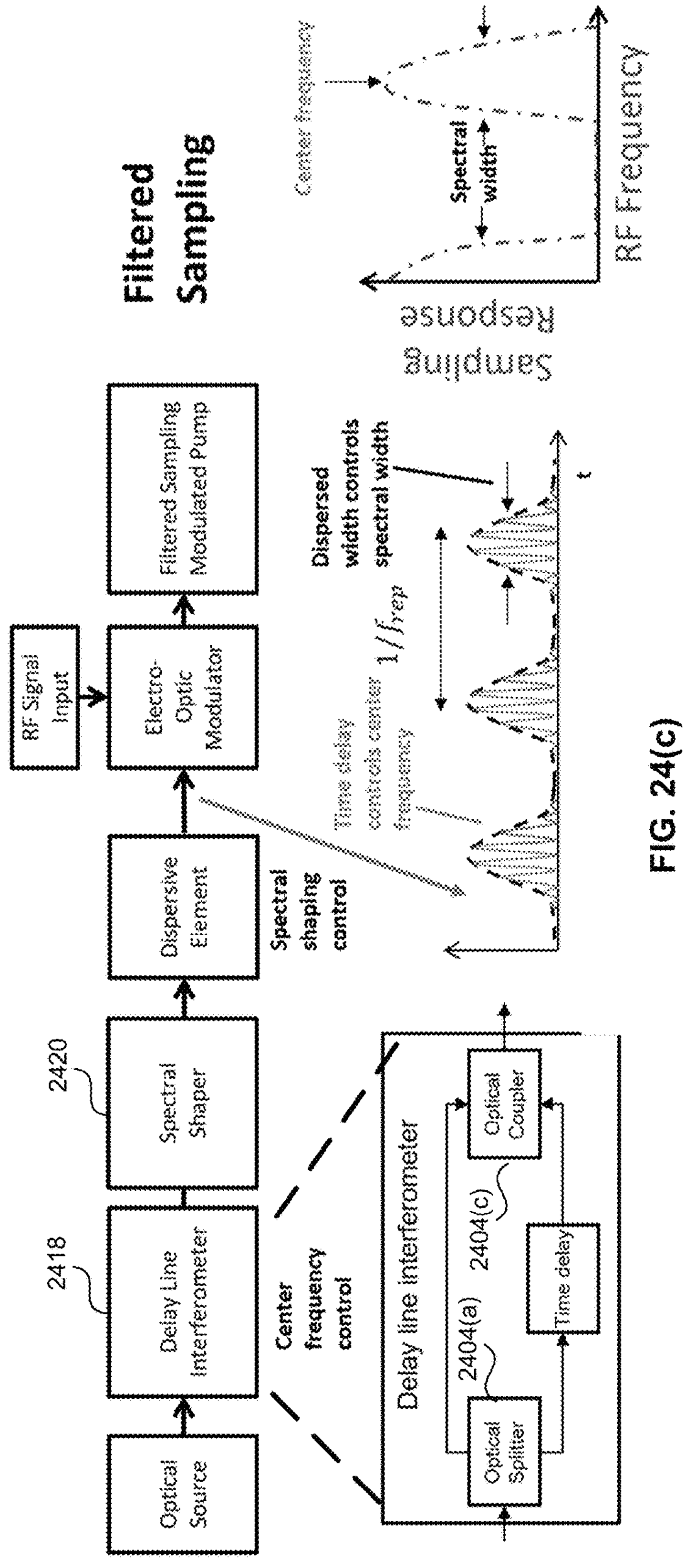

For some applications, it is desired to filter out signal and noise content outside of an RF frequency band of desired spectral width and center frequency. In accordance with some example embodiments, by inserting a delay line interferometer and/or a spectral shaper (see also FIG. 36) and a dispersive element between the optical source and electro-optic modulator, the photonic sampler is able to filter content outside of a band around 0 frequency and a desired center frequency, both with a desired spectral width. FIG. 24(*a*) illustrates a block diagram and associated plots for a photonic filtered sampler in accordance with an example embodiment. In FIG. 24(*a*), the optical source 2402 is provided to a delay line interferometer 2404, the output of which is received by a dispersive element 2406. The photonic filtered sampler causes the pulses to gain a width of the envelope of the pulses proportional to the strength of the dispersive element 2406, and a temporal fringe pattern with a frequency of fringes proportional to the strength of the dispersive element 2406 and the time delay in the delay line interferometer 2404. The inset in FIG. 24(*a*) illustrates one example implementation of the delay line interferometer 2404. In this configuration, the optical splitter 2404(*a*) receives the optical source 2402 and provides one output (that forms one arm of the interferometer) unchanged to the optical coupler 2404(*c*); the other output of the splitter 2404(*a*) is received by a time delay element 2404(*b*) before reaching the optical coupler 2404(*c*). In some implementations, the delay line interferometer is fixed, while in some embodiments, it can be tunable via various means: a tunable time delay by, e.g., a mechanical free space stage, a pair of input/output switches with an array of fixed time delays, a phase shifter (e.g., heater, fiber stretcher, carrier injection) to tune the fringe phase relative to the envelope, or a pair of input/output switches with an array of fixed delay line interferometers. In some implementation, the dispersive element is fixed, while in some embodiments, it can be tunable via various means, such as via a heater, or a pair of input/output switches with an array of fixed dispersive elements. While the configuration of FIG. 24(*a*) can be a photonic bandpass-filtered sampler, it is understood that the disclosed technology applies to other types of filtered samplers, such as multi-band pass filters, band stop filters, and the like.

FIG. 24(*b*) illustrates another example embodiment of a photonic filtered sampler in accordance with an example embodiment. The components in FIG. 24(*b*) are similar to those in FIG. 24(*a*) except for a spectral shaper 2416 that is used to modify the spectral shape of the optical source. Non-limiting examples of the spectral shaper include an optical filter, made with thin-film or Bragg grating technologies; a diffraction grating to separate the optical frequencies in space, a spatial light modulator to alter the insertion loss of each optical frequency individually, and the original or another diffraction grating to combine the optical frequencies back together. FIG. 24(*c*) illustrates yet another example embodiment of a photonic filtered sampler. In this example configuration, both a delay line interferometer 2418 and a spectral shaper 2420 are used prior to the dispersive element.

Figure 25A:
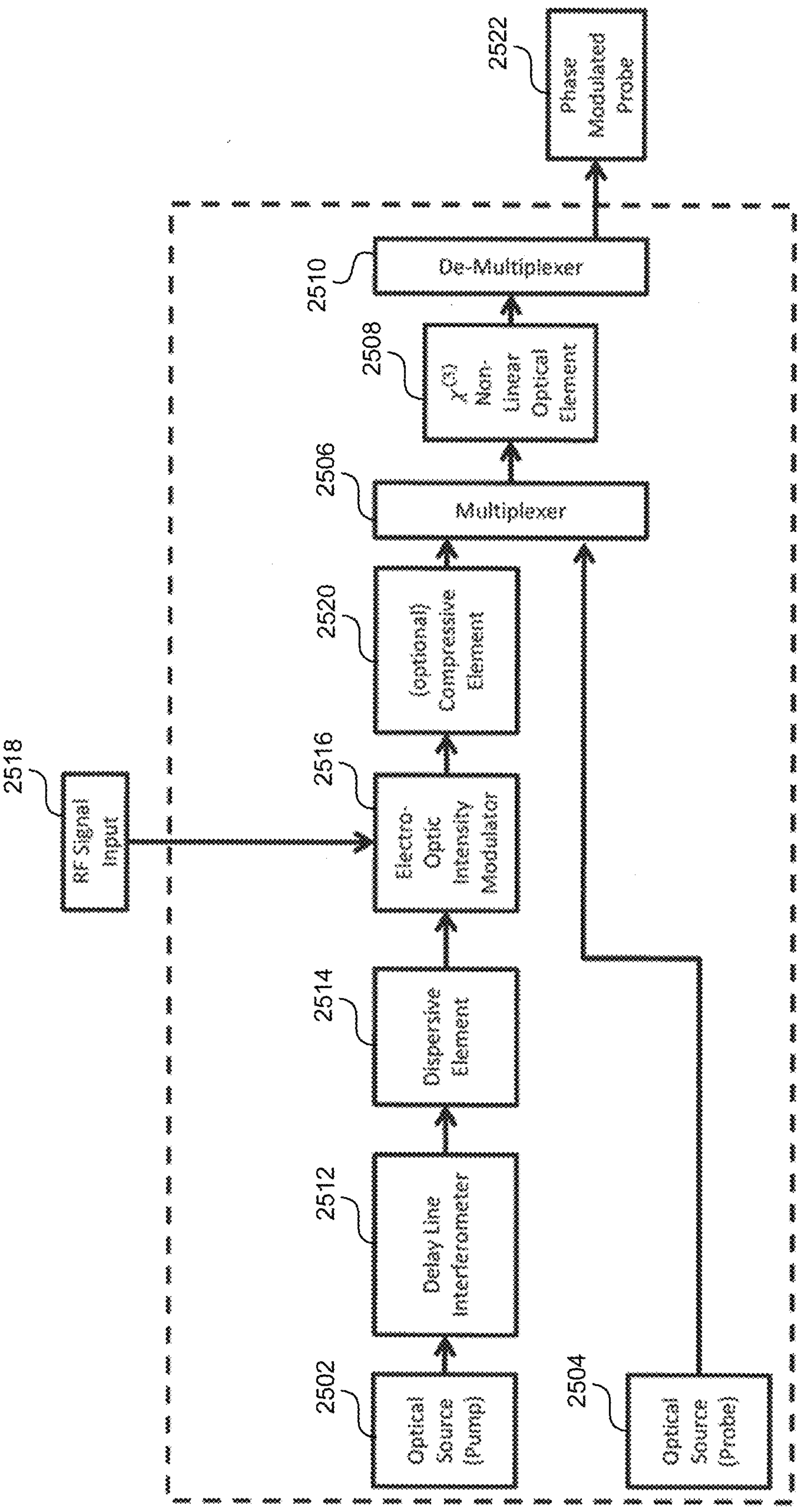
FIG. 25(*a*) illustrates a block diagram of a filtered photonic encoder in accordance with an example embodiment.
Figure 25B:
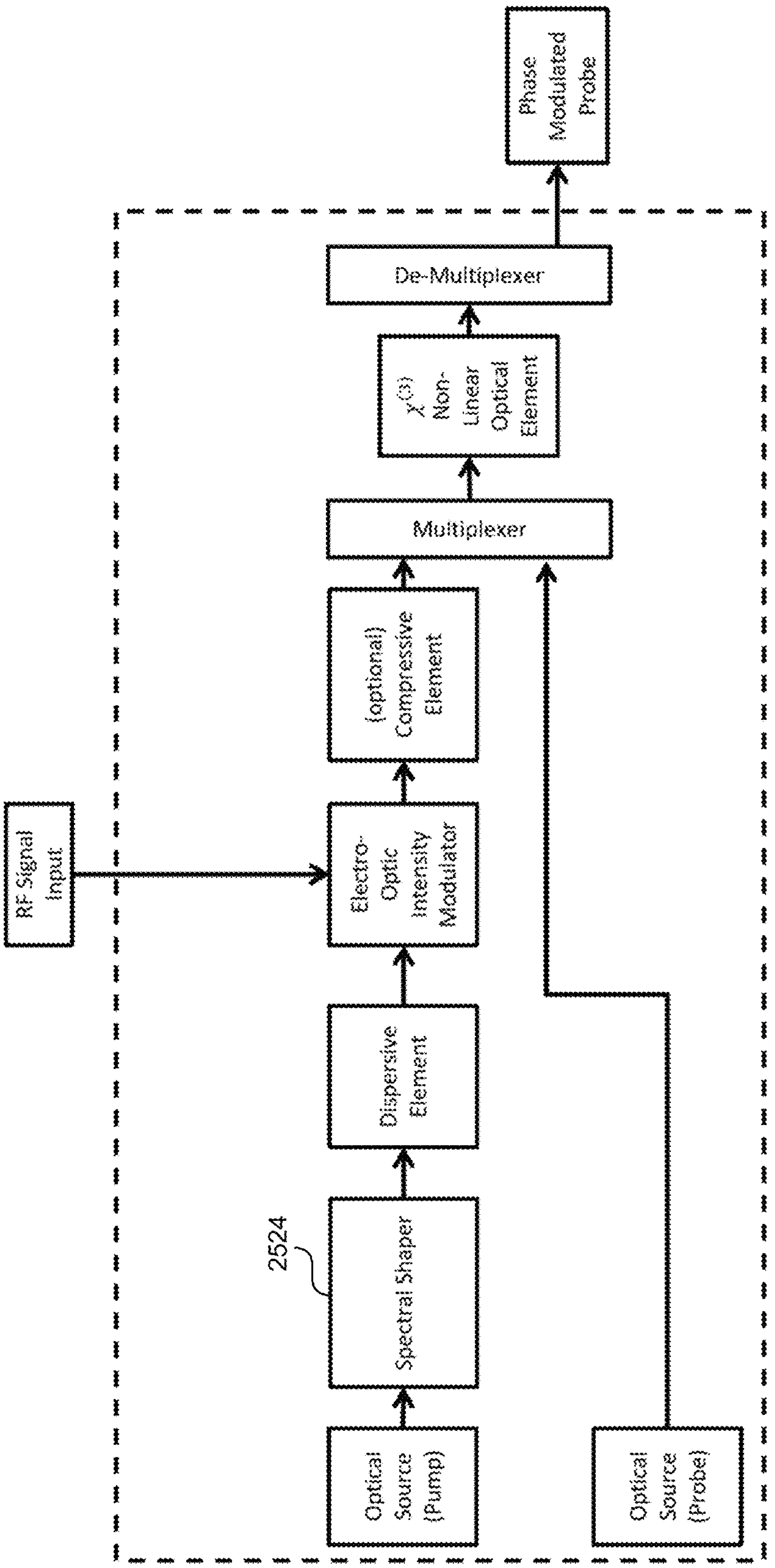

FIG. 25(*a*) illustrates a block diagram of a filtered photonic encoder in accordance with an example embodiment. In the configuration of FIG. 25(*a*), the delay line interferometer 2512 and the dispersive element 2514 are inserted between the optical source 2502 (pump) and the electro-optic intensity modulator 2516 (similar to the configuration of FIG. 24(*a*)), along with an optional compressive element 2520. The compressive element 2520 may be desirable in, for example, configurations that are designed for the pump 2502 and probe 2504 to walk-off from each other, which can cause the width of the pump 2502 optical signal to shrink with respect to the probe 2504 signal so that the phase induced on the probe is sensitive to the pump's energy rather than its pulse shape. The output of the compressive element 2520 is provided to the multiplexer 2506, which also receives the probe 2504 signals and provides the multiplexed optical signal to the non-linear medium 2508. The walk off effect of the non-linear medium 2508 was previously described in connection with FIG. 7. The phase-modulated probe 2522 is obtained at the output of the demultiplexer 2510. Similar to FIG. 24(*a*), the configuration of FIG. 25(*a*) enables filtering out signal and noise content outside of an RF frequency band of desired spectral width and center frequency.

FIG. 25(*b*) illustrates a block diagram of a filtered photonic encoder in accordance with another example embodiment. The components in FIG. 25(*b*) are similar to those in FIG. 25(*a*) except for the spectral shaper 2524 that is used prior to the dispersive element similar to the configuration in FIG. 24(*b*).

Another aspect of the disclosed embodiments relates to a new type of optical hybrid coupler, which uses the Faraday magneto-optic effect to provide non-reciprocal dual functionality depending on propagation direction. Specifically, in one direction (which will be termed the "forward propagating direction") this dual-function hybrid ("DFH") operates as a one-by-two (1×2) coupler with a certain coupling ratio (e.g., 50%), and in the opposite direction (which will be termed the "backward propagating direction") it operates as an optical hybrid with a certain coupling ratio (e.g., 50%).

This non-reciprocal dual functionality can be useful in applications such as bi-directional interferometers (e.g., Sagnac or Michelson). At the input of such bi-directional interferometers, the incoming optical beam need only be split into two optical beams, one for each arm of the interferometer; at the output of the interferometer, it can be advantageous for the beams from each arm to be combined in both an in-phase and a quadrature configuration, thus requiring an optical hybrid. If a standard optical hybrid is used for such applications, at the input to the interferometer the optical beam will be split into four beams, of which only two are used. This unnecessary four-way splitting in the forward propagating direction results in a coupling ratio dependent loss (e.g. 50%). With the DFH, the forward propagating beam is split into only two beams, thus avoiding unwanted optical loss.

Figure 26A:
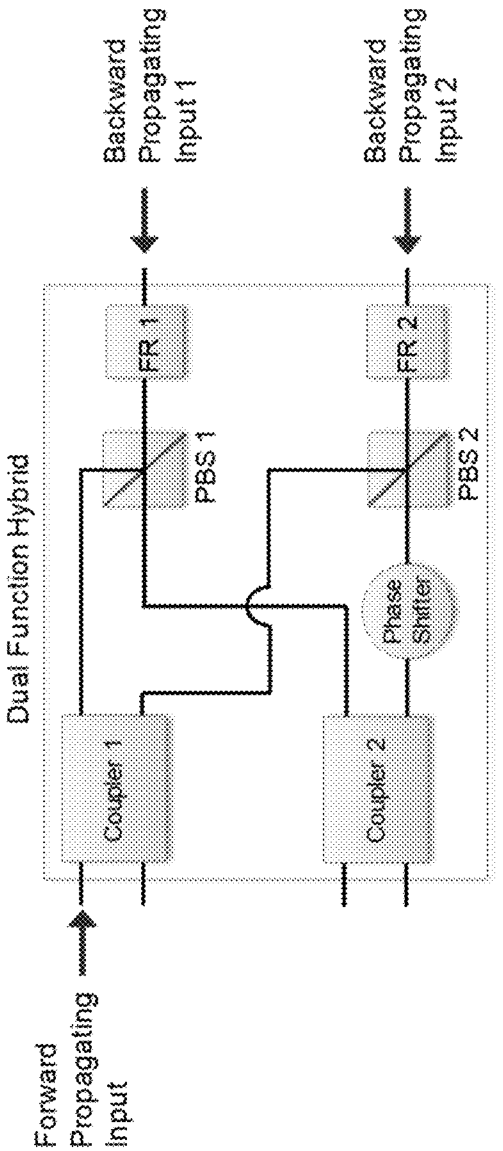
FIG. 26(*b*) illustrates a set of forward propagating optical paths in a dual function hybrid in accordance with an example embodiment.
Figure 26B:
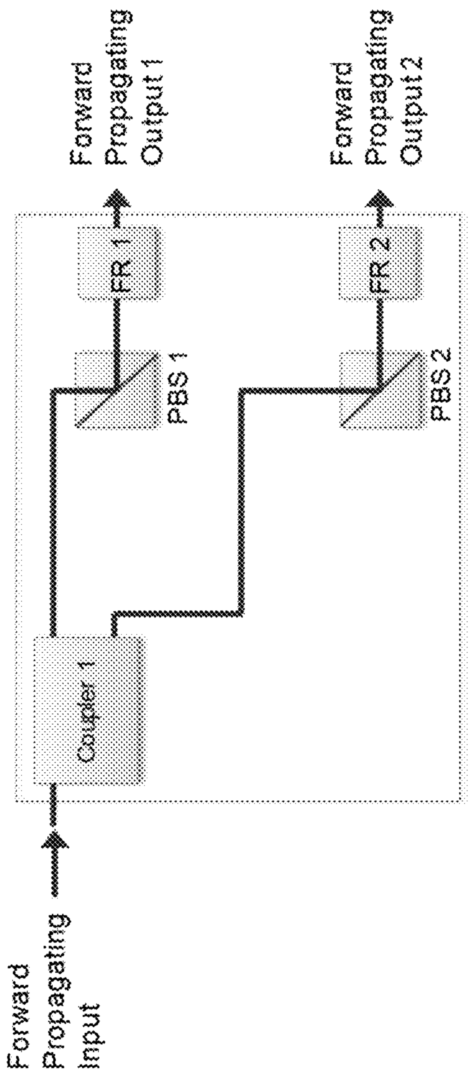
Figure 26C:
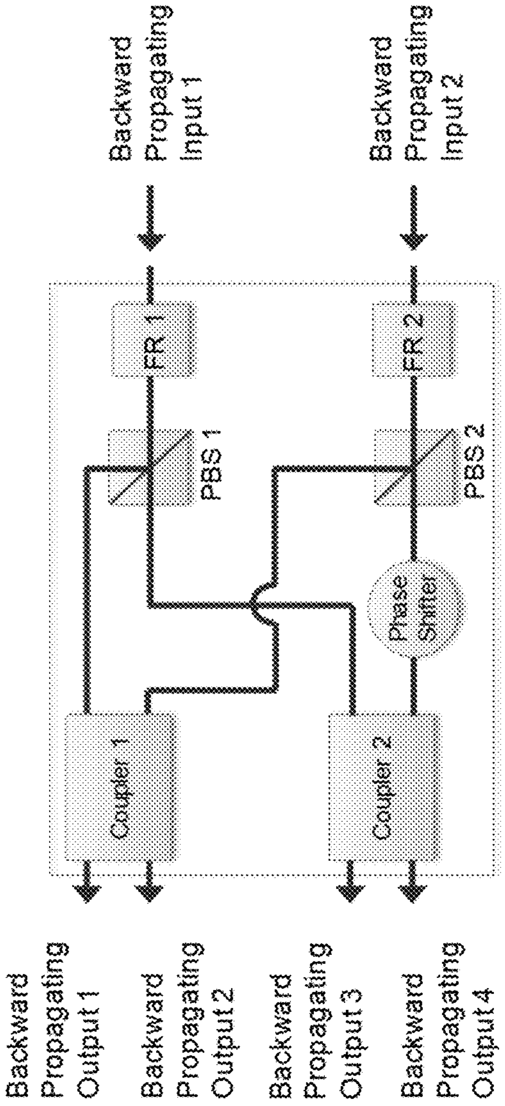

One implementation of the DFH is illustrated in FIGS. 26(*a*)-(*c*). The lines indicate the path of the beam in FIG. 26(*a*); the arrowed lines indicate the paths traversed by the forward propagating beams in FIG. 26(*b*), and backward propagating beams in FIG. 26(*c*). Where beam paths intersect at a semicircle, this indicates that the beams cross each other unimpeded and unaffected. The device can be implemented physically using free space optics, fiber optics, integrated optics, or any combination thereof.

In operation, the incoming optical beam in the forward propagating direction (FIG. 26(*b*)) is polarized. The forward propagating beam enters one of two inputs of one of two couplers (in the implementation of FIGS. 26(*a*)-(*c*), the input is sent to the top input of Coupler1). The beam is split into two beams with a certain coupling ratio (e.g., 50%), and each beam is sent to a polarization beam splitter ("PBS"). The axis of the incoming polarization must be aligned such that substantially all of the forward propagating light is either reflected from or transmitted through each PBS (in the implementation of FIGS. 26(*a*)-(*c*), all the light is reflected). The two optical beams then pass through two Faraday rotators ("FR"). The FR's rotate the polarization states of the beams by certain amounts (e.g., 22.5°). The direction and magnitude of polarization rotations in the two FR's can be the same or they can be different from each other. After the FR's, the two beams exit the DFH. The final result of passing through the DFH in the forward propagating direction is to split the original incoming beam into two beams, with a coupling ratio equal to that of Coupler1.

Upon reflection (e.g., from a Michelson interferometer) or routing from one port to the other (e.g., inside of a Sagnac interferometer), the beams enter the DFH from the right side as seen in FIG. 26(*c*) and traverse in the backwards propagating direction through the DFH. The beams pass through the two FR's again, wherein they each receive a second polarization. Due to the non-reciprocal nature of the Faraday magneto-optic effect, the direction of polarization rotation through the FR's is the same in the forward and backward propagating directions.

Figure 27A:
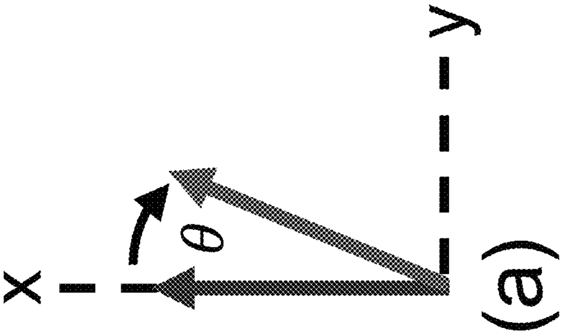
FIG. 27(*a*) illustrates polarization states of optical beams in a dual function hybrid in a forward propagating direction in accordance with an example embodiment.
Figure 27B:
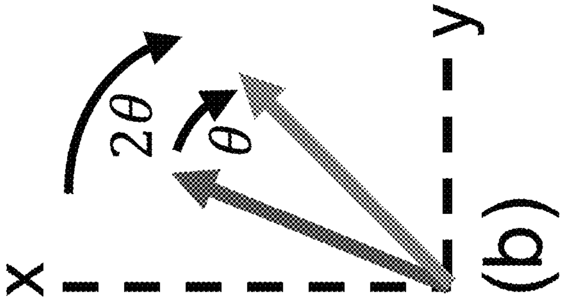

Critical to how the DFH operates are the relative polarization states of the beams at the Forward Propagating Outputs and at the Backward Propagating Inputs. One particularly important case is when the polarization states of the outgoing and incoming beams are the same. This scenario is illustrated in FIG. 27, which shows the polarization state of the beams at various points in the DFH, in an implementation in which the polarization states at the forward propagating output and backward propagating input are the same. In FIG. 27(*a*), the polarization states in the forward propagating direction are depicted. The arrowed line along the X-axis represents the polarization state of the beam before the FR. The arrowed line at an angle, θ, represents the polarization state after the FR, at the output of the DFH. The FR rotates the polarization by on amount equal to θ in the clockwise direction. FIG. 27(*b*) illustrates the polarization states in the backward propagating direction. The first arrow (from left) represents the polarization state of the incoming beam before the FR, and the second arrow represents the polarization state after the FR, before the PBS. The FR rotates the polarization again by an amount equal to θ in the clockwise direction. Because the polarization states at the forward propagating output and backward propagating input are the some, the total rotation received by the beams is equal to 2θ.

Providing the same polarization states can be achieved automatically with direct reflection (e.g., in a Michelson interferometer) or in careful steering of the polarization states from forward propagating outputs to backward propagating inputs. In such a case, the total rotation applied to each beam is the sum of the angle of rotations of each FR (e.g., 2×22.5°=45°). Because of the polarization rotations, the two backward propagating beams can have polarization states that will both be transmitted and reflected by the PBS, whereas in the forward propagating direction all the light was either transmitted or reflected. Therefore, upon incidence on the PBS, each backward propagating beam, in general, splits into two orthogonally polarized beams. The ratio of reflected and transmitted light from the PBS depends on the amount of total rotation (e.g., 45° rotation would lead a 50% split). One beam from each PBS is sent to one of the 2×2 couplers to combine with and interfere with one of the beams from the other PBS. One of the four beams (in FIG. 26(*c*), it is the bottom beam) is passed through a phase shifter (e.g., a time delay) which shifts the phase of the beam relative to the other by a certain amount (e.g., 90° to enable quadrature interference) before combining in the 2×2 coupler. It is important to ensure that the polarization states of the inputs to each coupler in the backward propagating direction are the same.

Figure 28A:
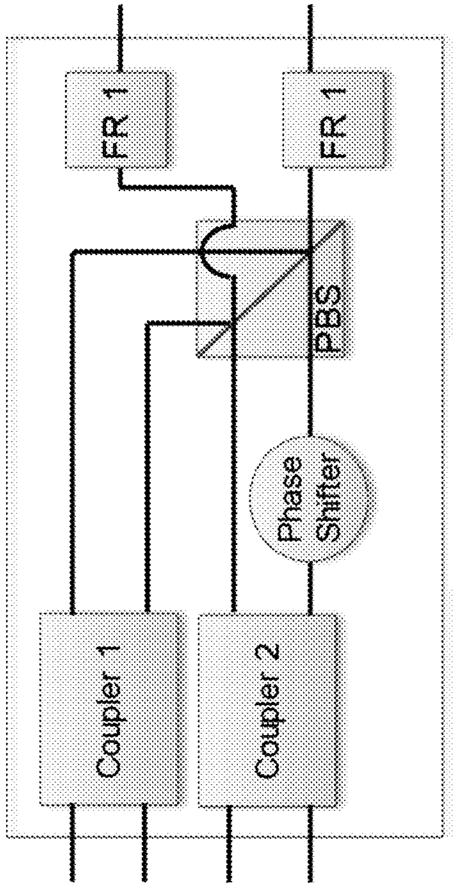
FIG. 28(*a*) illustrates another implementation of a dual function hybrid in accordance with an example embodiment.
Figure 28B:
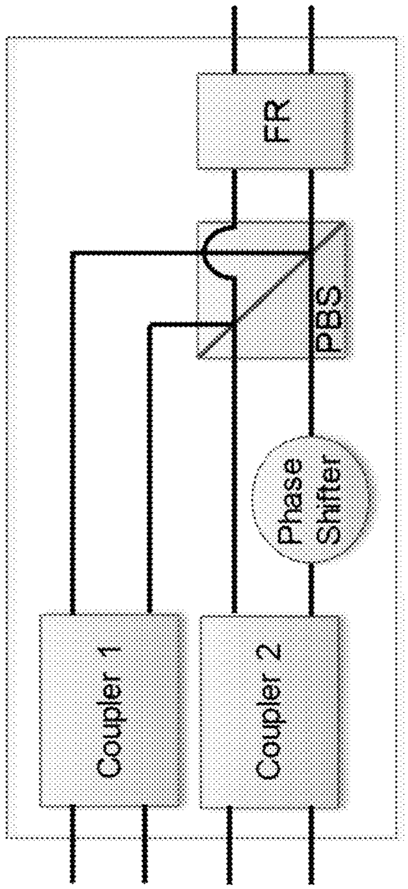

The dual function hybrid can be implemented in various other configurations. For example, one implementation uses only one PBS (FIG. 28(*a*)), and one which uses one PBS and one FR (FIG. 28(*b*)). These configurations operate based on the same principles discussed in connection with FIGS.

26($a$)-($c$), and provide the appropriate functionality as long as the two beams are modally or spatially separate inside of the common optical elements.

Figure 29:
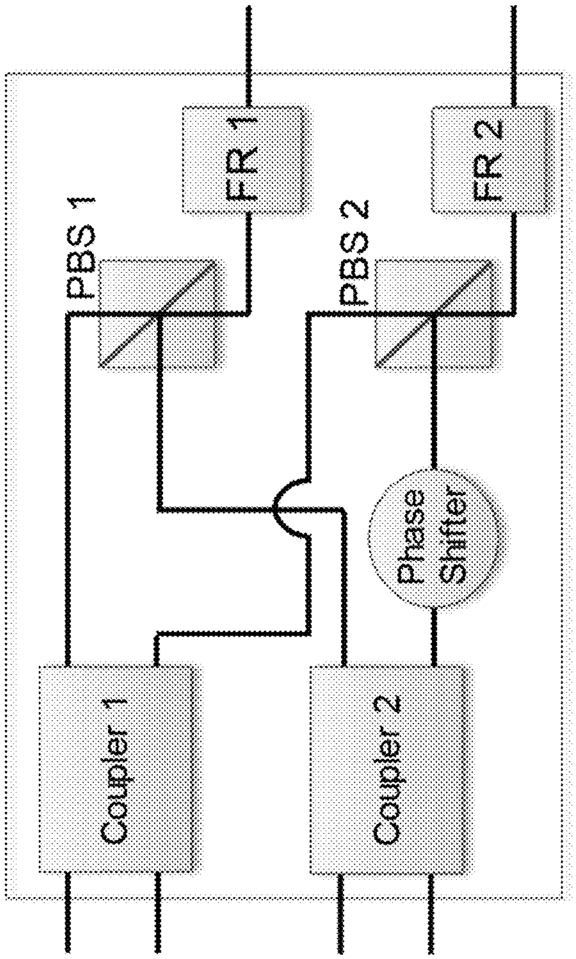
FIG. 29 illustrates another implementation of a dual function hybrid in accordance with an example embodiment.

In another implementation as shown in FIG. 29, the configuration of components is similar to the implementation of FIG. 26($a$), except that the input polarization of FIG. 29 should be aligned orthogonally to the input polarization of FIG. 26($a$). In such a way, in the forward propagating direction, all of the light is transmitted through each PBS, instead of being reflected.

Figure 30:
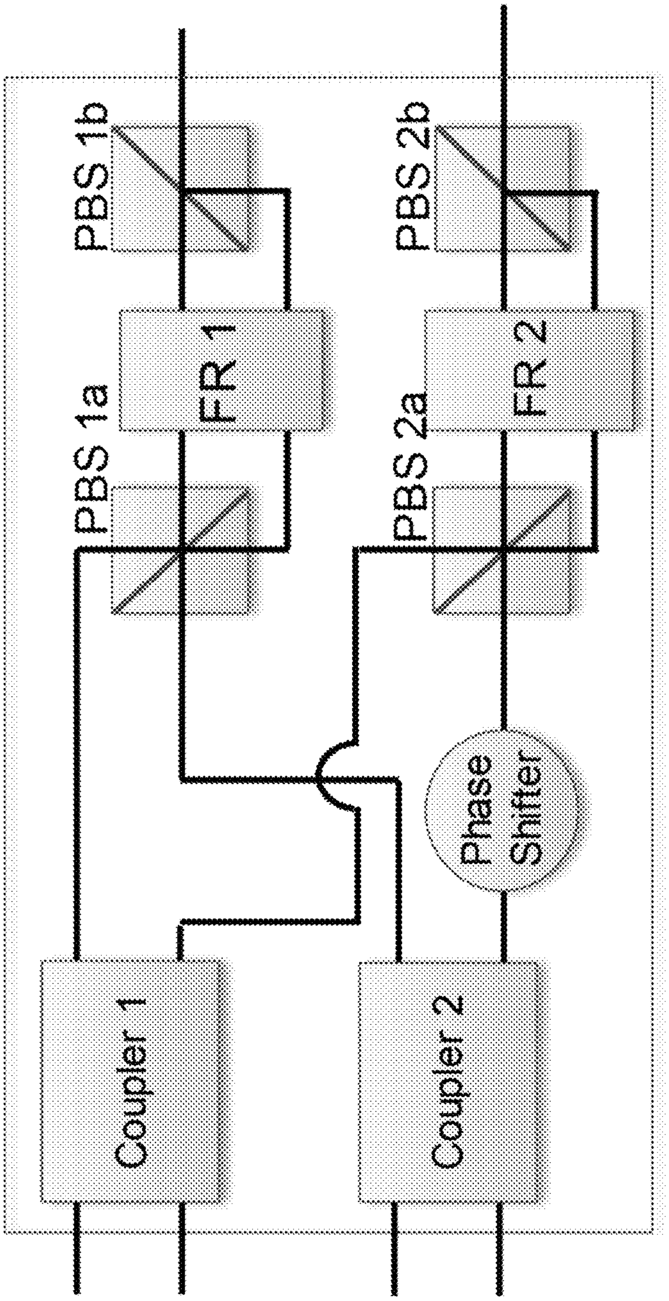
FIG. 30 illustrates another implementation of a dual function hybrid based on a combination of the configurations of FIGS. 26(*a*)-(*c*) and 29 in accordance with an example embodiment.

The implementations of FIGS. 26($a$)-($c$) and FIG. 29 can be combined, as shown, for example, in the configuration of FIG. 30. In this implementation, the two different input polarization states are split in the forward propagating direction by the PBSs (PBS1*a* and PBS2*a*), sent through FRs and then recombined by being polarization multiplexed in a second pair of PBSs (PBS1*b* and PBS2*b*). Such an implementation can be useful in an application using polarization multiplexing.

Figure 31A:
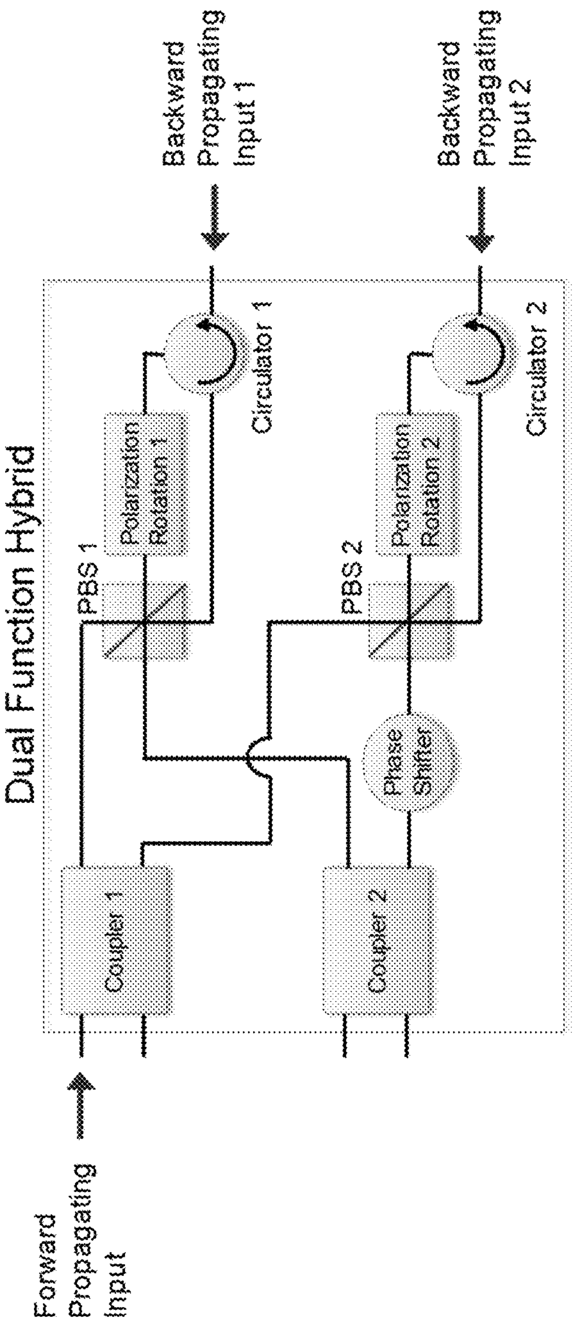
FIG. 31(*a*) illustrates a set of optical paths in a dual function hybrid that utilizes optical circulators in accordance with an example embodiment.
Figure 31B:
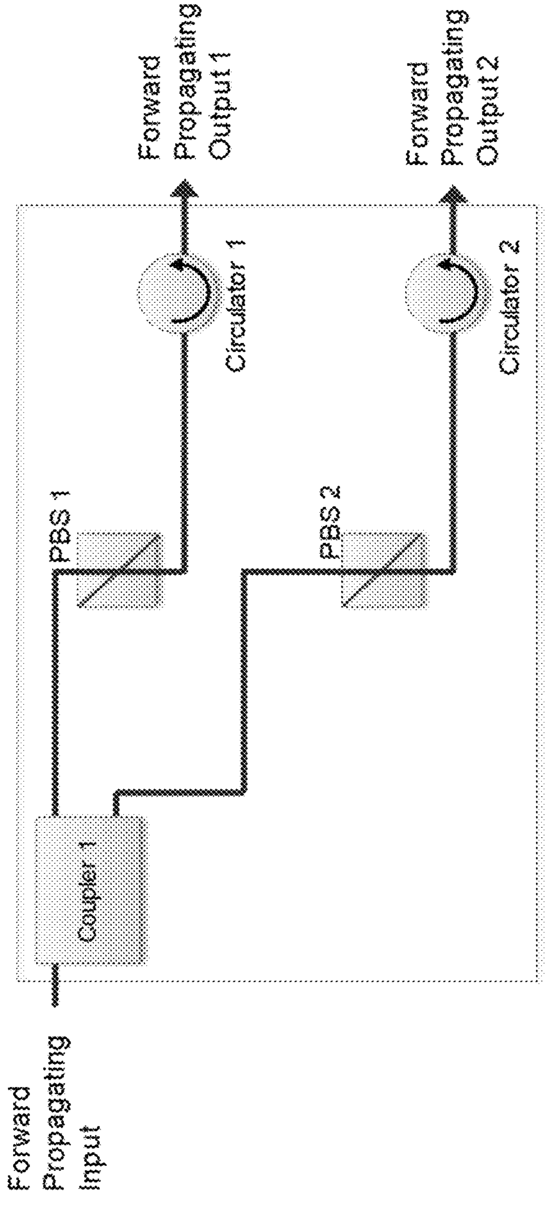
Figure 31C:
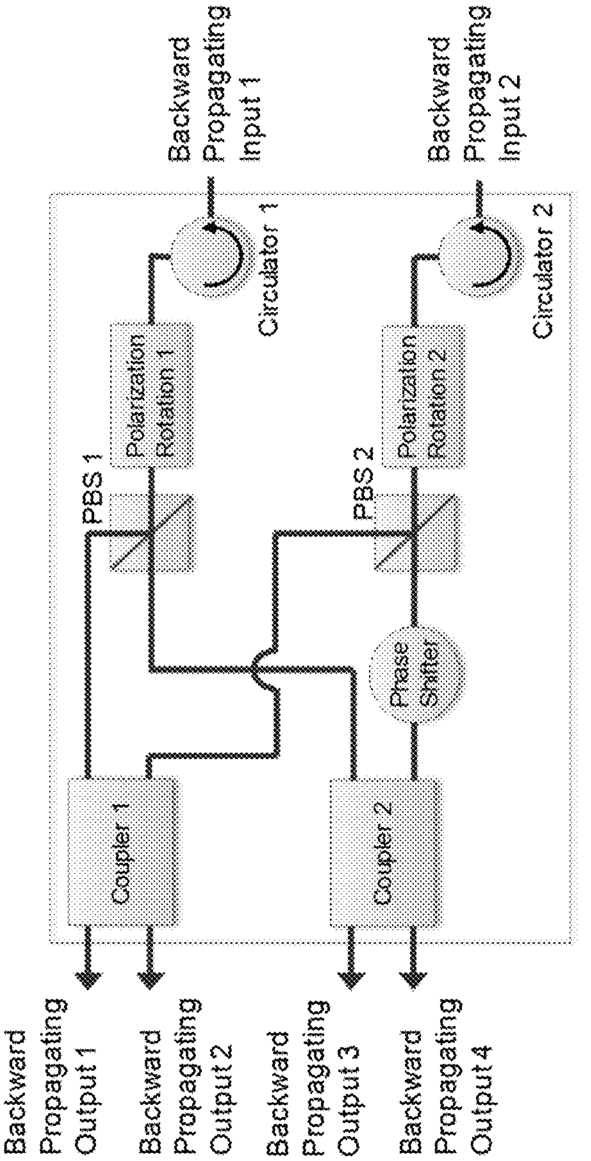

The DFH can be implemented using optical circulators, as well, as shown in the example configuration of FIG. 31($a$)-($c$). Optical circulators are three port non-reciprocal optical devices. In FIG. 31($b$), the forward propagating beam is split in Coupler1 into two beams with a certain coupling ratio (e.g., 50%). The polarization of the input beam is aligned so that all light is either transmitted or reflected by PBS1 and PBS2 (in FIG. 31($b$) all light is transmitted). The beams are sent to circulators which send the beams to the forward propagating outputs of the DFH. In the backward propagating direction (FIG. 31($c$)), the two beams are sent to the circulators and are then sent to polarization rotators (e.g., a waveplate). The polarization rotation is of a certain amount (e.g.45°). The beams are then sent to PBS's, wherein they are split into two orthogonally polarized beams, with a coupling ratio dependent on the polarization rotation (e.g., 45° rotation would lead a 50% split). One beam from each PBS is sent to one of the 2×2 couplers to combine with and interfere with one of the beams from the other PBS. One of the four beams (in FIG. 31($c$) it is the bottom beam) is passed through a phase shifter (e.g., a time delay) which shifts the phase of the beam relative to the other by a certain amount (e.g., 90° to enable quadrature interference) before combining in the 2×2 coupler. It is important to ensure that the polarization states of the inputs to each coupler in the backward propagating direction are the same.

Figure 32A:
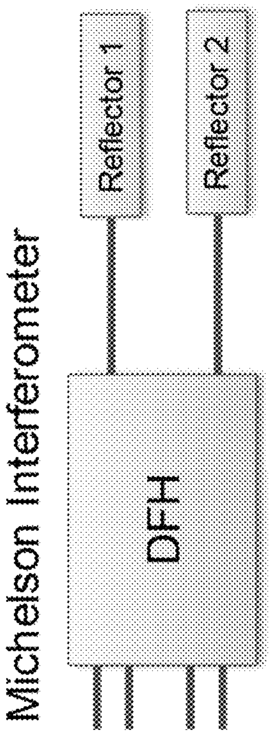
FIG. 32(*a*) illustrates an implementation of dual function hybrid in a Michelson interferometer in accordance with an example embodiment.
Figure 32B:
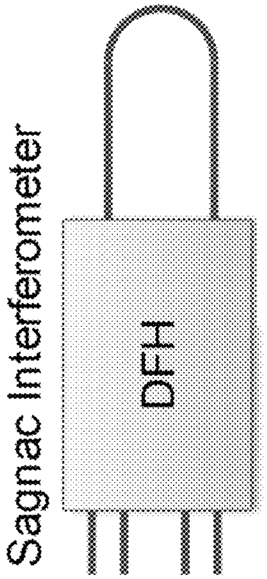

The use of the DFH in a Michelson and a Sagnac interferometer are illustrated in FIGS. 32($a$) and 32($b$), respectively.

The disclosed DFH configurations can be used in conjunction with the all-optical helix encoder embodiments of this document. For example, the disclosed DFH configurations can be used as the optical hybrid depicted in the Sagnac-based configurations of FIGS. 15($a$), and of FIG. 15($b$), with balanced photodetectors. One benefit of using the DFH with the all-optical helix encoder is that it avoids extra loss on the probe at the input to the Sagnac interferometer. The reduced loss improves signal-to-noise ratio for the same input power, and/or reduces the output power requirements from the probe source.

Figure 33:
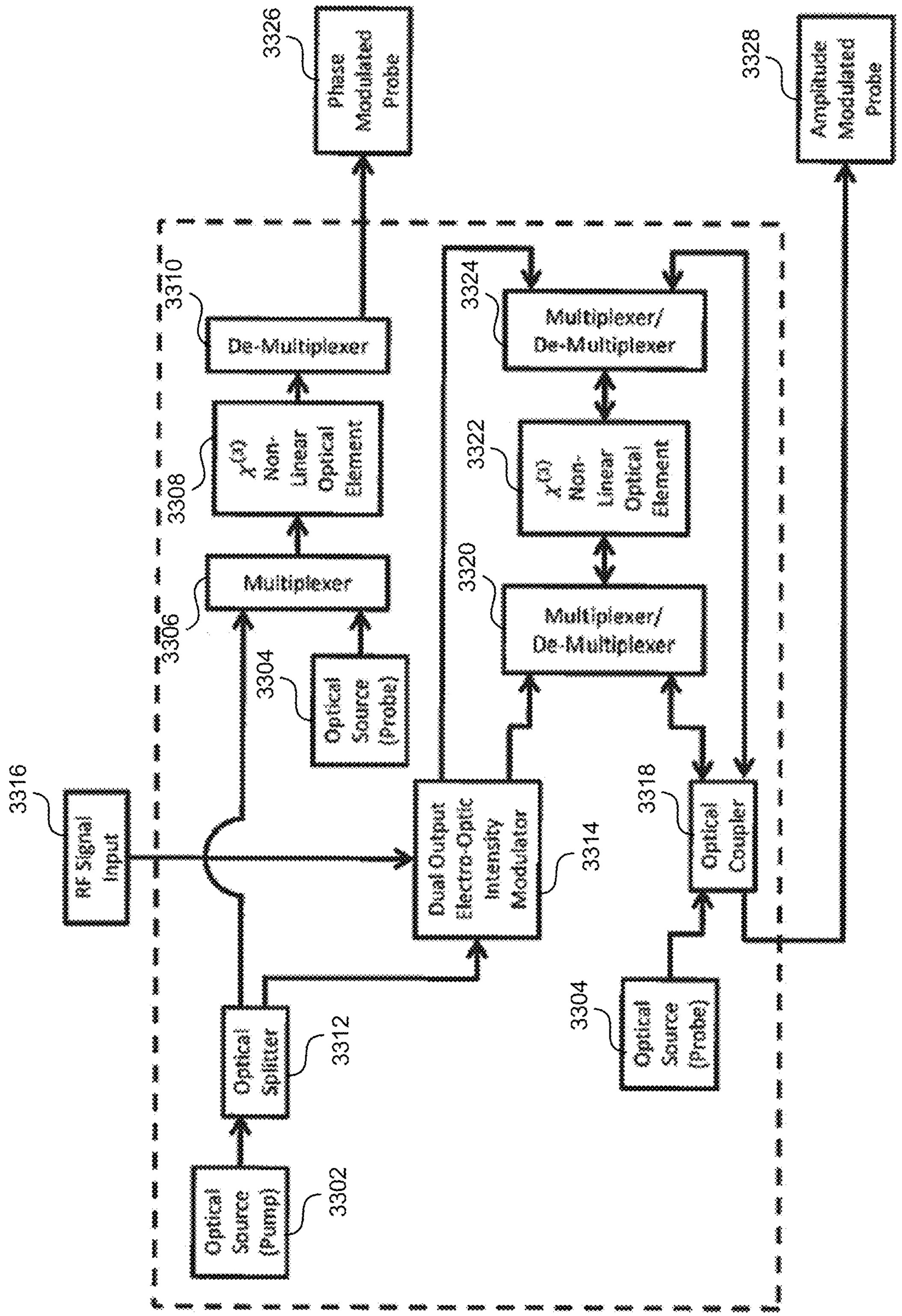
FIG. 33 illustrates an optical encoder that produces both a phase-modulated and an amplitude-modulated optical signal in accordance with an example embodiment.
Figure 34B:
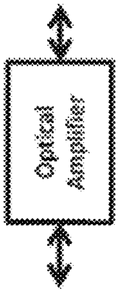
FIG. 34(*a*) illustrates an optical encoder configured to compensate for a non-reciprocal loss or gain of a non-linear medium in accordance with an example embodiment.
Figure 34D:
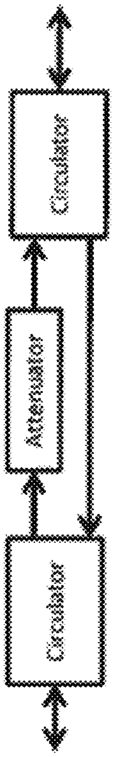
Figure 34A:
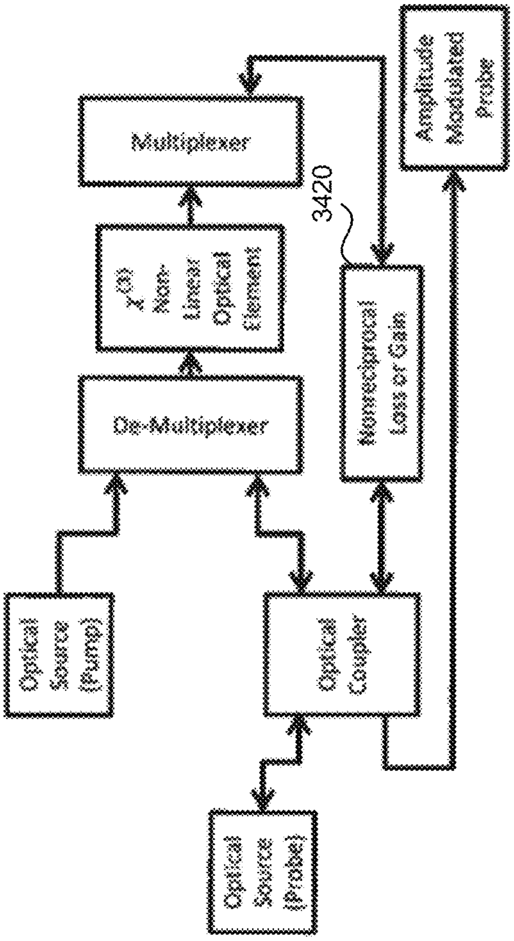
Figure 34C:
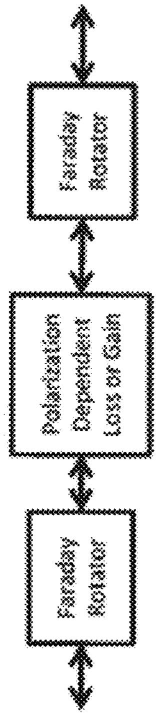
Figure 35A:
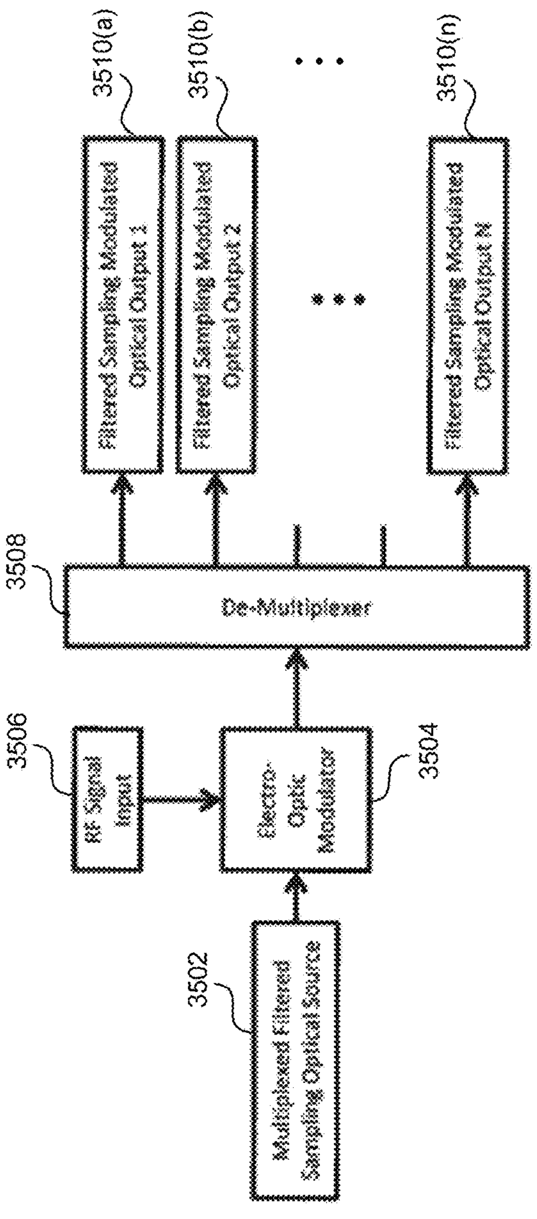
FIG. 35(*a*) illustrates a photonic filtered sampler that uses multiple RF filter sampling shapes in accordance with an example embodiment.
Figure 35B:
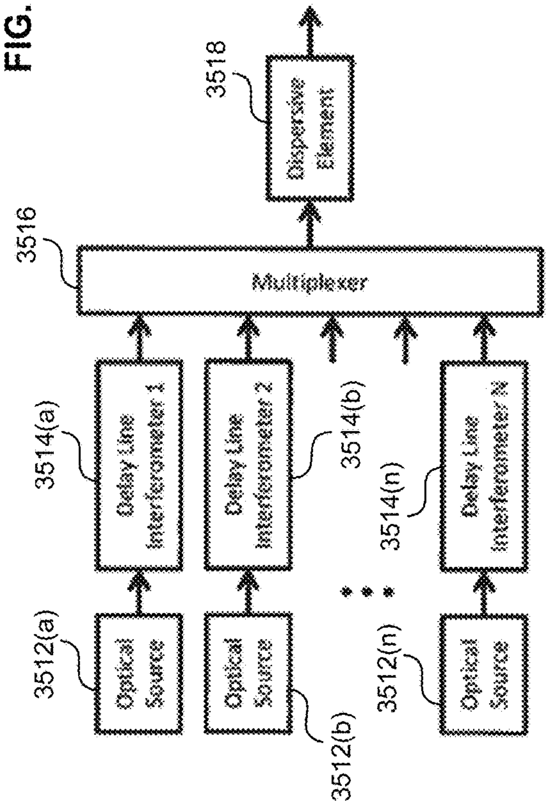
Figure 35C:
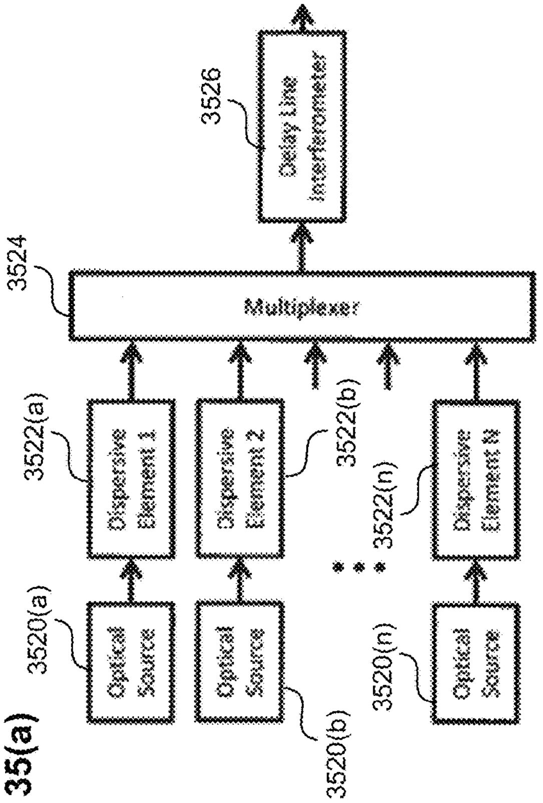
Figure 35D:
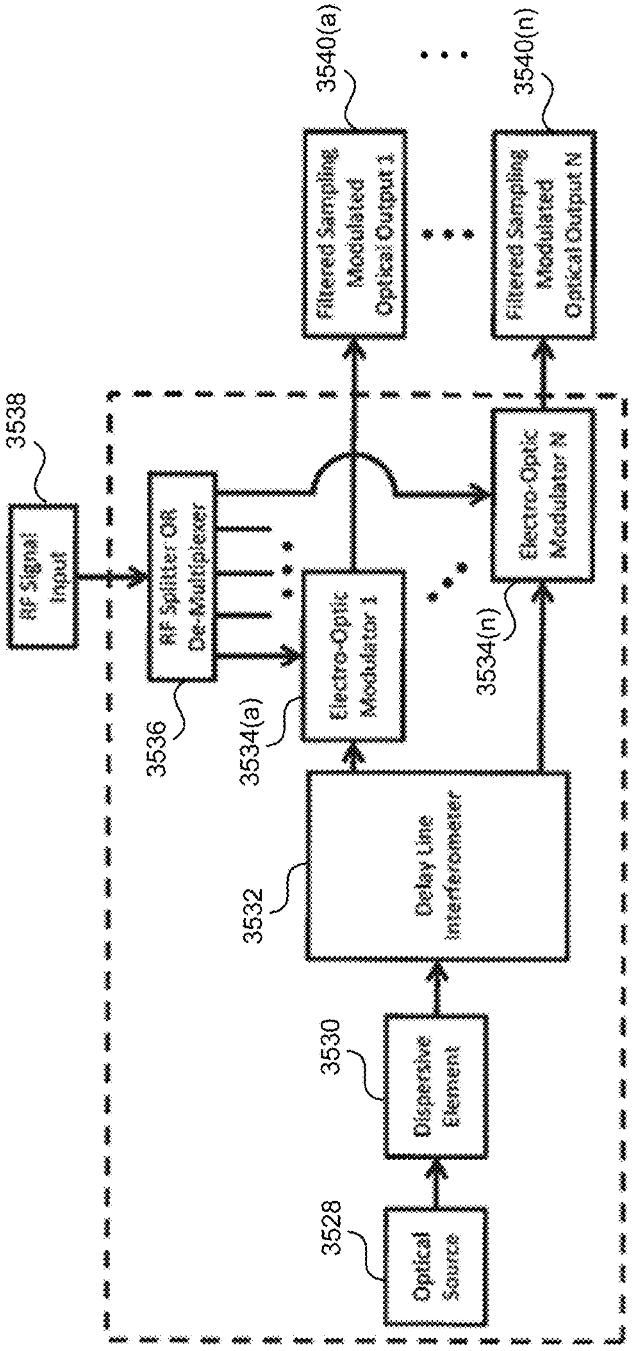
Figure 35E:
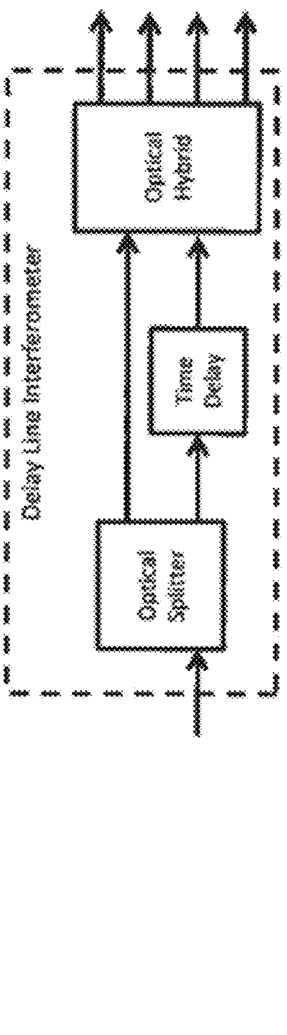

In another aspect of the disclosed embodiments both a phase-modulated probe and an amplitude-modulated probe are produced, such that the phase-modulated probe is not affected by the RF signal input, while the amplitude-modulated probe is affected by the RF signal input, as illustrated in the example configuration of FIG. 33. In the configuration of FIG. 33, the optical pump 3302 is provided to a splitter 3312, one output of which is provided to the multiplexer 3306; the probe 3304 signal is also provided to the multiplexer 3306; the multiplexed output of the multiplexer 3306 is provided to the non-linear optical medium 3308, which is coupled to the demultiplexer 3310, producing the phase-modulated probe 3326 at its output. The pump 3302 signal is also provided to the dual output EO intensity modulator 3314 via the second output of the splitter 3312 for modulation by the RF signal 3316. Each output of the dual output EO intensity modulator 3314 is provided to a corresponding multiplexer/demultiplexer 3320 and 3324, each also coupled to the second non-linear medium 3322, and to the optical coupler 3318, as depicted. The optical coupler 3318 also receives the probe 3304 signal and produces the amplitude-modulated probe signal 3328. In this configuration, fluctuations on the unmodulated pump are contained on both the phase-modulated and amplitude-modulated signals but the RF signal input is contained only on the amplitude-modulated probe; thus after capturing both signals into the digital domain, the noise information on the amplitude-modulated probe can be canceled using the phase-modulated probe, and the RF signal input can be reconstructed without the fluctuations from the pump.

In another embodiment, nonreciprocal loss or gain in the $\chi^{(3)}$ nonlinear optical element is compensated with a nonreciprocal loss or gain element 3420 in the Sagnac interferometer, as illustrated in FIG. 34($a$) (which is similar to FIG. 10). Nonreciprocal loss or gain in the $\chi^{(3)}$ non-linear optical could be caused by various physics, e.g., four-wave mixing or stimulated Raman scattering. If such nonreciprocal loss or gain in the $\chi^{(3)}$ non-linear optical element were not compensated in an interferometer, then the largest possible modulation depth of the amplitude-modulated probe would be reduced as the strength of uncompensated loss or gain increased. The nonreciprocal loss or gain element can be implemented in multiple ways, including but not limited to: an optical amplifier (FIG. 34($b$)); two Faraday rotators with a polarization dependent loss or gain element (e.g. a polarizer) in the middle (FIG. 34($c$)); two circulators and an attenuator (FIG. 34($d$)), such that the first port of the first circulator is connected to the third port of the second circulator, the third port of the first circulator is connected to the input of the attenuator, the output of the attenuator is connected to the first port of the second circulator, and the second port of each circulator are the bidirectional input/outputs.

Another implementation of the photonic filtered sampler uses multiple RF filter sampling shapes to recover more information about the RF signal input, as shown in the example configuration of FIG. 35($a$). In this implementation, a multiplexed filtered sampling optical source 3502 feeds an electro-optic modulator 3504, which samples the RF signal 3506 input, and the multiplexed signals are then separated with a de-multiplexer 3508 to generate N filtered sampling modulated optical outputs 3510($a$), 3510($b$), . . . 3510($n$). Choices of set of multiple sampling RF filter shapes include but are not limited to: (1) sampling RF filter shapes each with a different RF phase, e.g., (1-a) 0 and 180 degrees apart, which enables cancellation of the common baseband information but retention of the passband information, or e.g., (1-b) 0 and 90 degrees apart, which enables distinguishing the upper and lower sidebands via e.g. the Hilbert transform; (2) sampling RF filter shapes each with a different RF frequency, to capture RF signal input from multiple bands, or capturing nonlinear products of the electro-optic modulator's nonlinear transfer function.

The multiplexed filtered sampling optical source can be implemented by in multiple ways. One example implementation is illustrated FIG. 35(*b*), which feeds one or more optical sources 3512(*a*), 3512(*b*), . . . 3512(*n*) into multiple delay line interferometers 3514(*a*), 3514(*b*), . . . 3514(*n*), which are then multiplexed together by multiplexer 3516 and feed a common dispersive element 3518. Another example implementation is illustrated in FIG. 35(*c*), in which one or more optical sources 3520(*a*), 3520(*b*), . . . 3520(*n*) feed into multiple dispersive elements 3522(*a*), 3522(*b*), . . . 3522(*n*) which are then multiplexed together by the multiplexer 3524 and feed into a common delay line interferometer 3526. Yet another example implementation can include separate delay line interferometers and dispersive elements for each path before being multiplexed.

In still another example implementation of the photonic filtered sampler, shown in FIG. 35(*d*), the optical source 3528 is provided to a dispersive element 3530, which is coupled to a delay line interferometer 3532; multiple outputs of a delay line interferometer 3532 are sent to multiple electro-optic modulators 3534(*a*), . . . 3534(*n*), which are each modulated by the RF signal 3538 input which is split or de-multiplexed by the demultiplexer 3536 to produce a plurality of filtered sampling modulated optical outputs 3540(*a*), . . . 3540(*n*). Such a delay line interferometer can include the previously stated optical coupler (see, e.g., the inset in FIG. 24(*a*)) which produces one or two outputs, or said optical coupler can be replaced with an optical hybrid, producing four outputs instead of one or two, and yielding nominal phase differences like 0, 90, 180, and 270 degrees, as shown in the example configuration of FIG. 35(*c*).

An advantage of using the multiple outputs of a single delay line interferometer is that the phase difference between the filtered sampling optical pulse shapes of the multiple outputs is stable and does not require an optical de-multiplexer, but a disadvantage of this implementation is the need for multiple electro-optic modulators. An RF splitter would allow the full bandwidth to reach each electro-optic modulator but at the expense of added insertion loss. An RF demultiplexer would minimize added insertion loss but only if it is designed to not have spectral overlap between its outputs.

Figure 36:
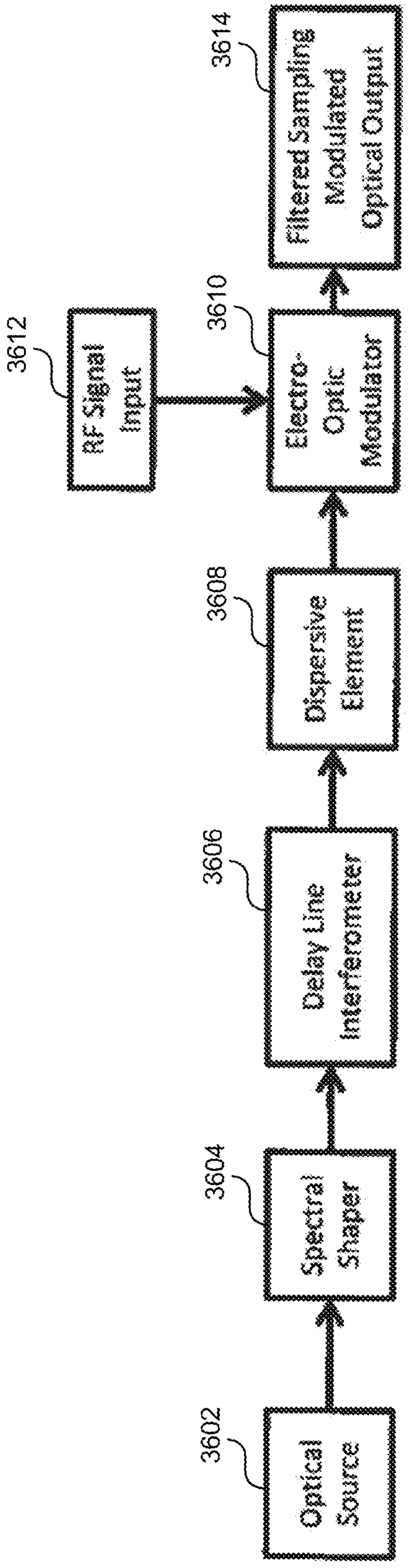
FIG. 36 illustrates another implementation of the photonic filtered sampler that includes a spectral shaper in accordance with an example embodiment.

FIG. 36 illustrates another implementation of the photonic filtered sampler. In this configuration, a spectral shaper 3604 is inserted between the optical source 3602 and the electro-optic modulator 3608 (prior to the delay line interferometer 3606) to alter the sampling filter shape. The combination of the spectral shaper 3604 and the delay line interferometer 3606 can perform the spectral shaping. The output of the spectral shaper 3604 is mapped into the time domain by the dispersive element 3608, and the temporal pulse shape in the electro-optic modulator 3610 defines the sampling impulse response. Altering the optical spectral shape via a spectral shaper 3608 hence alters the sampling impulse response, and can be engineered for a desired sampling filter shape. There are multiple ways of implementing a spectral shaper, including but not limited to: an optical filter, made with thin-film or Bragg grating technologies; a diffraction grating to separate the optical frequencies in space, a spatial light modulator to alter the insertion loss of each optical frequency individually, and the original or another diffraction grating to combine the optical frequencies back together.

Figure 37A:
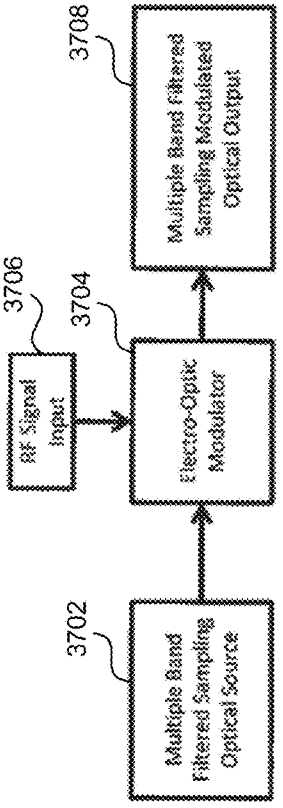
FIG. 37(*a*) illustrates a photonic filtered sampler that uses a multiple band filtered sampling optical source to capture information about multiple bands in accordance with an example embodiment.
Figure 37B:
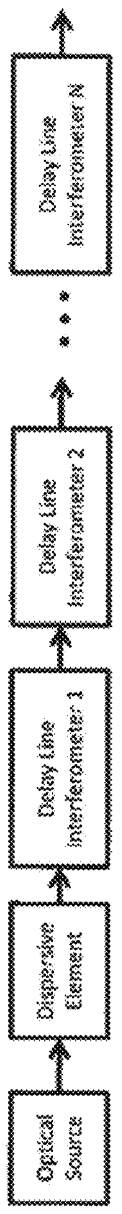
Figure 37C:
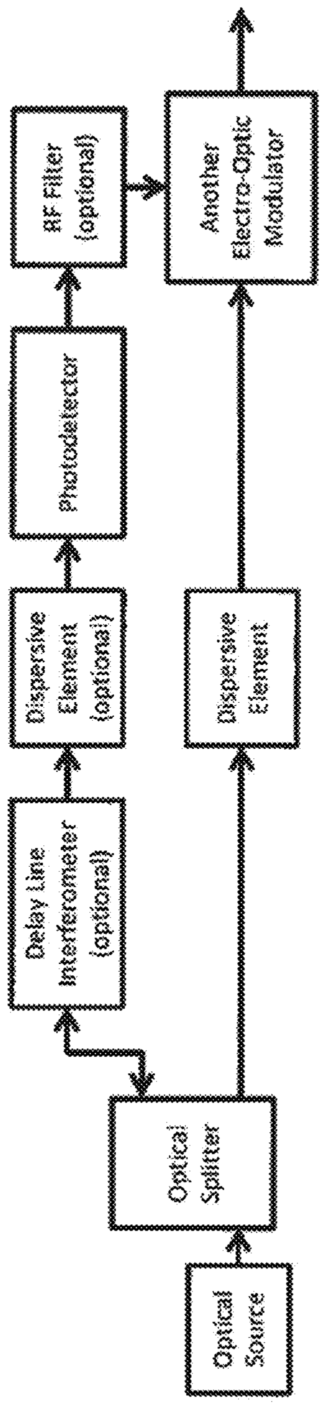

Another implementation of the photonic filtered sampler uses a multiple band filtered sampling optical source to capture information about multiple bands to generate one multiple band filtered sampling modulated optical output, as illustrated in the example configuration of FIG. 37(*a*). Although both FIGS. 35(*a*) and 37(*a*) may capture information about multiple bands, this implementation produces one output that covers the multiple bands, in contrast to FIG. 35(*a*), which produces one output per RF filter. This implementation has a multiple band filtered sampling optical source 3702 feed an electro-optic modulator 3704, which then samples the RF signal 3706 input, and produces a multiple band filtered sampling modulated optical output 3708.

There are multiple ways to implement such a multiple band filtered sampling optical source, including but not limited to: (1) adding additional delay line interferometers between the optical source and electro-optic modulator, as shown in the example configuration of FIG. 37(*b*), or additional arms in a single delay line interferometer, thereby creating a fringe pattern with multiple frequencies; (2) splitting the optical source into two paths, as shown in the example configuration of FIG. 37(*c*), in which the first path going through an optional delay line interferometer and optional dispersive element (used to concentrate power into a single spectral band), a photodetector, an optional RF filter, and another electro-optic modulator (which precedes the original electro-optic modulator that samples the RF signal input), thereby using the nonlinearity of the photodetector and/or the another electro-optic modulator to create a fringe pattern with multiple frequencies.

Figure 38:
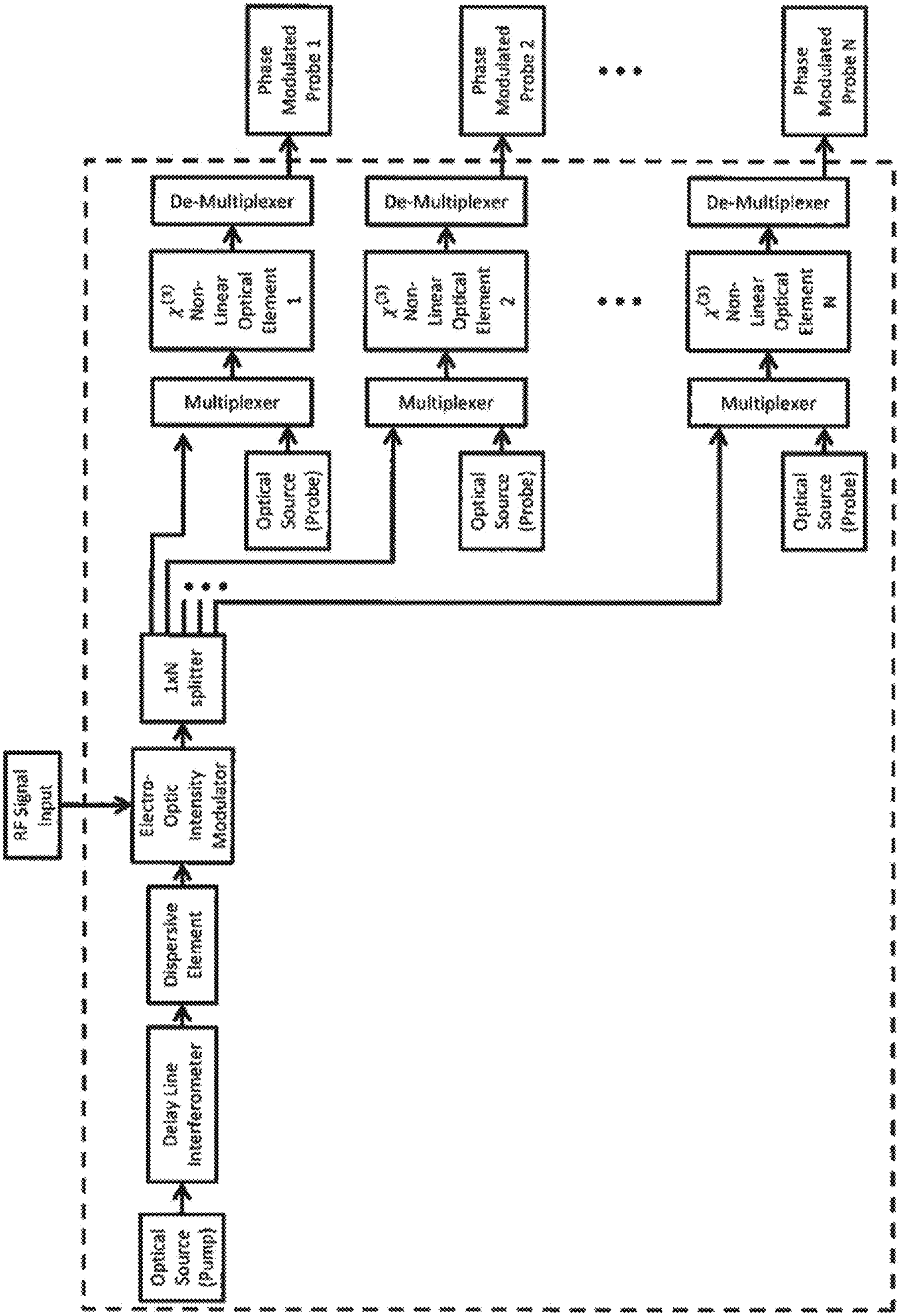
FIG. 38 illustrates a photonic filtered sampler that is combined with a cross-phase modulation based optical quantizer in accordance with an example embodiment.

Another implementation of the photonic filtered sampler is combined with a cross-phase modulation based optical quantizer, as shown in the example configuration of FIG. 38. The cross-phase modulation, when combined with the photonic filtered sampler, provides a unique configuration while providing several useful features and benefits. A traditional cross-phase modulation based optical quantizer has the RF signal input modulate an optical source in an electro-optic intensity modulator, whose output is split and sent to multiple independent $\chi^{(3)}$ non-linear optical elements. The strength of the transfer of amplitude modulation of the pump to phase modulation on each of the probes is engineered to be different, e.g., via unequal splitting ratio, or different length or nonlinearity strength of the non-linear optical elements. When the phase-modulated probes are interfered with unmodulated probes, photodetected, and digitized, then the strength of each of the digitized signals will be different as well. Given that the interference process has a sinusoidal transfer function, one can use the digitized value of each channel to determine the phase modulo $\pi r$ of each probe. With sufficient range of strengths of transfers, one can reconstruct the RF signal input. One choice of set of strengths of transfers has each successive transfer be increased by a factor of 2. This can then be matched with single bit quantizers, and the reconstruction algorithm would then be to have the weakest transfer be the least significant bit, and each factor of 2 stronger transfer would be the next most significant bit. When combined with the photonic filtered sampler, such a cross-phase modulation based optical quantizer would then gain the significant ability to alter the RF response of the entire system with one or more passbands of tunable shape.

Figure 39:
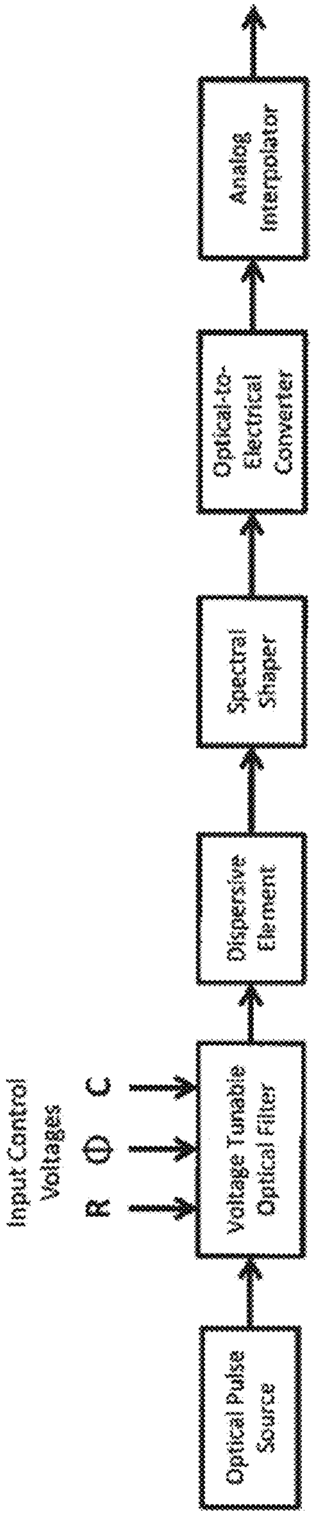
FIG. 39 illustrates an arbitrary RF waveform generator at passband that includes a spectral shaper in accordance with an example embodiment.

Another implementation of an arbitrary RF waveform generator at passband using photonics inserts a spectral shaper between the voltage tunable optical filter and the optical-to-electrical converter, as shown in the example configuration of FIG. 39. The optical spectral shape is mapped into the time domain by the dispersive element, and the temporal pulse shape at the optical-to-electrical converter defines the system impulse response. Engineering the optical spectral shape via a spectral shaper then engineers the system RF transfer function. There are multiple ways of implementing a spectral shaper, including but not limited to:

an optical filter, made with thin-film or Bragg grating technologies; a diffraction grating to separate the optical frequencies in space, a spatial light modulator to alter the insertion loss of each optical frequency individually, and the original or another diffraction grating to combine the optical frequencies back together.

One aspect of the disclosed embodiments relates to an optical encoder with improved bandwidth requirements that includes an optical splitter configured to receive a first optical signal and to produce N outputs optical signals, wherein N is greater than or equal to 2; N optical delay components, each configured to receive a train of optical pulses having a repetition rate that is 1/Nth of a repetition rate of a pump source, each delay component providing a different delay amount for the corresponding train of optical pulses that is received by the delay component; N optical multiplexers, each configured to receive an output from the optical splitter and an output from a corresponding optical delay component; N non-linear optical media, each coupled to a corresponding multiplexer to effect phase modulation onto each of the trains of optical pulses in accordance with an intensity of the corresponding output signal of the splitter; and N demultiplexers, each coupled to an output of a corresponding non-linear optical medium to produce N phase-modulated optical signals, wherein processing each of the N phase-modulated optical signals for conversion into an electrical domain is reduced by a factor that depends on N.

One aspect of the disclosed embodiments relates to an optical encoder with improved bandwidth requirements that includes N optical delay components, wherein N is greater than equal to 2, each optical delay component configured to receive a train of optical pulses having a repetition rate that is 1/Nth of a repetition rate of a probe source and providing a different delay amount for the corresponding train of optical pulses that is received by the delay component, each train of optical pulses having a different spectral content than any of the other trains of optical pulses. The optical encoder also includes an optical multiplexer configured to receive a first optical signal and an output from each of the N optical delay components; a non-linear optical medium coupled to an output of the multiplexer to effect phase modulation onto each of the trains of optical pulses in accordance with an intensity of the first optical signal; and a demultiplexer coupled to an output of the non-linear optical medium to produce N phase-modulated optical signals, wherein processing each of the N phase-modulated optical signals for conversion into an electrical domain is reduced by a factor that depends on N.

In some embodiments, each of the N optical delay components is configured to produce time delays that is equal to n.Δt, where $0 \leq n \leq N-1$, and Δt is a predetermined time separation interval. In some embodiments, processing of each of the N phase-modulated optical signals can be carried out with: a reduced bandwidth requirement of a photodetector that is configured receive and convert the corresponding phase optical signal into an electrical signal, and/or a reduced processing bandwidth/throughput requirement on a digital processor that is configured to receive and process the electrical signals from the photodetector(s), as comparted to processing a phase-modulated optical signal that is produced in accordance with a train of optical pulses having a repetition rate that is equal to the repetition rate of the pump source.

Another aspect of the disclosed embodiments relates to an optical encoder that includes one or more dispersive elements positioned to receive an optical pump or an optical probe signals; a multiplexer to receive the optical probe and optical pump signals after spectral contents of one or both of the optical probe or optical pump signals are expanded in time in accordance with the one or more dispersive elements to produce spectrally re-shaped optical pump or probe signals; a non-linear optical medium coupled to an output of the multiplexer to effect phase modulation onto the spectrally re-shaped optical probe signal; and a demultiplexer coupled to an output of the non-linear optical medium to produce a phase-modulated probe signal, wherein time expansion of the optical probe or optical pump signals prior to entering the non-linear optical medium enables a more uniform phase modulation of the probe signal.

In one example embodiment, a first dispersive element is positioned to receive the optical pump signal; a second dispersive element is positioned to receive the optical probe signal; and the optical encoder further includes a third dispersive element coupled to an output of the demultiplexer to receive the phase-modulated probe signal and to effect broadening of the phase-modulated probe signal in time. In another example embodiment, the first and the second dispersive elements effect broadening of the optical pump and the probe signals, respectively, to adjust temporal widths and peak powers of the optical signals that are produced. According to another example embodiment, a first dispersive element is positioned to receive the optical pump signal to expand spectral contents of the pump signal in time; an output of the first dispersive element is coupled to an electro-optic (EO) intensity modulator, the EO intensity modulator further configured to receive an input RF signal and to modulate the output of the first dispersive element in accordance with the RF signal; a second dispersive element is coupled to an output of the EO intensity modulator to further expand spectral contents of the intensity modulated pump signal in time; and the multiplexer is configured to receive an output of the second dispersive element and the optical probe signal.

Another aspect of the disclosed embodiments relates to an optical encoder that includes a multiplexer to receive the optical pump signals having a first center wavelength and an optical probe signals having a second center wavelength; a non-linear optical medium coupled to an output of the multiplexer and configured to effect phase modulation onto the optical probe signal in accordance with the optical pump signal, the non-linear optical medium further configured to effectuate a walk off effect for the optical pump and optical probe signals that traverse therethrough; and a demultiplexer coupled to an output of the non-linear optical medium to produce a phase-modulated probe signal, wherein the walk off effect improve a uniformity of phase modulation of the optical probe signal.

In one example embodiment, the walk off effect produces one of the following: each pulse from the optical probe signal upon entry into the non-linear optical medium trails a corresponding pulse of the optical pump signal but leads the corresponding pulse of the optical pump signal upon exit from the non-linear optical medium, or each pulse from the optical pump signal upon entry into the non-linear optical medium trails a corresponding pulse of the optical probe signal but leads the corresponding pulse of the optical probe signal upon exit from the non-linear optical medium. According to some example embodiments, the walk off effect is effectuated by selecting or tuning one or more of the following: the center wavelength of the pump signal; the center wavelength of the probe signal; a wavelength separation between the pump and the probe signals; a composition of materials of the non-linear optical medium; or a dimension of the nonlinear optical medium. In another example embodiment, the walk off effect is effectuated in-part according to a dispersive characteristic of the non-linear optical medium that corresponds to an optical dispersive element.

Another aspect of the disclosed embodiments relates to an optical encoder that incorporates a Mach-Zehnder (MZ) interferometric configuration. The optical encoder includes an optical splitter configured to receive an optical probe signal and to produce a first and a second version of the optical probe signal; a multiplexer to receive the first version of the optical probe signal and an optical pump signal; a first non-linear optical medium coupled to an output of the multiplexer and configured to effect phase modulation onto the first version of the optical probe signal in accordance with the optical pump signal, the first non-linear optical medium forming part of a test arm of the MZ interferometric configuration; a second non-linear optical medium that is substantially similar to the first non-linear optical medium in composition and length, the second non-linear optical medium coupled to an output of the optical splitter to receive the second version of the optical probe signal and forming part of a reference arm of the MZ interferometric configuration; a demultiplexer coupled to an output of the first non-linear optical medium to produce a phase-modulated probe signal; and an optical combiner coupled to the demultiplexer and to the second non-linear optical medium to combine the phase-modulated probe signal and the second version of the probe signal after propagation through the second optical medium. In some example embodiments, matching characteristics of the first and the second non-linear optical medium enable an improved recovery of phase-modulated information from an interference pattern produced by the optical combiner.

Another aspect of the disclosed embodiments relates to an optical encoder that incorporates a Sagnac interferometric configuration. The optical encoder includes an optical circulator configured to allow an optical probe signal to reach an optical coupler; a first multiplexer/demultiplexer to receive the optical probe signal from the optical circulator and to receive an optical pump signal; a non-linear optical medium coupled to an output of the first multiplexer/demultiplexer and configured to effect phase modulation onto the optical probe signal in accordance with the optical pump signal; and a second multiplexer/demultiplexer coupled to an output of the non-linear optical medium to produce a phase-modulated probe signal. Each of the first and the second multiplexers/demultiplexers is configured to operate as a multiplexer for optical beams that are input to the corresponding multiplexer/demultiplexer in one direction, and operate as a demultiplexer for a beam that is input therein in another direction, and the second multiplexer/demultiplexer is coupled to the optical coupler to allow a first one of complementary amplitude-modulated optical signals to be directed from a first output of the optical coupler to an output of the optical circulator. Additionally, a second one of the complementary amplitude-modulated optical signals is provided through a second output of the optical coupler.

In some example embodiments, the complementary amplitude-modulated optical signals enable an improved recovery of encoded information.

Another aspect of the disclosed embodiments relates to another optical encoder that incorporates an interferometric configuration. The optical encoder includes a multiplexer to receive an optical probe signal and an optical pump signal; a non-linear optical medium coupled to an output of the multiplexer and configured to effect phase modulation onto the optical probe signal in accordance with the optical pump signal, forming a first arm of the interferometric configuration; an optical phase shifter positioned in a second arm of the interferometric configuration; and a demultiplexer coupled to an output of the non-linear optical medium to produce a phase-modulated probe signal. In this optical encoder, an interference pattern formed by optical signals from the two arms of the interferometric configuration produces an amplitude-modulated optical signal that represents encoded information, and the optical phase shifter enables modulated phase information on the probe signal to be recovered in a range that spans multiples of 2π radians.

In one example embodiment, the interferometric configuration is a Mach-Zehnder (MZ) configuration, and the optical encoder includes: an optical splitter configured to receive the optical probe signal prior to entry into the multiplexer, and to produce a first version of the optical probe signal that is provided to the multiplexer and a second version of the optical probe signal that is provided to the phase shifter; an optical combiner configured to receive an output of the demultiplexer and an output of the phase shifter to produce the amplitude-modulated optical signal. In one example embodiment, the phase shifter includes a voltage tunable optical filter that provides an amplitude to time optical mapping. In some example embodiments, the optical encoder further includes a dispersive element coupled to an output of the optical combiner to disperse spectral contents of the amplitude-modulated optical signal in time.

In another example embodiment, the interferometric configuration is a Sagnac configuration, and the optical encoder includes: an optical coupler configured to receive the optical probe signal prior to entry into the multiplexer, and to provide the optical probe signal to the multiplexer; and a first polarization rotator, a birefringent medium and a second polarization rotator positioned in a path between the optical coupler and a demultiplexer/multiplexer, wherein the optical coupler is configured to output the amplitude-modulated signal.

Another aspect of the disclosed embodiments relates to another optical encoder that includes a multiplexer to receive an optical probe signal and an optical pump signal; a non-linear optical medium coupled to an output of the multiplexer and configured to effect phase modulation onto the optical probe signal in accordance with the optical pump signal, forming a first arm of the interferometric configuration; and a hybrid to produce four amplitude-modulated optical signals having phase shifts with respect to another, wherein the four amplitude-modulated optical signals provide in-phase and quadrature components that enable a determination of encoded information with an improved signal to noise ratio.

In one example embodiment, a first, a second, a third and a fourth one of the four amplitude-modulated optical signals have phase shifts of 0, 90, 180 and 270 degrees, respectively. In another example embodiment, the optical encoder is configured in a Mach-Zehnder (MZ) interferometric configuration, and includes: an optical splitter configured to receive the optical probe signal and to produce a first version of the optical probe signal that is provided to the multiplexer and a second version of the optical probe signal that forms part of a reference arm of the interferometric configuration; and an optical hybrid configured to receive an output of the demultiplexer and the second version of the optical probe signal, and to generate the four amplitude-modulated optical signals. In another example embodiment, optical encoder is configured in a Sagnac interferometric configuration, and includes an optical circulator coupled to an optical hybrid; in this embodiment, the optical circulator is configured to receive the optical probe signal and to allow the optical probe signal to reach the optical hybrid, the optical circulator further configured to receive a first one of the four amplitude-modulated optical signals from the optical hybrid and to provide the first one of the four amplitude-modulated optical signals at an output thereof, and the optical hybrid is configured to allow the optical probe signal to reach the multiplexer, to receive an output of the demultiplexer, and to produce the four amplitude-modulated optical signals.

Another aspect of the disclosed embodiments relates to another optical encoder that includes a dual output electro-optic (EO) intensity modulator configured to receive an optical pump signal and an RF signal, to modulate optical pump signal according to RF signal, and to produce two complementary intensity modulated pump signals; two multiplexers, each multiplexer configured to receive one of the complementary intensity modulated pump signals from the dual output EO intensity modulator and an optical probe signal; two non-linear optical media, each coupled to an output of a corresponding multiplexer to effect phase modulation of the optical probe signals in accordance the corresponding one of complementary intensity modulated pump signals; two demultiplexers, each coupled to a corresponding optical medium; and an optical combiner coupled to outputs of the demultiplexers to produce an amplitude-modulated probe signal formed based on an interference pattern of complementary phase-modulated probe signals.

Another aspect of the disclosed embodiments relates to another optical encoder that includes a dual output electro-optic (EO) intensity modulator configured to receive an optical pump signal and an RF signal, to modulate optical pump signal according to RF signal, and to produce two complementary intensity modulated pump signals; a first multiplexer/demultiplexer to receive one of the complementary intensity modulated pump signals from the dual output EO intensity modulator and an optical probe signal; a second multiplexer/demultiplexer to receive another one of the complementary intensity modulated pump signals from the dual output EO intensity modulator; a non-linear media coupled between the first and the second multiplexers/demultiplexers to effect phase modulation on optical signals that traverse therethrough; and an optical coupler coupled to the first and to the second multiplexers/demultiplexers, and further configured to receive an optical probe signal and to allow the optical probe signal to reach the first multiplexer/demultiplexer. In this encoder, each of the first and the second multiplexers/demultiplexers is configured to operate as a multiplexer for optical beams that are input to the corresponding multiplexer/demultiplexer in one direction, and operate as a demultiplexer for a beam that is input therein in another direction, and the optical coupler is further configured to provide an amplitude-modulated probe signal formed based on an interference pattern of complementary phase-modulated probe signals.

Another aspect of the disclosed embodiments relates to another optical encoder that includes an optical splitter to receive an optical probe signal and to produce two copies of the optical probe signal; a multiplexer to receive a first copy of the optical probe signal and an optical pump signal and to produce a multiplexed optical signal; a non-linear optical medium to receive the multiplexed optical signal and to effect phase modulation thereon; a demultiplexer to receive an optical signal output from the optical medium; an optical combiner configured to receive a second copy of the optical probe signal produced by the optical splitter and an output of the multiplexer, and to produce two complementary amplitude-modulated probe signals for detection by a balanced photodetector.

The embodiments of optical systems and encoders disclosed herein can further include one or more of the each of the following: a photodetector configured to receive an amplitude-modulated optical signal output from the optical encoder and produce electrical signals representative thereof; a digital signal processor configured to receive electrical signals representative of amplitude-modulated optical signal(s) output from the optical encoder and to process the electrical signals in digital domain to determine information optically therein; or a timing measurement device or jitter meter configured to measure a timing error of one or both of the optical pump signal or the optical probe signal, and to use the measured timing error to improve a determination of encoded information. In some embodiments, the measured timing error corresponds to timing errors on a pulse-by-pulse basis. In some embodiments, the timing measurement device or jitter meter is configured to measure a timing error of the optical pump signal. In some embodiments, the timing measurement device or jitter meter is configured to measure a timing error of the optical probe signal. In some embodiments, the measured timing error is used by the digital signal processor to remove a timing error of the probe signal, undo a transfer function the non-linear optical medium, or to undo a transfer function of an electro-optic intensity modulator to facilitate recovery of an RF signal.

Another aspect of the disclosed embodiments relates to photonic filtered sampler that includes a delay line interferometer configured to receive an optical pulse train; a dispersive element positioned to receive an output of the delay line interferometer and to expand spectral contents of in time; and a modulator configured to receive an output of the dispersive element and a radio frequency (RF) signal, and to produce a modulated output optical signal in accordance with the RF signal, wherein the modulated output optical signal has a center frequency and a spectral width that are determined based on an amount of delay provided by the delay line interferometer and dispersive properties of the dispersive element.

Another aspect of the disclosed embodiments relates to a filtered photonic encoder that includes the above noted photonic filtered sampler. The filtered photonic encoder further includes a multiplexer configured to receive the modulated output optical signal from the dispersive element and an optical probe signal; an optical medium positioned to receive an output of the multiplexer; and a demultiplexer configured to receive an output of the optical medium and to produce a phase-modulated probe signal. In some embodiments, a compressive element is further positioned between the modulator and the multiplexer to reduce a width of optical pulses that are output from the modulator before reaching the modulator. In some embodiments, one or both of the delay and or the dispersive properties is fixed. In some embodiments, one or both of the delay and or the dispersive properties is tunable.

One aspect of the disclosed embodiments relates to an optical dual function hybrid (DFH), that includes a first coupler; a second coupler; a first polarizing beam splitter (PBS) coupled to a first Faraday rotator; a second polarizing beam splitter (PBS) coupled to a second Faraday rotator; and a phase shifter. Each of the first and the second couplers are coupled to both the first and the second PBS, and the phase shifter is positioned between the second PBS and the second coupler to effectuate a phase shift to an optical beam that is provided from the second PBS to the phase shifter and to the second coupler. In one example embodiment, in a forward propagation mode: the first coupler is configured to receive an input beam, an output of the coupler is configured to provide a first beam to the first PBS, and another output of the coupler is configured to provide a second beam to the second PBS. In another example embodiment, in a backward propagation mode: the first PBS is configured to receive a first backward propagating beam from the first Faraday rotator, and to provide one output beam from the first PBS to the first coupler and another output beam from the first PBS to the second coupler; and the second PBS is configured to receive a second backward propagating beam from the second Faraday rotator, and to provide one output beam from the second PBS to the first coupler, and another output beam from the second PBS to the phase shifter, which provides a phase-shifted backward propagating beam to the second coupler. In still another example embodiment, in a forward propagation mode, each PBS is configured to allow only transmission of a beam that is incident thereupon, with substantially no reflection.

Another aspect of the disclosed embodiments relates to an optical dual function hybrid (DFH) that includes a first coupler; a second coupler; a polarizing beam splitter (PBS) coupled to a first and to a second Faraday rotator; a phase shifter. Each of the first and the second couplers are coupled to the PBS, and the phase shifter is positioned between the PBS and the second coupler to effectuate a phase shift to an optical beam that is provided from the PBS to the phase shifter and to the second coupler.

Another aspect of the disclosed embodiments relates to an optical dual function hybrid (DFH) that includes a first coupler; a second coupler; a polarizing beam splitter (PBS) coupled to a Faraday rotator; and a phase shifter. Each of the first and the second couplers are coupled to the PBS, and the phase shifter is positioned between the PBS and the second coupler to effectuate a phase shift to an optical beam that is provided from the PBS to the phase shifter and to the second coupler.

Another aspect of the disclosed embodiments relates to an optical dual function hybrid (DFH) that includes a first coupler; a second coupler; a first and a second polarizing beam splitter (PBS) coupled to a first Faraday rotator; a third and a forth polarizing beam splitter (PBS) coupled to a second Faraday rotator; and a phase shifter. Each of the first and the second couplers are coupled to both the first and the third PBS, the phase shifter is positioned between the third PBS and the second coupler to effectuate a phase shift to an optical beam that is provided from the third PBS to the phase shifter and to the second coupler, and in a forward propagation mode, the output of each the second and the fourth PBS is polarization multiplexed signal based on two outputs of the first Faraday rotator and the second Faraday rotator, respectively.

Another aspect of the disclosed embodiments relates to an optical dual function hybrid (DFH) that includes a first coupler; a second coupler; a first circulator; a second circulator; a first polarizing beam splitter (PBS) coupled to a first polarization rotator and to the first circulator; a second polarizing beam splitter (PBS) coupled to a second polarization rotator and to the second circulator; and a phase shifter. Each of the first and the second couplers are coupled to both the first and the second PBS, and the phase shifter is positioned between the second PBS and the second coupler to effectuate a phase shift to an optical beam that is provided from the second PBS to the phase shifter and to the second coupler. In one example embodiment, in a forward propagation mode: the first coupler is configured to receive an input beam, an output of the coupler is configured to provide a first beam to the first PBS and to the first circulator from the first PBS, and another output of the coupler is configured to provide a second beam to the second PBS and to the second circulator from the second PBS. In another example embodiment, in a backward propagation mode: the first circulator, the first polarization rotator and the first PBS are configured to receive a first backward propagating beam received at, and output from, the first circulator to the first polarization rotator and to the first PBS, wherein an output beam from the first PBS is provided to the first and another output beam from the first PBS is provided to the second couplers; and the second circulator, the second polarization rotator and the second PBS are configured to receive a second backward propagating beam received at, and output from, the second circulator to the second polarization rotator and to the second PBS, wherein an output beam from the second PBS is provided to the first coupler and another output beam from the second PBS, after propagation through the phase shifter, is provided to the second coupler. The above noted DFHs can used in combination with an optical helix encoder in a Sagnac configuration, such as those in FIGS. 15(*a*) and 15(*b*).

Another aspect of the disclosed embodiments relates to an optical encoder, comprising an optical splitter configured to receive an optical pump source signal and to produce two outputs; a multiplexer configured to receive a first output of the optical splitter and an optical probe signal; a non-linear optical medium configured to receive an output of the multiplexer; a demultiplexer configured to receive an output of the non-linear optical medium and to produce a phase-modulated probe signal at its output; an intensity modulator having at least two outputs and configured to receive a second output of the optical splitter and an RF signal; a first multiplexer/demultiplexer; a second multiplexer/demultiplexer; another non-linear optical medium positioned between the first and the second multiplexer/demultiplexer; and an optical coupler. A first output of the intensity modulator is provided to the first multiplexer/demultiplexer, a second output of the intensity modulator is provided to the second multiplexer/demultiplexer, the optical coupler is configured to receive and provide the optical probe signal to the first multiplexer/demultiplexer and to receive an output from the first multiplexer/demultiplexer, and the optical coupler is configured to receive and to send optical signals to the second multiplexer/demultiplexer and to provide an amplitude-modulated probe signal at an output thereof. In one example embodiment, both the phase-modulated probe signal and the amplitude-modulated probe signal included fluctuations associated with the optical pump signal, and variations representative of the RF signal input are only present in the amplitude-modulated probe signal, and wherein fluctuations associated with the optical pump signal can be removed based on a combined processing of the phase-modulated probe signal and the amplitude-modulated probe signal.

Another aspect of the disclosed embodiments relates to an optical device for compensating a nonreciprocal loss or gain in a nonlinear optical medium, comprising an optical amplifier.

Another aspect of the disclosed embodiments relates to an optical device for compensating a nonreciprocal loss or gain in a nonlinear optical medium, comprising a polarization dependent gain or loss element positioned between two Faraday rotators. A port of each Faraday rotator that is not connected to the polarization dependent gain or loss element are configured to provide bidirectional input/outputs of the optical device.

Another aspect of the disclosed embodiments relates to an optical device for compensating a nonreciprocal loss or gain in a nonlinear optical medium, comprising: a first circulator; a second circulator; and an attenuator positioned between the first and the second circulators. A first port of the first circulator is connected to a third port of the second circulator, a third port of the first circulator is connected to an input of the attenuator, an output of the attenuator is connected to a first port of the second circulator, and a second port of each circulator are configured to provide bidirectional input/outputs of the optical device. In the above cases, the optical device can be configured to compensate for non-linear losses or gains in an optical helix encoder that is based on a Sagnac interferometer and uses a non-linear optical element.

Another aspect of the disclosed embodiments relates to a photonic filtered sampler that includes an optical modulator configured to receive a radio frequency (RF) signal and a multiplexed filtered sampling optical source signal; and a demultiplexer configured to receive an output of the optical modulator and to produce a plurality of filtered sampling modulated optical outputs. In one example embodiment, the multiplexed filtered sampling optical source signal is generated using an optical device that includes a plurality of optical delay line interferometers, each configured to receive an optical source signal; a multiplexer configured to receive an output from each optical delay line interferometer; and a dispersive element configured to receive an output from the multiplexer and to produce the multiplexed filtered sampling optical source signal at an output thereof. In one example embodiment, the multiplexed filtered sampling optical source signal is generated using an optical device that includes a plurality of dispersive elements, each configured to receive an optical source signal; a multiplexer configured to receive an output from each dispersive element; and an optical delay line interferometer configured to receive an output from the multiplexer and produce the multiplexed filtered sampling optical source signal at an output thereof. In another example embodiment, the multiplexed filtered sampling optical source signal is generated using an optical device comprising: a plurality of optical delay line interferometers, each configured to receive an optical source signal; a plurality of dispersive elements, each configured to receive an output signal from a corresponding optical delay line interferometer; and a multiplexer configured to receive an output from each dispersive element and produce the multiplexed filtered sampling optical source signal at an output thereof.

Another aspect of the disclosed embodiments relates to a photonic filtered sampler that includes a dispersive element to receive an optical source signal; a delay line interferometer to receive an output of the dispersive element; N electro-optic modulators, each configured to receive an output of the delay line modulator and an output of a splitter or a demultiplexer that is configured to receive a radio frequency (RF) signal, where N is an integer greater than or equal to two. Each of the N electro-optic modulators is configured to produce one of the plurality of filtered sampling modulated optical signals at an output thereof. In one example embodiment, the delay line interferometer includes: an optical splitter, time delay element, and an optical hybrid, where the time delay element connected to a first output of the optical splitter, the optical hybrid is connected to a second output of the optical splitter and to an output of the time delay element, the optical hybrid producing a plurality of output optical signals.

Another aspect of the disclosed embodiments relates to a photonic filtered sampler, comprising: a spectral shaper configured to receive an optical source signal; a delay line interferometer coupled to an output of the spectral shaper; a dispersive element configured to receive an optical signal from an output of the delay line interferometer; and an electro-optic modulator coupled to the output of the dispersive element and further configured to receive a radio frequency (RF) signal and to produce a filtered sampling modulated optical signal at an output thereof.

Another aspect of the disclosed embodiments relates to a photonic filtered sampler, comprising: an electro-optic modulator configured to receive a multiple band filtered sampling source signal and a radio frequency (RF) signal and to produce a single multiple band filtered sampling modulated optical signal at an output thereof. In one example embodiment, the multiple band filtered sampling source signal is generated by an optical device that includes a dispersive element configured to receive an optical source signal, the output of the dispersive element connected to a first of a plurality of N delay line interferometers, where N is greater than or equal to 2. Each delay line interferometer connected in series with another delay line interferometer of the N delay line interferometers, an output of Nth delay line interferometer representing the multiple band filtered sampling source signal. In another example embodiment, the multiple band filtered sampling source signal is generated by an optical device that includes: an optical splitter configured to receive an optical source signal; a photodetector positioned in a first optical path and coupled to a first output of the optical splitter; a dispersive element positioned in a second optical path and coupled to a second output of the optical splitter; and another electro-optic modulator to receive optical signals from each of the dispersive element and the photodetector and to produce the multiple band filtered sampling source signal. The optical device can further include one or more of the following in the first optical path: a delay line interferometer or another dispersive element before the photodetector, and/or an RF filter between the photodetector and the electro-optic modulator.

Another aspect of the disclosed embodiments relates to a photonic filtered sampler, comprising: a delay line interferometer configured to receive an optical source signal; a dispersive element coupled to an output of the delay line interferometer; an electro-optic modulator coupled to the output of the dispersive element and further configured to receive a radio frequency (RF) signal; a 1×N demultiplexer configured to receive an output from the electro-optic modulator, wherein N is greater than or equal to 2; N multiplexers, each configured to receive one of N optical signals from an output of the demultiplexer, each multiplexer further configured to receive a copy of an optical probe signal; N non-linear optical media, each positioned to receive an output from a corresponding multiplexer; and N demultiplexers, each configured to receive an optical signal from a corresponding non-linear optical media, wherein each demultiplexer is configured to produce one of N phase-modulated probe signal at an output thereof.

Another aspect of the disclosed embodiments relates to an arbitrary radio frequency (RF) waveform generator, comprising: a voltage tunable optical filter configured to receive a plurality of control input signals; a dispersive element connected to an output of the voltage tunable optical filter; a spectral shaper connected to an output of the dispersive element; an optical to electrical converter; and an analog interpolator, wherein generation of an arbitrary RF waveform from an output of the analog interpolator is enabled responsive to the plurality of control signals. In one example embodiment, the plurality of control signals includes three control signals: an amplitude control signal, a phase control signal and time delay control signal. In another example embodiment, a transfer function of the arbitrary waveform generator can be adjusted at least in-part by modifying one or more properties of the spectral shaper.

An aspect of the disclosed embodiments relates to an optical encoder that includes an optical multiplexer to receive an optical probe signal and an optical pump signal, a non-linear optical medium coupled to an output of the optical multiplexer and configured to effect phase modulation onto the optical probe signal in accordance with the optical pump signal, forming a first arm of the interferometric configuration, an optical hybrid, and an optical demultiplexer coupled to the non-linear optical medium and to the optical hybrid. The optical hybrid is configured to produce four amplitude-modulated optical signals having phase shifts with respect to one another, wherein the four amplitude-modulated optical signals provide in-phase and quadrature components that enable a determination of encoded information with an improved signal to noise ratio. In one example embodiment, a first, a second, a third and a fourth one of the four amplitude-modulated optical signals have phase shifts of 0, 90, 180 and 270 degrees, respectively.

In another example embodiment, the optical encoder further includes two balanced photodetectors, wherein a first balanced photodetector is configured to receive a first and a third of the four amplitude-modulated optical signals, and a second balanced photodetector is configured to receive a second and a fourth of the four amplitude-modulated optical signals. In yet another example embodiment, the optical encoder is configured in a Mach-Zehnder (MZ) interferometric configuration, and includes an optical splitter configured to receive the optical probe signal and to produce a first version of the optical probe signal that is provided to the multiplexer and a second version of the optical probe signal that forms part of a reference arm of the MZ interferometric configuration. In this MZ interferometric configuration, the optical hybrid is configured to receive an output of the optical demultiplexer and the second version of the optical probe signal, and to generate the four amplitude-modulated optical signals.

In still another example embodiment, the optical encoder is configured in a Sagnac interferometric configuration in which the optical multiplexer is configured to operate as a first optical multiplexer/demultiplexer and the optical demultiplexer is configured to operate as a second multiplexer/demultiplexer, the optical encoder comprising an optical circulator coupled to the optical hybrid. In this Sagnac interferometric configuration, the optical circulator is configured to receive the optical probe signal and to allow the optical probe signal to reach the optical hybrid. The optical circulator is further configured to receive a first one of the four amplitude-modulated optical signals from the optical hybrid and to provide the first one of the four amplitude-modulated optical signals at an output thereof. The optical hybrid is configured to allow the optical probe signal to reach the first optical multiplexer/demultiplexer, to receive an output of the second optical multiplexer/demultiplexer, and to produce the four amplitude-modulated optical signals.

One aspect of the disclosed embodiments relates to an optical encoder that includes an optical multiplexer to receive an optical probe signal and an optical pump signal. The optical encoder further includes a non-linear optical medium coupled to an output of the optical multiplexer and configured to effect phase modulation onto the optical probe signal in accordance with the optical pump signal, forming a first arm of an interferometric configuration. The optical encoder additionally includes an optical hybrid, and an optical demultiplexer coupled to the non-linear optical medium and to the optical hybrid. The optical hybrid is configured to produce two or more amplitude-modulated optical signals having phase shifts with respect to one another, wherein the two or more amplitude-modulated optical signals enable a determination of encoded information with an improved signal to noise ratio.

In one example embodiment, the two or more amplitude-modulated optical signals include one of the following optical signals: a first and a second amplitude-modulated optical signals having a phase shift 0 and 90, degrees, respectively; a first, a second, and a third amplitude-modulated optical signal having phase shifts of 0, 90, and 180 degrees, respectively; or a first, a second, a third and a fourth amplitude-modulated optical signal having phase shifts of 0, 90, 180 and 270 degrees, respectively. In another example embodiment, the optical encoder further includes one or more balanced photodetectors, where each balanced photodetector is configured to receive two of the amplitude-modulated optical signals having 180 degrees phase shift with respect to each other.

According to another example embodiment, the optical encoder is configured in a Mach-Zehnder (MZ) interferometric configuration, and includes an optical splitter configured to receive the optical probe signal and to produce a first version of the optical probe signal that is provided to the multiplexer and a second version of the optical probe signal that forms part of a reference arm of the MZ interferometric configuration. The optical hybrid is configured to receive an output of the optical demultiplexer and the second version of the optical probe signal, and to generate the two or more amplitude-modulated optical signals.

In another example embodiment, the optical encoder is configured in a Sagnac interferometric configuration in which the optical multiplexer is configured to operate as a first optical multiplexer/demultiplexer and the optical demultiplexer is configured to operate as a second multiplexer/demultiplexer. In this configuration, the optical encoder includes an optical circulator coupled to the optical hybrid and the optical circulator is configured to receive the optical probe signal and to allow the optical probe signal to reach the optical hybrid. The optical circulator is further configured to receive a first one of the two or more amplitude-modulated optical signals from the optical hybrid and to provide the first one of the two or more amplitude-modulated optical signals at an output thereof. Additionally, the optical hybrid is configured to allow the optical probe signal to reach the first optical multiplexer/demultiplexer, to receive an output of the second optical multiplexer/demultiplexer, and to provide the two or more amplitude-modulated optical signals.

Another aspect of the disclosed embodiments relates to an optical encoder that includes an optical multiplexer to receive an optical pump signal and an optical probe signal, and a non-linear optical medium coupled to an output of the optical multiplexer and configured to effect phase modulation onto the optical probe signal in accordance with the optical pump signal. The non-linear optical medium is further configured to effectuate a change in relative timing of the optical pump and the optical probe signals that traverse therethrough. The optical encoder also includes a demultiplexer coupled to an output of the non-linear optical medium to produce a phase-modulated probe signal. The change in relative timing of the optical pump and optical probe signals improves a uniformity of phase modulation of the optical probe signal.

In one example embodiment, the change in relative timing is characterized by one of the following: (a) each pulse from the optical probe signal upon entry into the non-linear optical medium trails a corresponding pulse of the optical pump signal but leads the corresponding pulse of the optical pump signal upon exit from the non-linear optical medium, or (b) each pulse from the optical pump signal upon entry into the non-linear optical medium trails a corresponding pulse of the optical probe signal but leads the corresponding pulse of the optical probe signal upon exit from the non-linear optical medium.

In another example embodiment, the optical probe signal has a first center wavelength and the optical pump signal has a second center wavelength, and an extent or degree of the change in relative timing is effectuated based on: a value of the first center wavelength of the pump signal, a value of the second center wavelength of the probe signal, a wavelength separation between the first center wavelength of the pump signal and the second center wavelength of the probe signal, a composition of materials of the non-linear optical medium, or a dimension of the non-linear optical medium. In one example embodiment, the change in relative timing is effectuated in-part according to a dispersive characteristic of the non-linear optical medium that corresponds to an optical dispersive element. In yet another example embodiment, one of the optical pump signal and the optical probe signal traverses through the non-linear optical medium at a faster speed than the other of the optical pump signal and the optical probe signal, thus producing an overlap between the optical pump signal and the optical probe signal with a continuously changing relative time delay. In still another example embodiment, increasing a length of the non-linear medium produces an increase in the relative timing.

Another aspect of the disclosed embodiments relate to a photonic filtered sampler that includes a spectral shaper configured to receive an optical pulse train, a dispersive element positioned to receive an output of the spectral shaper and to expand spectral contents thereof in time, and a modulator configured to receive an output of the dispersive element and a radio frequency (RF) signal and to produce a modulated output optical signal in accordance with the RF signal. One or more characteristics of the modulated output optical signal is determined based on a spectral shape provided by the spectral shaper and dispersive properties of the dispersive element.

In an example embodiment, the one or more characteristics includes a shift in a center frequency and a spectral width of the modulated output optical signal. In another example embodiment, the photonic filtered sampler includes a delay line interferometer, and the one or more characteristics is determined at least in-part based on an amount of delay provided by the delay line interferometer. In still another example embodiment, the delay line interferometer includes an optical splitter configured to receive the optical pulse train and to produce two versions of the optical pulse train, an optical delay component configured to receive a first version of the optical pulse train and impart a time delay thereto to produce a delayed optical pulse train, and an optical coupler configured to receive the delayed optical pulse train and a second version of the optical pulse train, and to produce an output that is provided to the dispersive element. In one example embodiment, the optical delay component is configured to impart a fixed delay value to the first version of the optical pulse train. In another example embodiment, one or both of the optical delay component or the dispersive element is tunable. In still another example embodiment, the optical delay component comprises one or more of the following components to effect tunability: a mechanical free space stage, one or more switches operable to select a particular delay value using an array of fixed time delay elements, or a phase shifter configured to tune a fringe phase of an optical signal in the delay line interferometer relative to an envelope of thereof. In yet another example embodiment, the dispersive element comprises one or more of the following components to effect tunability: a heater, or one or more switches operable to use an array of fixed dispersion elements to select different dispersion values.

In one example embodiment, the dispersive element of the photonic filtered sampler has fixed dispersive properties. In another example embodiment, the photonic filtered sampler is configured as part of a filtered photonic encoder that includes an optical multiplexer configured to receive the modulated output optical signal from the dispersive element and an optical probe signal, a non-linear optical medium positioned to receive an output of the optical multiplexer, and an optical demultiplexer configured to receive an output of the non-linear optical medium and to produce a phase-modulated probe signal. In another example embodiment, the photonic filtered encoder further comprises an optical compressive element positioned between the optical modulator and the optical multiplexer to reduce a width of optical pulses that are output from the optical modulator before reaching the optical multiplexer. In another example embodiment, the photonic filtered encoder comprises an optical source configured to produce the optical probe signal. In yet another example embodiment, the modulator is an electro-optic intensity modulator.

Another aspect of the disclosed embodiments relates to an optical encoder incorporating an interferometric configuration that includes an optical multiplexer to receive an optical probe signal and an optical pump signal, a non-linear optical medium coupled to an output of the optical multiplexer and configured to effect phase modulation onto the optical probe signal in accordance with the optical pump signal, and forming a first arm of the interferometric configuration, an optical phase shifter positioned in a second arm of the interferometric configuration, and an optical demultiplexer coupled to an output of the non-linear optical medium to produce a phase-modulated probe signal. In this configuration, an interference pattern formed by optical signals from the two arms of the interferometric configuration comprises an amplitude-modulated optical signal that represents encoded information, and the optical phase shifter enables modulated phase information on the probe signal to be recovered in a range that spans multiples of 2π radians.

In one example embodiment, the interferometric configuration of the optical encoder is a Mach-Zehnder (MZ) configuration. In this embodiment, the optical encoder includes an optical splitter configured to receive the optical probe signal prior to entry into the optical multiplexer, and to produce a first version of the optical probe signal that is provided to the optical multiplexer and a second version of the optical probe signal that is provided to the phase shifter. The optical encoder further includes an optical combiner configured to receive an output of the optical demultiplexer and an output of the phase shifter to produce the amplitude-modulated optical signal. In one embodiment, the phase shifter includes a voltage tunable optical filter that provides an amplitude-to-time optical mapping. In another example embodiment, the above optical encoder further includes a dispersive element coupled to an output of the optical combiner to disperse spectral contents of the amplitude-modulated optical signal in time.

In yet another example embodiment, the interferometric configuration of the optical encoder is a Sagnac configuration in which the optical multiplexer is configured to operate as a first optical multiplexer/demultiplexer and the optical demultiplexer is configured to operate as a second multiplexer/demultiplexer. In this embodiment, the optical encoder includes an optical coupler configured to receive the optical probe signal prior to entry into the first optical multiplexer/demultiplexer, and to provide the optical probe signal to the first optical multiplexer/demultiplexer. The optical encoder further includes a first polarization rotator, a birefringent medium and a second polarization rotator positioned in a path between the optical coupler and the second optical multiplexer/demultiplexer, wherein the optical coupler is configured to output the amplitude-modulated signal. In one example embodiment, the optical encoder further includes a dispersive element coupled to an output of the optical coupler to disperse spectral contents of the amplitude-modulated optical signal in time. In one example embodiment, the first and the second polarization rotators are non-reciprocal polarization rotators.

Another aspect of the disclosed embodiments relates to an optical encoder that includes one or more dispersive elements positioned to receive an optical pump or an optical probe signal, and an optical multiplexer to receive the optical probe signal and the optical pump signal after spectral contents of one or both of the optical probe or the optical pump signals are expanded in time in accordance with the one or more dispersive elements. The optical encoder in this embodiment further includes a non-linear optical medium coupled to an output of the optical multiplexer to effect phase modulation onto the optical probe signal, and an optical demultiplexer coupled to an output of the non-linear optical medium to provide a phase-modulated probe signal. In one embodiment, time expansion of the optical probe or optical pump signals prior to entering the non-linear optical medium enables a more uniform phase modulation of the optical probe signal.

According to one example embodiment, a first dispersive element is positioned to receive the optical pump signal, a second dispersive element is positioned to receive the optical probe signal, and the optical encoder further includes a third dispersive element coupled to an output of the optical demultiplexer to receive the phase-modulated probe signal and to effect broadening of the phase-modulated probe signal in time. In another example embodiment, the first and the second dispersive elements effect broadening of the optical pump and the probe signals, respectively, to adjust temporal widths and peak powers of the optical probe and pump signals.

In yet another example embodiment, a first dispersive element is positioned to receive the optical pump signal and to expand spectral contents of the optical pump signal in time. In this embodiment, an output of the first dispersive element is coupled to a modulator, and the modulator is further configured to receive an input radio frequency (RF) signal and to modulate an optical signal received from the output of the first dispersive element in accordance with the RF signal. In this configuration, a second dispersive element is also coupled to an output of the modulator to further expand spectral contents of a modulated optical pump signal in time, and the multiplexer is configured to receive an output of the second dispersive element and the optical probe signal. In still another example embodiment, the modulator is an electro-optic (EO) intensity modulator, and is configured to modulate an intensity of the optical signal received from the output of the first dispersive element in accordance with the RF signal.

Another aspect of the disclosed embodiments relates to an optical encoder that includes a dual output electro-optic (EO) intensity modulator configured to receive an optical pump signal and a radio frequency (RF) signal, to modulate the optical pump signal according to RF signal, and to produce two complementary intensity-modulated pump signals. The optical encoder further includes two optical multiplexers, where each optical multiplexer is configured to receive one of the complementary intensity-modulated pump signals from the dual output EO intensity modulator and an optical probe signal. The optical encoder additionally includes two non-linear optical media, each coupled to an output of a corresponding optical multiplexer to effect phase modulation of the optical probe signals in accordance with a corresponding complementary intensity-modulated pump signal, two optical demultiplexers, each coupled to a corresponding optical medium, and an optical combiner coupled to outputs of the optical demultiplexers to produce an amplitude-modulated probe signal formed based on an interference pattern of complementary phase-modulated probe signals.

In one example embodiment, the optical encoder comprises an optical splitter configured to receive the optical probe signal and to provide a first version of the optical probe signal to one of the optical multiplexers and a second version of the optical probe signal to another one of the optical multiplexers.

Another aspect of the disclosed embodiments relates to an optical encoder that includes a dual output electro-optic (EO) intensity modulator configured to receive an optical pump signal and a radio frequency (RF) signal, to modulate the optical pump signal according to the RF signal, and to produce two complementary intensity-modulated pump signals. The optical encoder further includes a first optical multiplexer/demultiplexer to receive one of the complementary intensity-modulated pump signals from the dual output EO intensity modulator and an optical probe signal, a second multiplexer/demultiplexer to receive another one of the complementary intensity-modulated pump signals from the dual output EO intensity modulator, a non-linear media coupled between the first multiplexer/demultiplexer and the second multiplexer/demultiplexer to effect phase modulation on optical signals that traverse therethrough, and an optical coupler coupled to the first multiplexer/demultiplexer and to the second multiplexer/demultiplexer, and configured to receive an optical probe signal and to allow the optical probe signal to reach the first multiplexer/demultiplexer. In this embodiment, each of the first and the second multiplexer/demultiplexer is configured to operate as a multiplexer for optical beams that are input to the corresponding multiplexer/demultiplexer in one direction, and operate as a demultiplexer for a beam that is input therein in another direction. The optical coupler is further configured to provide an amplitude-modulated probe signal formed based on an interference pattern of complementary phase-modulated probe signals.

Another aspect of the disclosed embodiments relates to an optical encoder incorporating a Mach-Zehnder (MZ) interferometric configuration. The optical encoder an optical splitter configured to receive an optical probe signal and to produce a first and a second version of the optical probe signal, an optical multiplexer to receive the first version of the optical probe signal and an optical pump signal, and a first non-linear optical medium coupled to an output of the optical multiplexer and configured to effect phase modulation onto the first version of the optical probe signal in accordance with the optical pump signal, where the first non-linear optical medium forms part of a first arm of the MZ interferometric configuration. The optical encoder further includes a second non-linear optical medium that is substantially similar to the first non-linear optical medium in composition and length, and the second non-linear optical medium is coupled to an output of the optical splitter to receive the second version of the optical probe signal and forms part of a second arm of the MZ interferometric configuration. The optical encoder additionally includes an optical demultiplexer coupled to an output of the first non-linear optical medium to produce a phase-modulated probe signal, and an optical combiner coupled to the optical demultiplexer and to the second non-linear optical medium to combine the phase-modulated probe signal and the second version of the probe signal after propagation through the second optical medium and to produce an amplitude-modulated probe signal.

According to one example embodiment, matching characteristics of the first and the second non-linear optical media enable an improved recovery of phase-modulated information from an interference pattern produced by the optical combiner. In another example embodiment, the second non-linear medium matches optical loss, dispersion, and non-linear optical parameters of the first non-linear medium. In yet another example embodiment, the first and the second versions of the probe signals upon entry to the first and the second non-linear media have the same power levels. In yet another example embodiment, the second version of the probe signal upon entry to the second non-linear medium has a power level less than the power level of the second version of the probe signal upon entry to the second non-linear medium such that the self-phase modulation accrued by the two probes at the output of the non-linear medium are equal.

Another aspect of the disclosed embodiments relates to an optical encoder that includes N optical delay components, each configured to receive a train of optical pulses having a repetition rate that is 1/Nth of a repetition rate of a pump source, where N is greater than or equal to 2. Each delay component provides a different delay value for the corresponding train of optical pulses that is received by the delay component. The optical encoder further includes at least one optical multiplexer, where each optical multiplexer is configured to receive a first optical signal and an output from a corresponding optical delay component. The optical encoder also includes at least one non-linear optical medium, where each non-linear optical medium is coupled to a corresponding multiplexer to effect phase modulation onto each of the trains of optical pulses in accordance with an intensity of the first optical signal. The optical encoder additionally includes at least one optical demultiplexer, where each optical demultiplexer is coupled to an output of a corresponding non-linear optical medium to produce N phase-modulated optical signals, where a bandwidth for processing each of the N phase-modulated optical signals for conversion into an electrical domain is reduced by a factor that depends on N. In this configuration, backend (e.g., photodiode, RF amplifier, and/or analog-to-digital converter bandwidth requirements are improved or reduced.

In one example embodiment, each of the N optical delay components is configured to produce a time delay that is equal to $n.\Delta t$, where $0 \leq n \leq N-1$, and $\Delta t$ is a predetermined time separation interval. In another example embodiment, processing of each of the N phase-modulated optical signals can be carried out with: a reduced bandwidth requirement of one or more photodetectors configured to receive and convert the corresponding phase-modulated optical signal into an electrical signal, and a reduced processing bandwidth or throughput requirement on a digital processor that is configured to receive and process the electrical signals from the photodetector(s), as comparted to processing a phase-modulated optical signal that is produced in accordance with a train of optical pulses having a repetition rate that is equal to the repetition rate of the pump source.

In another example embodiment, the optical encoder further includes an optical splitter configured to receive the first optical signal and to produce N versions of the first optical signal. In yet another example embodiment, the optical encoder includes N optical multiplexers, where each optical multiplexer is configured to receive one of N versions of the first optical signal as the first optical signal. In still another example embodiment, the optical encoder includes N non-linear media and N optical demultiplexers, wherein each non-linear optical medium is configured to receive an output from a corresponding optical multiplexer, and each optical demultiplexer is coupled to an output of a corresponding non-linear optical medium. In one example embodiment, each train of optical pulses has a different spectral content than any of the other trains of optical pulses, the at least one optical multiplexer consists of one optical multiplexer, the at least one non-linear optical medium consists of one non-linear optical medium, and the at least one optical demultiplexer consists of one optical demultiplexer configured to produce the N phase-modulated optical signals of differing spectral contents.

Another aspect of the disclosed embodiments relates to an optical encoder that includes an optical splitter configured to receive an optical pump signal and to produce two outputs, an optical multiplexer configured to receive a first output of the optical splitter and an optical probe signal, a first non-linear optical medium configured to receive an output of the optical multiplexer, an optical demultiplexer configured to receive an output of the first non-linear optical medium and to produce a phase-modulated probe signal at its output, an intensity modulator having at least two outputs and configured to receive a second output of the optical splitter and a radio frequency (RF) signal, a first optical multiplexer/demultiplexer, a second optical multiplexer/demultiplexer, a second non-linear optical medium positioned between the first and the second optical multiplexer/demultiplexer, and an optical coupler. In this embodiment, a first output of the intensity modulator is coupled to the first optical multiplexer/demultiplexer, a second output of the intensity modulator is coupled to the second optical multiplexer/demultiplexer, the optical coupler is configured to receive and provide the optical probe signal to the first optical multiplexer/demultiplexer and to receive an output from the first optical multiplexer/demultiplexer, and the optical coupler is configured to receive and to provide optical signals to the second optical multiplexer/demultiplexer and to provide an amplitude-modulated probe signal at an output thereof.

In an example embodiment, both the phase-modulated probe signal and the amplitude-modulated probe signal include fluctuations associated with the optical pump signal, and variations representative of the RF signal input are only present in the amplitude-modulated probe signal, where a combined processing of the phase-modulated probe signal and the amplitude-modulated probe signal enable removal of at least some fluctuations associated with the optical pump signal. In another example embodiment, the intensity modulator is an electro-optic intensity modulator.

Another aspect of the disclosed embodiments relates to an optical encoder incorporating a Sagnac interferometric configuration. The optical encoder includes an optical circulator configured to allow an optical probe signal to reach an optical coupler, a first optical multiplexer/demultiplexer to receive the optical probe signal from the optical circulator and to receive an optical pump signal, a non-linear optical medium coupled to an output of the first optical multiplexer/demultiplexer and configured to effect phase modulation onto the optical probe signal in accordance with the optical pump signal, and a second optical multiplexer/demultiplexer coupled to an output of the non-linear optical medium. In this embodiment, each of the first and the second optical multiplexer/demultiplexer is configured to operate as a multiplexer for optical beams that are input to the corresponding optical multiplexer/demultiplexer in one direction, and operate as a demultiplexer for optical beams that are input therein in another direction. Additionally, the second optical multiplexer/demultiplexer is coupled to the optical coupler to allow a first one of complementary amplitude-modulated optical signals to be directed from a first output of the optical coupler and to an output of the optical circulator, and a second one of complementary amplitude-modulated optical signals is provided through a second output of the optical coupler.

In an example embodiment, the complementary amplitude-modulated optical signals enable an improved recovery of encoded information. In another example embodiment, the optical encoder further includes a balanced photodetector configured to receive the complementary amplitude-modulated optical signals.

Implementations of the subject matter and the functional operations described in this patent document can be implemented in various systems, optical components, digital electronic circuitry, or in computer software, firmware, or hardware, including the structures disclosed in this specification and their structural equivalents, or in combinations of one or more of them.

Part of the disclosed subject matter in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

APPENDIX A—TIMING MEASUREMENT APPARATUS

Generating microwave signals with high spectral purity and stability is crucial in communication systems, radars, signal processing, radio astronomy, satellites, GPS navigation, spectroscopy, and in time and frequency metrology. The disclosed techniques can be implemented in various embodiments to obtain an accurate measurement of timing errors to generate a frequency agile radio-frequency (RF) signal. The disclosed embodiments also allow the timing information to be recorded in digital form for subsequent compensation or processing and allow timing error information to be obtained and utilized in real time.

Optical frequency combs can achieve a phase noise that is orders of magnitude lower than what is available from commercial microwave references. Thus, they have become revolutionary tools in high-precision applications, such as low phase noise microwave oscillators and generators, low sample timing error of high frequency microwaves and millimeter waves, photonic analog-to-digital converters, photonics-based radars, dual-comb ranging, timing synchronization and distribution, and alike.

However, all free-running optical frequency combs exhibit high phase noise at various timescales. Timing variations or irregularity of the optical pulse trains, such as jitter, become important properties for optical frequency comb applications. For example, the general approach to remove or reduce jitter from an optical pulse train in an RF signal generator is to measure the jitter of an optical pulse train as accurately as possible, use that jitter information to correct its effects as precisely as possible, and use that jitter corrected signal to make a very low jitter RF signal generator. However, existing techniques that use an electronic reference can be limited by the poor high frequency offset phase noise of electronic references. Techniques that use an optical reference can be limited by the poor low frequency offset phase noise of optical references. Techniques that use a stabilized continuous-wave reference require ultrahigh quadrature cavities which are extremely fragile and temperature and/or vibration sensitive. Some of the conventional techniques also require multi-staged phase-locked loops for both the repetition rate and the carrier-envelope offset, or complicated subsystems that perform spectral broadening and carrier-envelope offset control.

Many conventional techniques are limited by environmental sensitivity, such as temperature or vibrations through various physical mechanisms. In rougher environments, the amount of requisite isolation increases, posing more challenges to the size and weight of the system. Furthermore, many conventional techniques measures timing irregularities (such as jitter) using an averaging instrument (e.g. the RF spectrum analyzer). However, temporal dependence of the timing error information is lost during averaging, so this information cannot be used to correct the error in real-time. It is thus desirable to obtain a real-time timing error measurement so as to create a signal generator that is more stable.

Figures 40A, 40B, 40C:
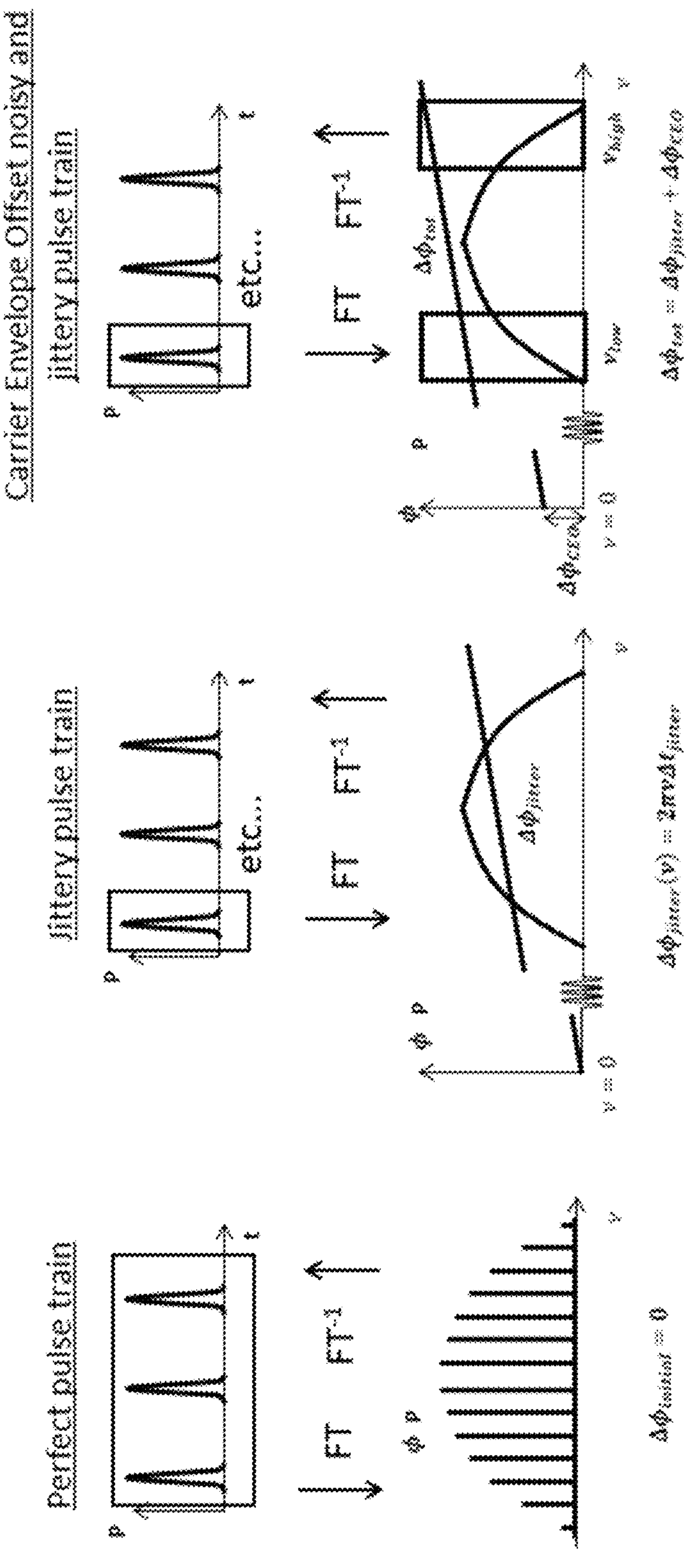
FIG. 40(*a*) illustrates a perfect pulse train and its associated optical spectrum FIG. 40(*b*) illustrates an example phase offset caused by jitter in the pulse train.

The techniques disclosed herein, among other features and benefits, overcome the above limitations and rely in-part on a digitally corrected optical delay reference. The disclosed embodiments enable precise measurements of timing errors in signals using optical techniques. The examples provided herein, by the way of example and not by limitation, sometimes refer to jitter measurements. It should be understood, however, that the disclosed embodiments are applicable to measuring all types of timing errors, and can be specially beneficial in applications where real-time timing error measurements on a pulse-by-pulse basis is needed for in-situ correction or optimization of signal generation or processing systems. The concept of the digitally corrected delay reference is illustrated using jitter measurements as an example. FIGS. 40A-40C illustrate schematic diagrams of performing jitter measurements. When the pulse has a specific timing component, the pulse demonstrates a phase slope associated with the timing. FIG. 40(*a*) illustrates a perfect pulse train and its associated optical spectrum. The initial phase slope in this particular example is 0. In addition to the phase slope, there is also a phase offset caused by any irregularities in the timing component. FIG. 40(*b*) illustrates an example phase offset caused by jitter in the pulse train. Furthermore, the phase offset is also related to the carrier envelope offset (CEO) phase. This is the phase of the optical pulse carrier, which can vary independently from the timing of the pulse itself. FIG. 40(*c*) illustrates an example phase offset caused by both jitter and carrier envelope offset. When two pulses interfere with each other, the spectral interference pattern encodes the phase differences in the intensity pattern. Given two phase offsets $\Delta\emptyset_{high}$ and $\Delta\emptyset_{low}$ measured at different frequencies, $\upsilon_{high}$ and $\upsilon_{low}$, respectively, the phase offset caused by carrier envelope offset $\Delta\emptyset_{CEO}$ can be eliminated as follows:

$$\Delta\phi_{high} - \Delta\phi_{low} = (2\pi\nu_{high}t_{jitter} + \Delta\phi_{CEO}) - (2\pi\nu_{low}t_{jitter} + \Delta\phi_{CEO}) \quad \text{Eq. (1)}$$

$$= 2\pi(\nu_{high} - \nu_{low})t_{jitter} \quad \text{Eq. (2)}$$

The phase offset caused by jitter can then be determined as:

$$\Delta t_{jitter} = \frac{(\Delta\phi_{high} - \Delta\phi_{low})}{2\pi(\nu_{high} - \nu_{low})} \quad \text{Eq. (3)}$$

The different frequency values $\upsilon_{high}$ and $\upsilon_{low}$ can be selected using different optical filters. An optical filter is a device that takes in an optical wave and outputs that optical wave with some wavelengths of the spectrum with lower output power than others. For example, an optical filter can pass a contiguous fraction of the input bandwidth, with each of the optical filters passing a different band of wavelengths, e.g. arrayed waveguide gratings, thin-film filters, or fiber Bragg gratings. Many optical filters have multiple outputs, each corresponding to a distinct frequency band of the input. In this document, optical filters are also referred as wavelength division multiplexers (WDMs). In addition to arrayed waveguide gratings and thin-film filters, they can be constructed in multiple ways, including but not limited to: a coupler followed by single output filters on each output, a set of reflective filters can be combined with circulator, such that the reflection from one filter is circulated to the next filter. The filters can be selected so that they can cover the optical spectrum of the train of pulse while maintaining sufficient separation of the frequencies. Phase offsets caused by other types of timing variations or irregularities can be determined in a similar fashion.

Figure 41A:
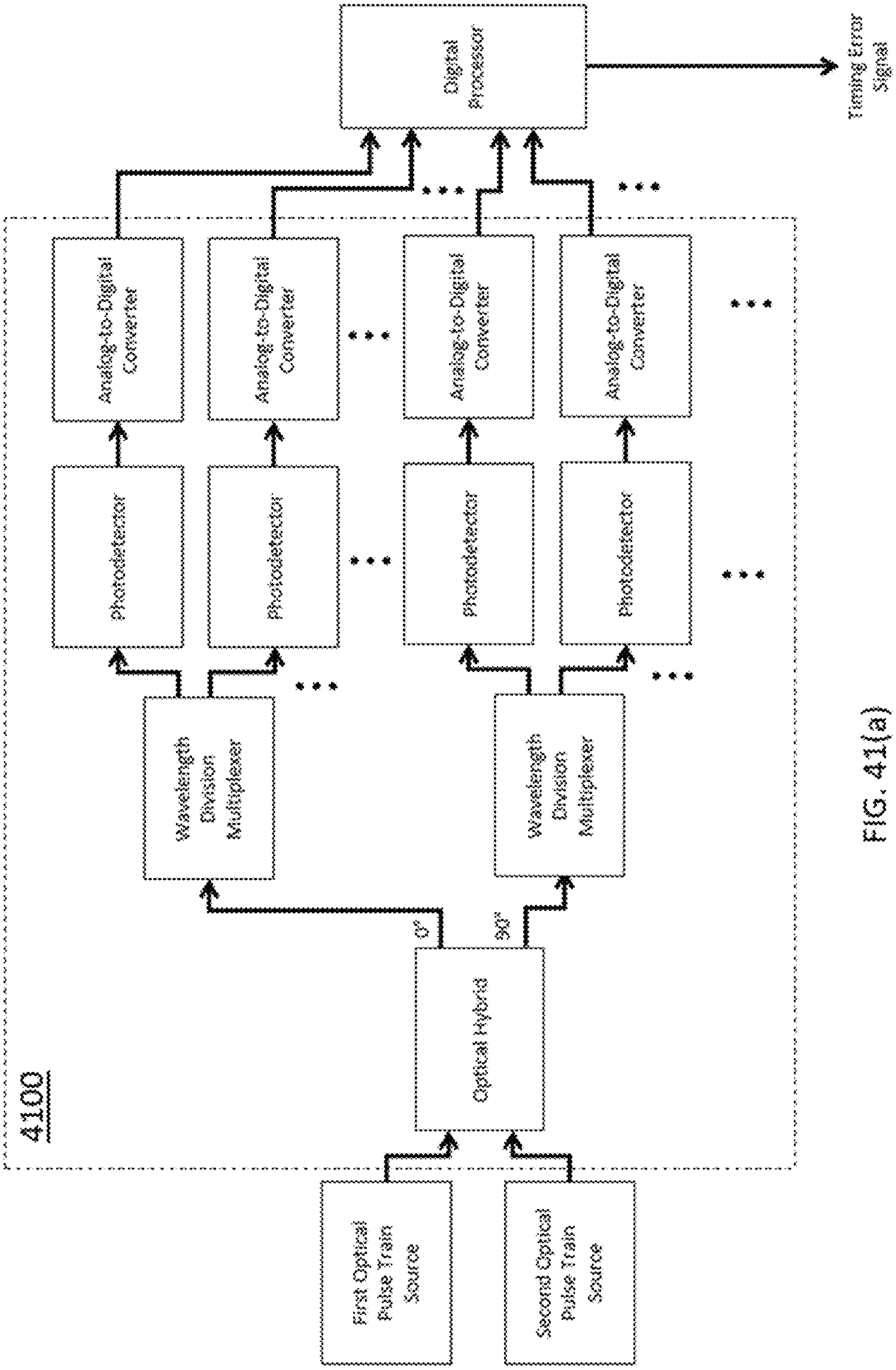
FIG. 41(*a*) illustrates an example timing measurement apparatus in accordance with the present technology.
Figure 41B:
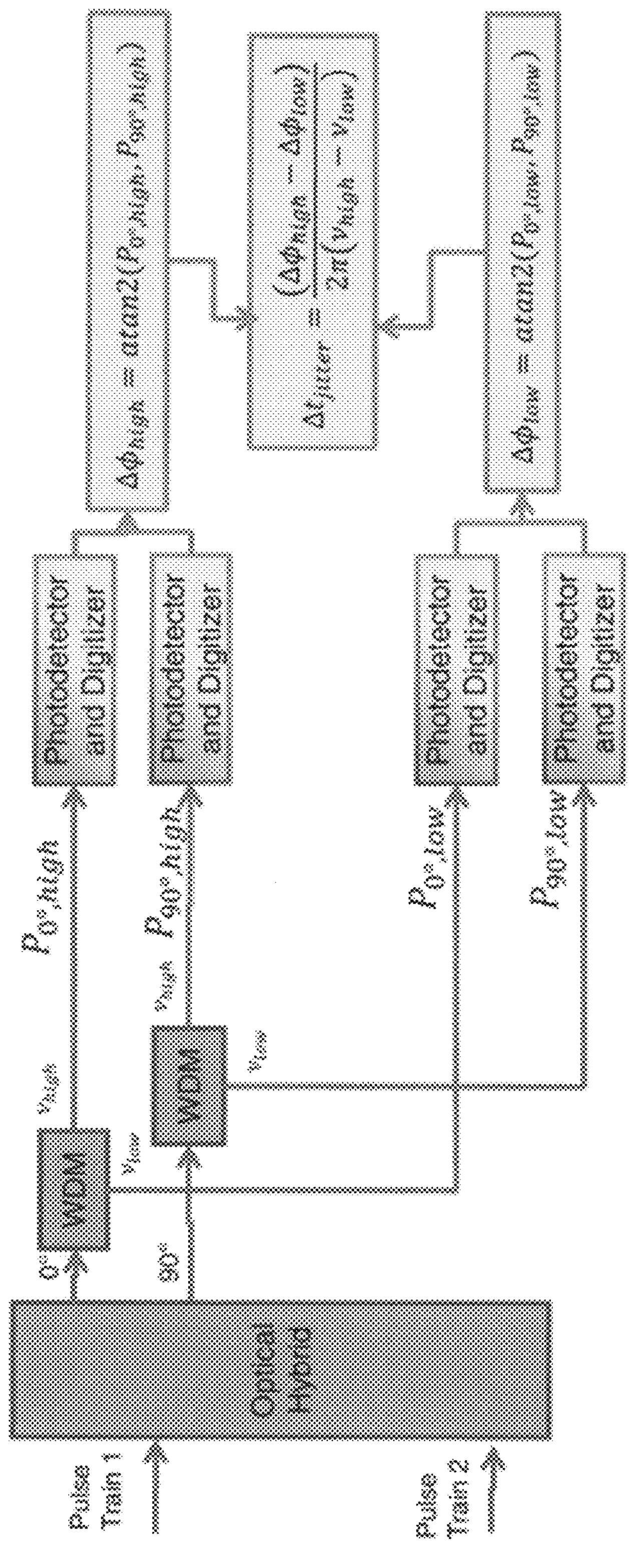

FIG. 41(*a*) illustrates an example timing measurement apparatus 4100 in accordance with the present technology. The apparatus 4100 accepts two inputs into an optical hybrid device. The optical hybrid is a device that can include a number of beam splitters and one or more quarter-wave plates. The optical hybrid includes at least two inputs and at least two outputs such that the two inputs are interfered at each output, with a phase difference between the inputs that is different for each output. For example, the device can produce 0 and 90-degree phase difference outputs, or 0, 90, 180, and 270-degree outputs. In some embodiments, the phase difference between the outputs can have values other than 90°.

In this embodiment, the optical hybrid generates two outputs whose phases are shifted 90 degrees from each other (e.g., 0° and 90° outputs). The two outputs of the optical hybrid are fed into wavelength division multiplexers (e.g., optical filters). The outputs of each wavelength division multiplexer (e.g., $\upsilon_{high}$ and $\upsilon_{low}$) are fed into photodetectors to convert optical signals into radio-frequency (RF) signals. The RF outputs from the photodetectors are then digitized using analog-to-digital converters.

The digital signals output from the timing measurement apparatus can be fed into a digital processor to calculate a pulse pair phase difference at each wavelength. In some embodiments, the digital processor is a part of the timing measurement apparatus. In general, at least some of the components in FIG. 41(*a*) (as well as other figures in this patent document) can be implemented as part of the timing measurement device, or as separate components and/or at remote locations with respect to other components of the system. For example, in some embodiments, the digital processor is a separate component implemented outside of the timing measurement apparatus. Similarly, the analog-to-digital converters or even, in some instances, the photodetectors can be implemented as separated components.

FIG. 41(*b*) illustrates a different version of a timing measurement apparatus in accordance with the present technology to provide better understanding of the phase offset calculations. The phase offset $\Delta\varnothing_{high}$ can be obtained as:

$$\Delta\phi_{high} = \mathrm{atan2}(P_{0°,high}, P_{90°,high}) \qquad \text{Eq. (4)}$$

The phase offset $\Delta\varnothing_{low}$ can be obtained as:

$$\Delta\phi_{low} = \mathrm{atan2}(P_{0°,low}, P_{90°,low}) \qquad \text{Eq. (5)}$$

The phase offset caused by timing error (e.g., jitter) can then be determined according to Eq. (3). As shown in Eq. (3), the pulse pair phase differences at each wavelength for the same original pulse are subtracted to eliminate the carrier envelope offset phase. The result can be scaled by the optical frequency difference between phases from any pair of wavelengths to yield the time difference between the pulses.

Figure 42A:
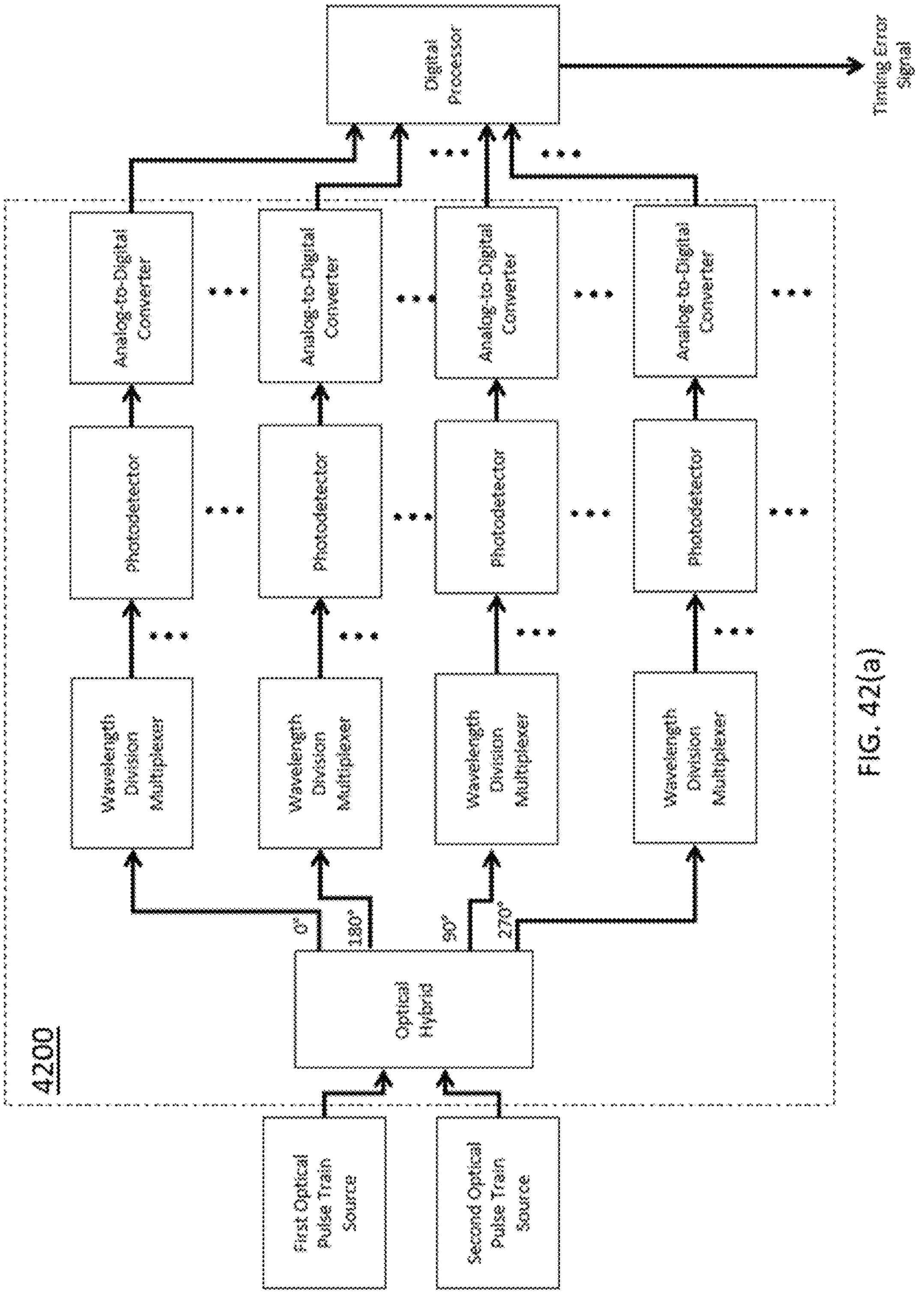
FIG. 42(*a*) illustrates another example timing measurement apparatus in accordance with the present technology.
Figure 42B:
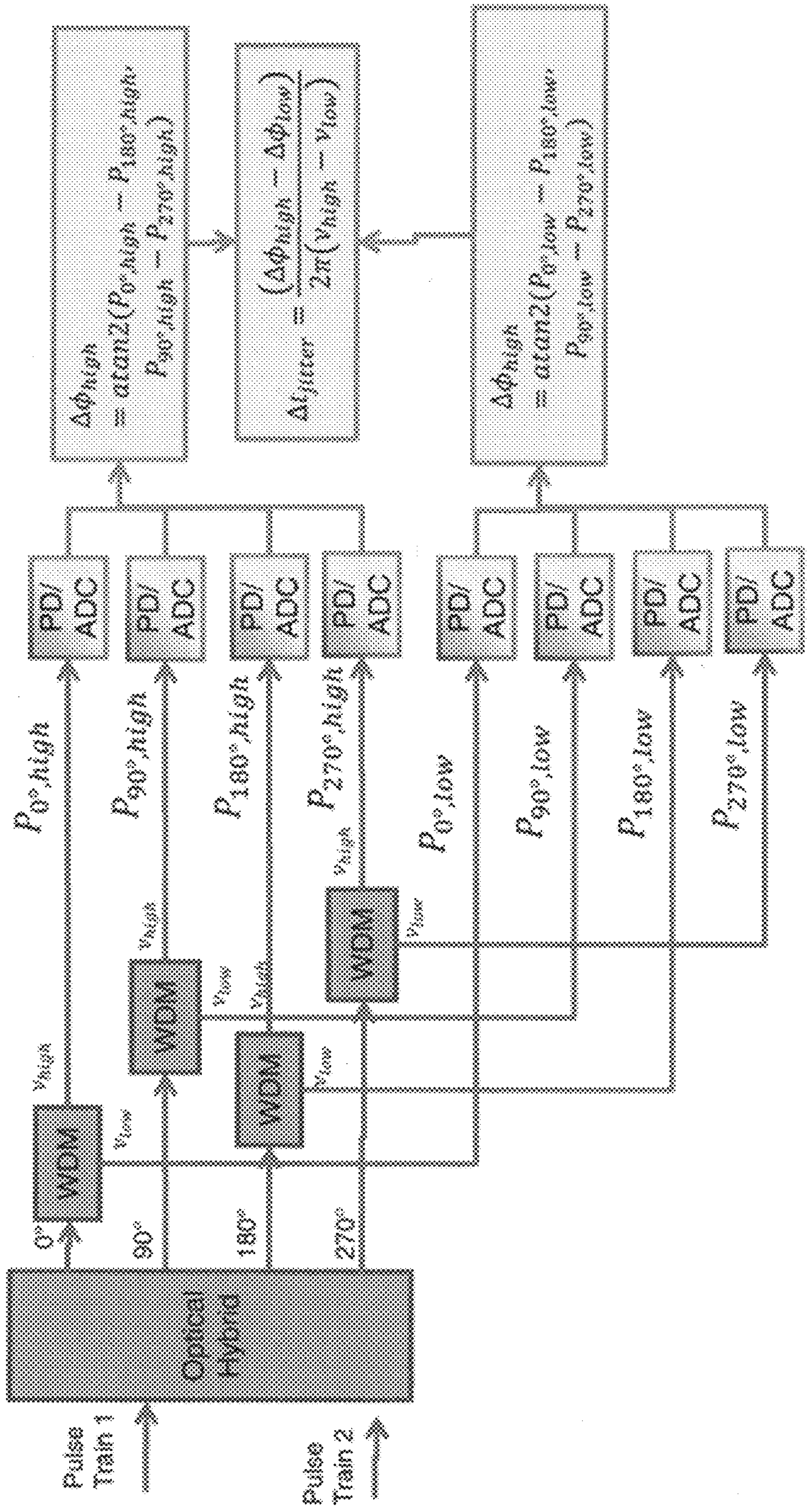

FIG. 42(*a*) illustrates another example timing measurement apparatus 4300 in accordance with the present technology. The apparatus 4300 accepts two inputs into an optical hybrid device. The optical hybrid generates four outputs whose phases are shifted 90 degrees from each other (e.g., 0°, 90°, 180°, and 270° outputs). The four outputs of the optical hybrid are fed into wavelength division multiplexers. The outputs of each wavelength division multiplexer (e.g., $\upsilon_{high}$ and $\upsilon_{low}$) are fed into photodetectors to convert optical signals into radio-frequency (RF) signals. The RF outputs from the photodetectors are digitized using analog-to-digital converters.

The digital signals output from the timing measurement apparatus are fed into a digital processor. Similar to the embodiment shown in FIG. 41, some of the apparatus components, such as the digital processor, can be a part of the timing measurement apparatus or a separate component implemented outside of the timing measurement apparatus. The digital processor calculates the difference between the 0° and 180° pulses from each frequency band as well as the 90° and 270° outputs from each frequency band. The two differences are fed as inputs into the pulse pair phase difference algorithm.

FIG. 42(*b*) illustrates a different version of a timing measurement apparatus in accordance with the present technology to provide better understanding of the phase offset calculations. The phase offset $\Delta\varnothing_{high}$ can be obtained as:

$$\Delta\phi_{high} = \mathrm{atan2}(P_{0°,high} - P_{180°,high}, P_{90°,high} - P_{270°,high}) \qquad \text{Eq. (6)}$$

The phase offset $\Delta\varnothing_{low}$ can be obtained as:

$$\Delta\phi_{low} = \mathrm{atan2}(P_{0°,low} - P_{180°,low}, P_{90°,low} - p_{270°,low}) \qquad \text{Eq. (7)}$$

The phase offset caused by timing error (e.g., jitter) can then be determined according to Eq. (3).

Figure 43A:
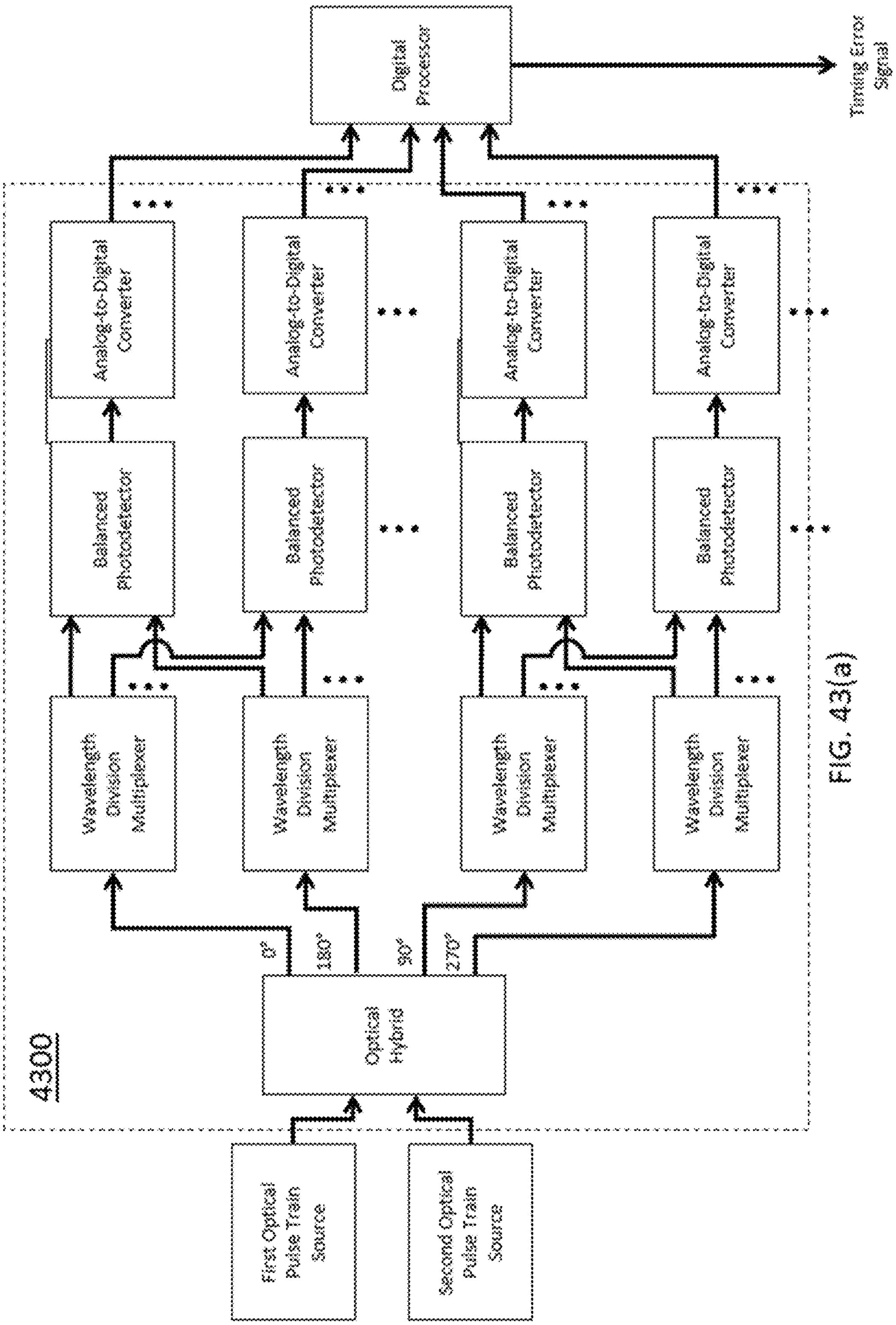
FIG. 43(*a*) illustrates another example timing measurement apparatus in accordance with the present technology.
Figure 43B:
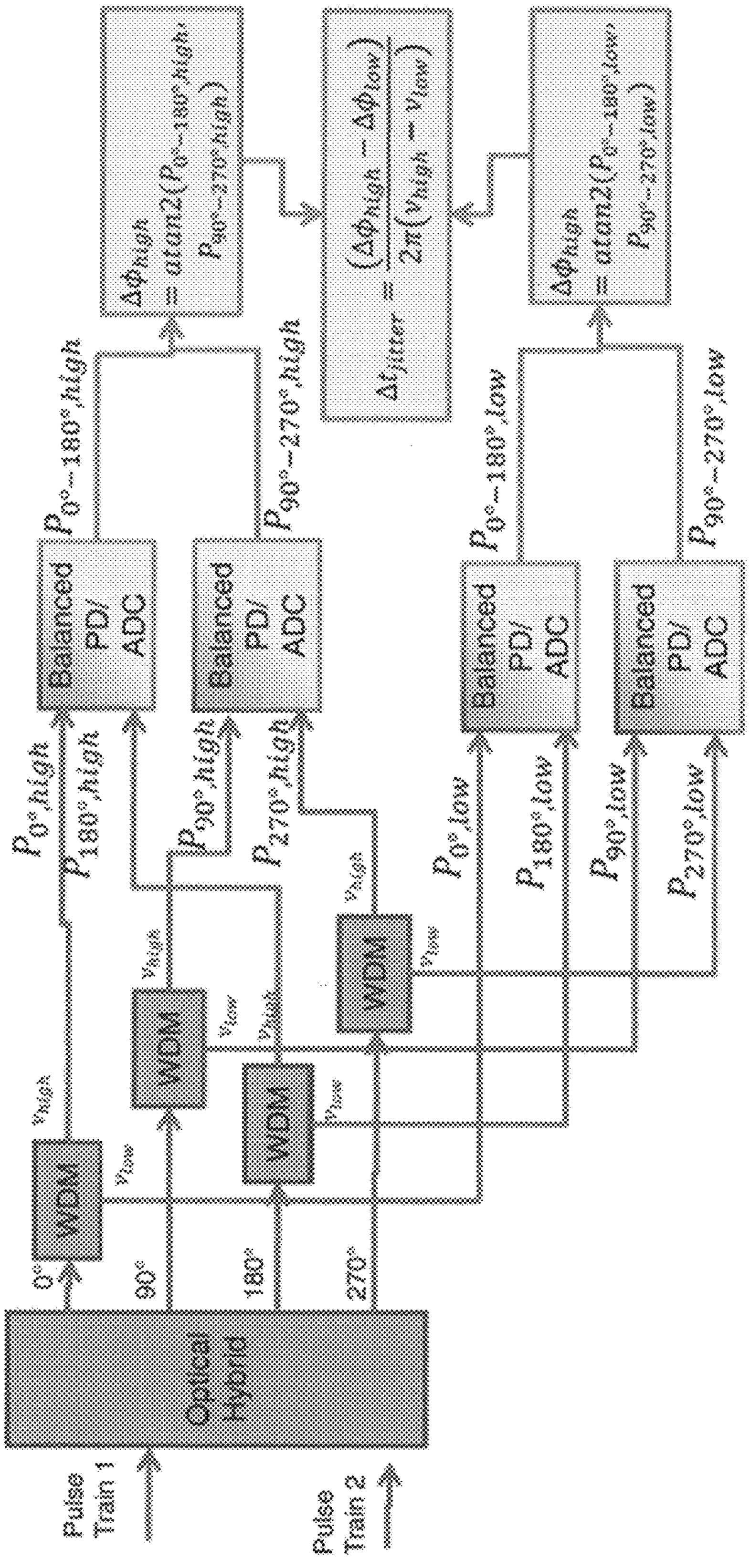

FIG. 43(*a*) illustrates another example timing measurement apparatus 4200 in accordance with the present technology. The apparatus 4200 accepts two inputs into an optical hybrid device. The optical hybrid generates four outputs whose phases are shifted 90 degrees from each other (e.g., 0°, 90°, 180°, and 270° outputs). The 0° and 180° pulses from the optical hybrid are directed to two WDMs. Outputs from the same frequency band of the 0° and 180° pulses are directed into one set of balanced photodetectors. Likewise, outputs from the same frequency band of the 90° and 270° pulses are directed into another set of balanced photodetectors.

FIG. 43(*b*) illustrates a different version of a timing measurement apparatus in accordance with the present technology. The phase offset $\Delta\varnothing_{high}$ can be obtained as:

$$\Delta\phi_{high} = \mathrm{atan2}(P_{0°-180°,high}, P_{90°-270°,high}) \qquad \text{Eq. (8)}$$

The phase offset $\Delta\varnothing_{low}$ can be obtained as:

$$\Delta\phi_{low} = \mathrm{atan2}(P_{0°-180°,low}, P_{90°-270°,low}) \qquad \text{Eq. (9)}$$

The phase offset caused by timing error (e.g., jitter) can then be determined according to Eq. (3).

Figure 44:
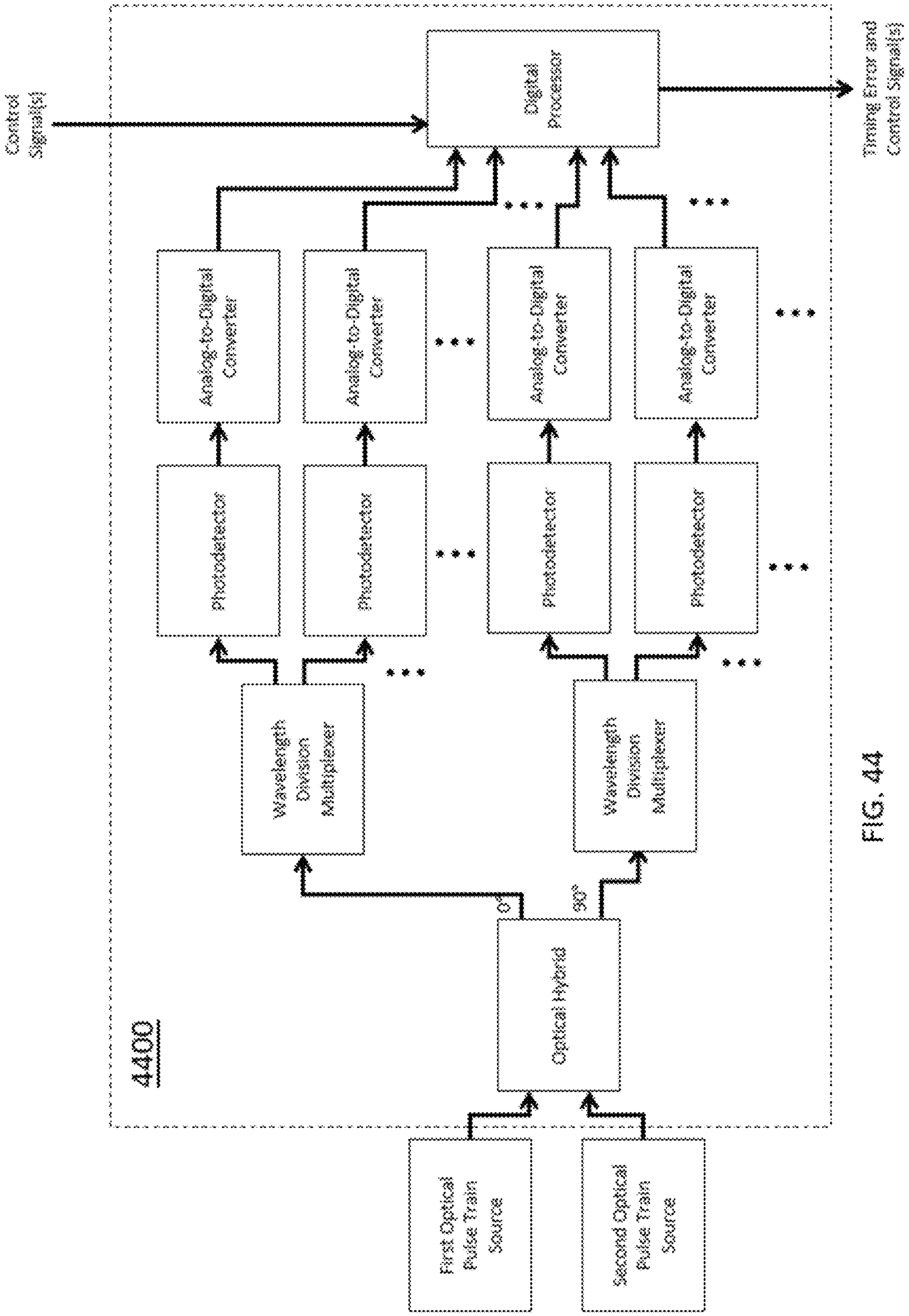
FIG. 44 illustrates yet another example timing measurement apparatus in accordance with the present technology.

FIG. 44 illustrates yet another example timing measurement apparatus 4400 in accordance with the present technology. In this embodiment, the timing measurement apparatus 4400 is similar to the apparatus 4100 in FIG. 41(*a*) but is illustrated as including the digital processor as part of the apparatus. In addition, the digital processor receives not only the digital signals from the analog-to-digital converters but also one or more control signals. The one or more control signals can be used to account for timing offsets or timing error compensation, can be signals associated with environmental and external factors, such as temperature, vibrations or other channel information. The digital processor can use such control signal to correct or compensate for such timing or environmental factors.

Figure 45:
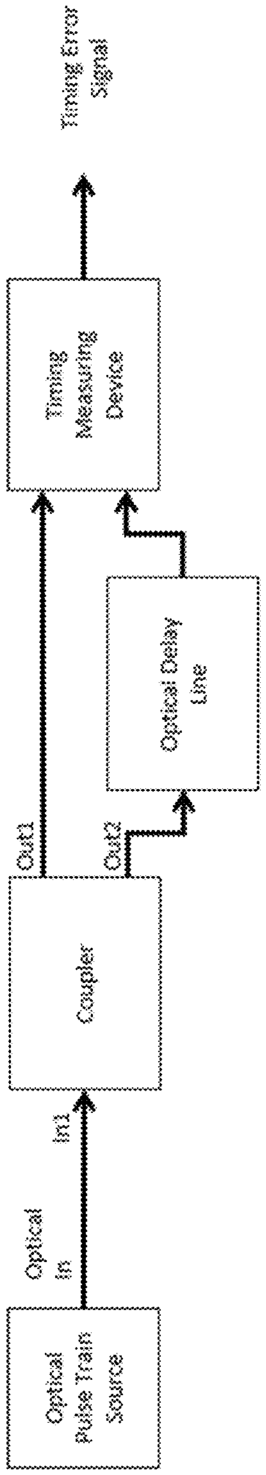
FIG. 45 illustrates an example architecture of a timing measurement system in accordance with the present technology.

FIG. 45 illustrates an example architecture of a timing measurement system 4500 in accordance with the present technology. As shown in FIG. 45, a pulse source generates an optical pulse train. The optical pulse train is then provided to a coupler. The coupler is a device that splits the input optical wave (or combines two input optical waves from two ports) into two output optical waves at ports Out1 and Out2, each with a fraction of the power of the input(s). The coupler can maintain the polarization state of the input for optimal operation. In this embodiment, one of the outputs of the coupler is directed into a timing measurement device directly. The other output of the coupler is fed into the timing measurement device (such as those shown in example configurations of FIGS. 41 to 44) via an optical delay component. The optical delay component can be a polarization maintaining optical fiber, such as an integrated photonic optical delay line (e.g. silicon photonic, planar lightwave circuit, InP, GaAs, etc.). The length of the optical delay can be chosen to overlap pulses that are N≥1 periods apart.

Figure 46:
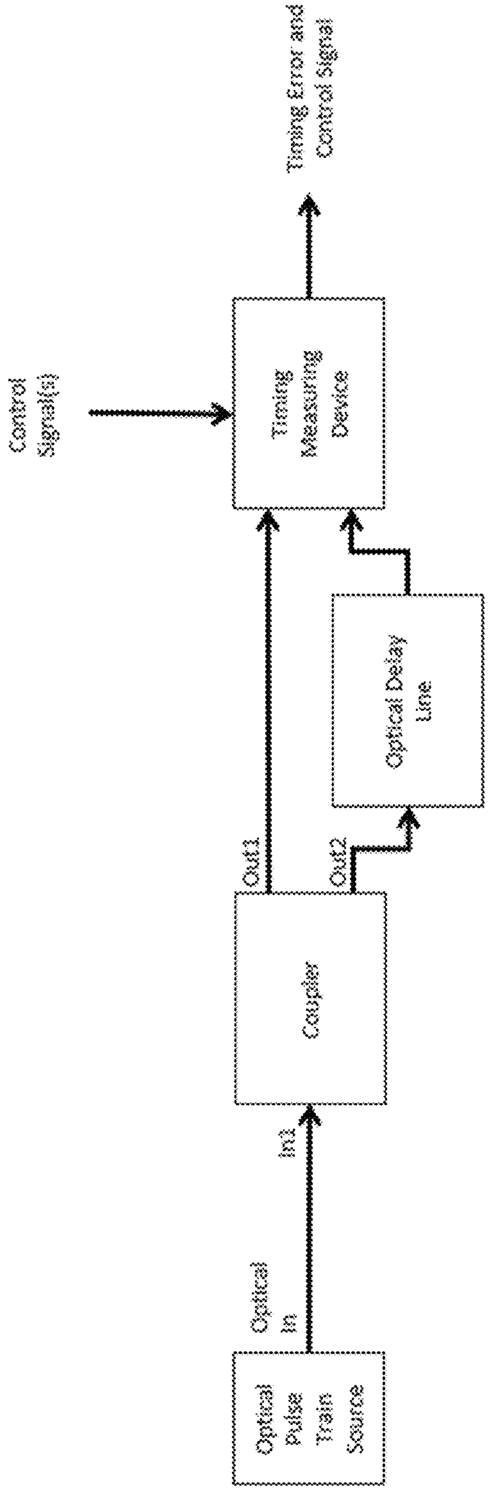
FIG. 46 illustrates another example architecture of a timing measurement system in accordance with the present technology.

FIG. 46 illustrates another example architecture of a timing measurement system 4600 in accordance with the present technology. In this embodiment, the timing measurement system 4600 accepts one or more control signals so that a timing offset can be added to the timing error signal. In both embodiments shown in FIG. 45 and FIG. 46, the optical hybrid, which is a part of the timing measurement device, eliminates the need for a phase locked loop and repetition rate tunable laser as used in some of the conventional techniques. The timing error information can be recorded in the digital form so that it can be used for compensation or combined with other subsequent processing. In some embodiments, the average peak of the pulses from the photodetectors can be aligned to the sample time of the digitizer, whose sample rate is equal to the pulse repetition rate.

Figure 47:
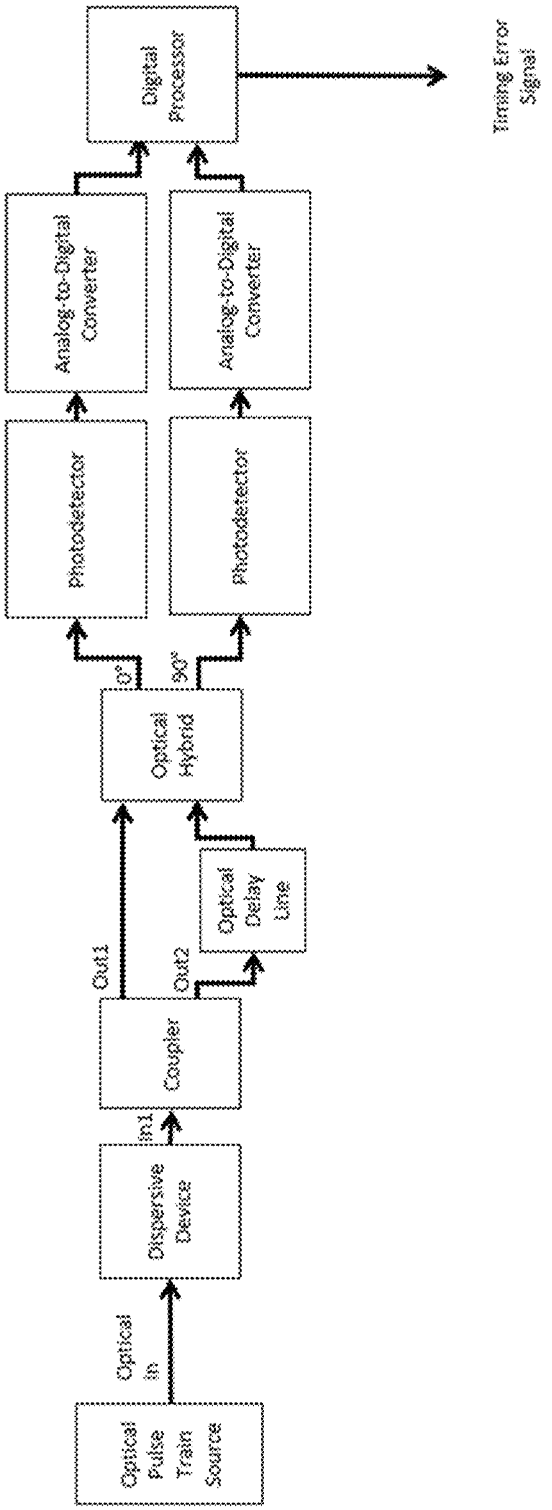
FIG. 47 illustrates another example architecture of a timing measurement system in accordance with the present technology.

FIG. 47 illustrates another example architecture of a timing measurement system 4700 in accordance with the present technology. This embodiment can be implemented when the digitizer sample rate is higher than the pulse repetition rate, and the multiple samples on each pulse correspond to the multiple optical frequencies of the pulse. The timing measurement system 4700 here includes a dispersive device that separates each pulse's optical frequencies temporally. The system 4700 then aligns the average peak of the pulses from the photodetectors to the sample time of the digitizers. The outputs from the optical hybrid are fed directly to the photodetectors, thereby removing the need for additional photodetectors and digitizers. Alternatively, multiple dispersive devices can be used to connect the outputs from the optical hybrid to the photodetectors. The pulses are temporally aligned either in the analog domain (e.g., using optical delay lines) or in the digital processor with a shift (e.g. using circshift). The digital processor then processes the samples corresponding to the same pulse. The phase offset ΔØ(n, m) as a function of pulse number n and sample point within a single pulse m can be obtained as:

$$\Delta\phi(n, m) = \mathrm{atan2}(P_{0^\circ}(n, m), P_{90^\circ}(n, m)) \quad \text{Eq. (10)}$$

In some embodiments, a line can be fit to the independent variable optical frequency ω, which is related to sample number m by the frequency-time mapping, and dependent variable ΔØ(n,m), for a single pulse, yielding an intercept and slope for each pulse. The timing error can be deemed as being proportional to the slope of this line.

Figure 48:
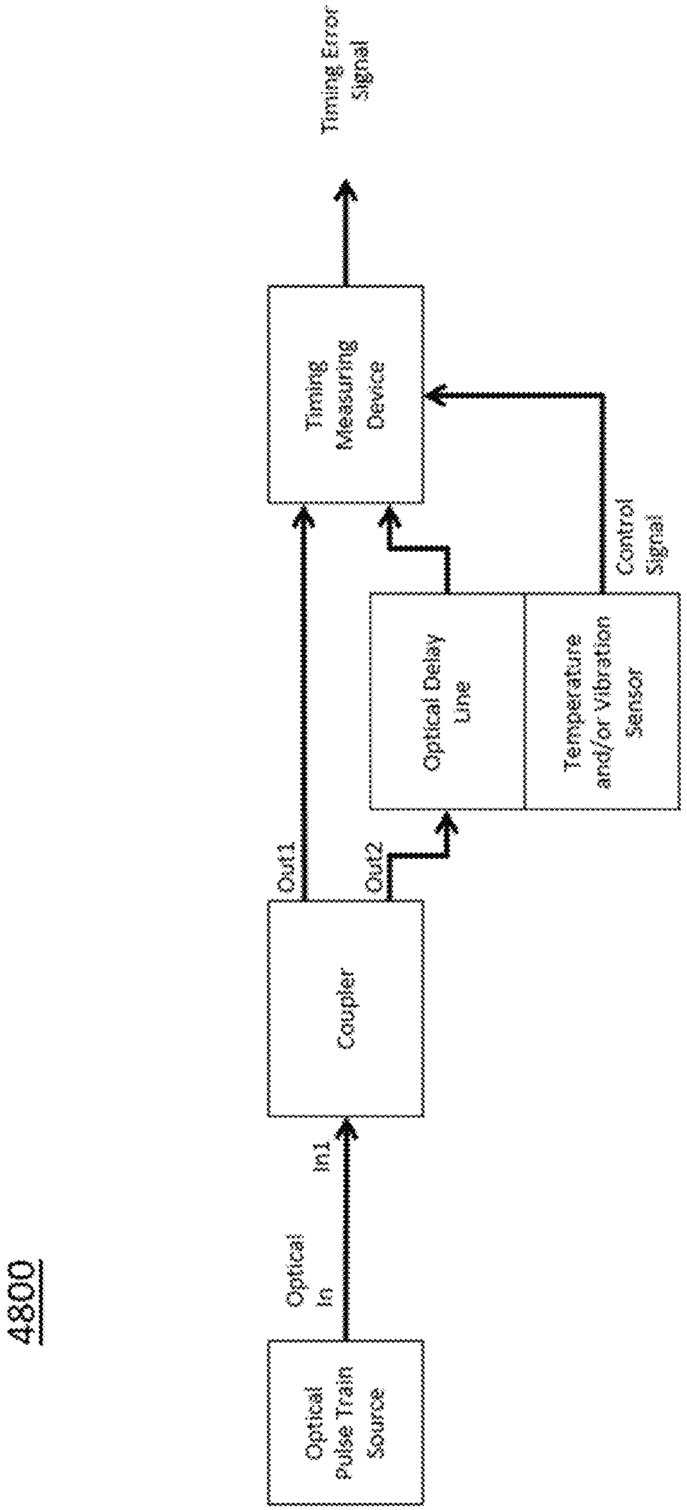
FIG. 48 illustrates an example architecture of a timing measurement system that reduces environmental dependency in accordance with the present technology.

Typically, optical delay lines have temperature and vibration dependency. FIG. 48 illustrates an example architecture of a timing measurement system 4800 that reduces environmental dependency in accordance with the present technology. The timing measurement system 4800 adds a temperature and/or vibration sensor onto the optical delay line so that information from the sensor can be used to digitally remove or reduce optical delay variations caused by environmental fluctuations on the timing error measurement.

Figure 49:
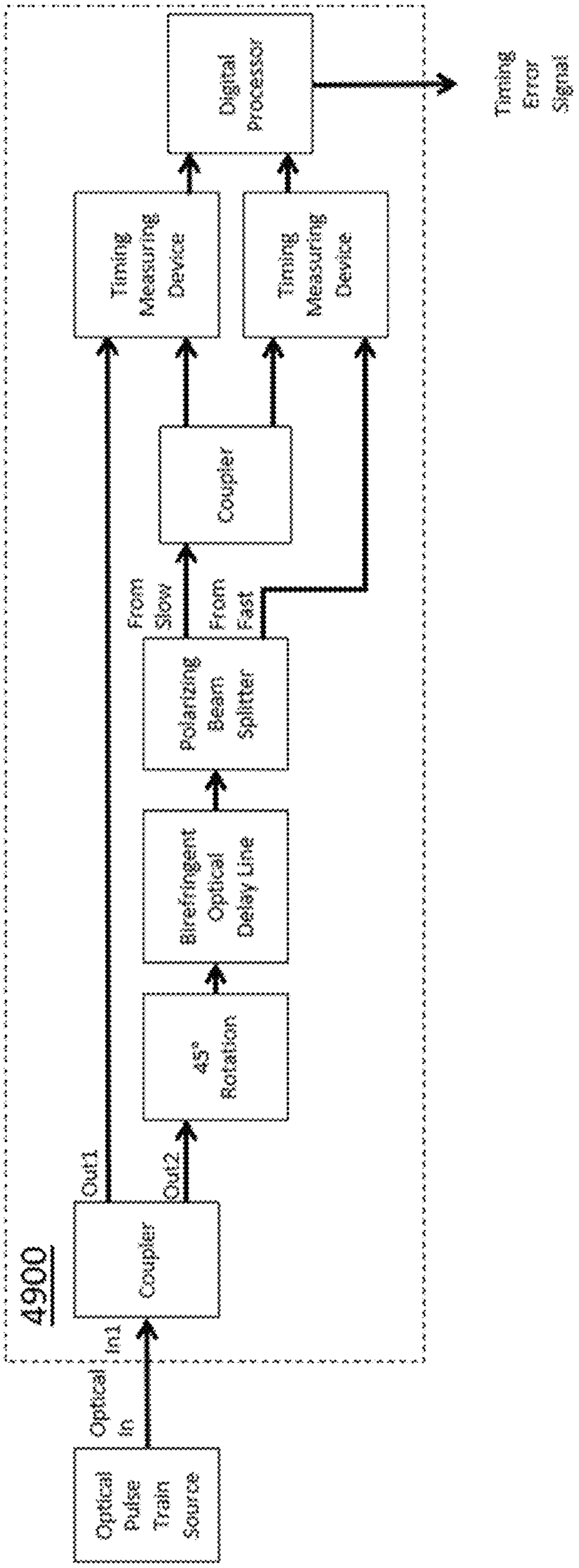
FIG. 49 illustrates another example architecture of a timing measurement system in accordance with the present technology.

FIG. 49 illustrates another example architecture of a timing measurement system 4900 in accordance with the present technology. In this embodiment, the optical pulse train is coupled into a first coupler to create two copies: Out1 and Out2. The first copy, Out1, is transmitted directly into a first timing measurement device. The second copy, Out2, is fed into both polarizations of a birefringent optical delay line that maintains polarization. In some embodiments, the polarizations are created by a polarization rotator, such as a 45-degree splice that sends linearly polarized light half into each polarization, that is placed between the coupler and the birefringent optical delay line. The optical signal from the optical delay line is then fed into a polarizing beam splitter that separates light that travels through the slow and fast axes of the birefringent optical delay line. Light from one axis (e.g. slow) is sent to a second coupler. One output of the second coupler is fed into the first timing measurement device, whose other input receives the first copy of the first optical pulse train Out1. The other output of the second coupler and light from the other axis (e.g. fast) from the beam splitter are fed into a second timing measurement device.

The first timing error signal $t_{TMD1}$ (n) as a function of measurement number n from the first timing measurement device is between pulses that are many pulse periods (M) apart, and the delay is proportional to temperature changes ΔT (n) that vary with measurement number n and with coefficient $K_1$ that is independent of n due to changes in the delay line's length and group index from temperature changes. The second timing error $t_{TMD2}$(n) from the second timing measurement device is between pulses that are a few pulse periods (N) apart, and the delay is proportional to a temperature change ΔT(n) with coefficient $K_2$ that is independent of n due to changes in the delay line's length and birefringence. Both signals are sensitive and linearly proportional to temperature, yielding a linear system with two equations (relationship between temperature change and single or dual polarization delay) and two unknowns (temperature change and delay between each far apart pulse pair).

$$t_{TMD1}(n) = M\Delta t(n) + t_1 + K_1\Delta T(n) \quad \text{Eq. (11)}$$

$$t_{TMD2}(n) = N\Delta t(n) + t_2 + K_2\Delta T(n) \quad \text{Eq. (12)}$$

where Δt(n) is the timing difference between adjacent pulses, averaged over M pulses; $t_1$ and $t_2$ can be freely chosen, e.g. such that for the first measurement point n=1, Δt(1)=0 and ΔT(1)=0 for both equations; regardless, $t_1$ and $t_2$ do not vary with n. As long as the ratio of the timing changes to temperature is different from the ratio of number of pulse periods apart (which is the case for standard polarization maintaining fiber), the system of equations Eq.

(11) and Eq. (12) is invertible. Solving that system yields the delay between pulses from the optical pulse train.

Figure 50:
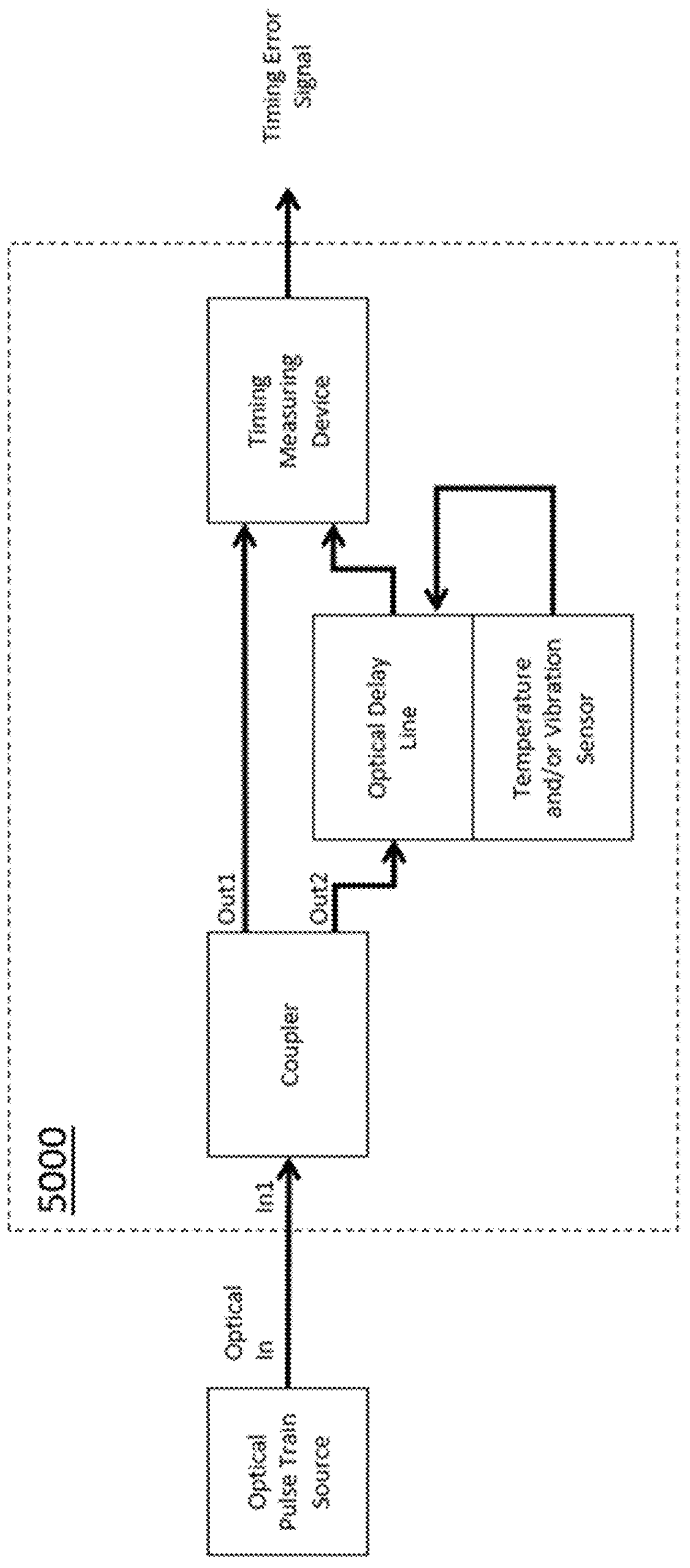
FIG. 50 illustrates another example architecture of a timing measurement system in accordance with the present technology.

FIG. 50 illustrates another example architecture of a timing measurement system 5000 in accordance with the present technology. In this embodiment, the timing measurement system 5000 can stabilizes the optical delay line using a temperature and/or vibration sensor. Information from the temperature and/or vibration sensor can create a compensational signal along the optical delay line. The compensation signal can be sent to a delay line adjustment device, e.g. a fiber stretcher, a heater, or a tunable optical delay line placed before or after the optical delay line to perform the stabilization.

degree/other channels and/or phase differences between channels besides 90 degrees. In addition, 0° and 90° pulses (as well as the 180° and 270° pulses) are ideally proportional to the sine and cosine of the modulated phase at the time of sampling. Thus, when plotted on the axes of a graph, the 0° and 90° pulses (similarly, the 180° and 270° pulses) from all possible modulated phases should form a circle. Any deviation from a true circle is a result of distortion in the system. To remove such distortions, the digital processor can sample the received data to fit an ellipse to the shape (e.g. using a least-squares fit). From the ellipse coefficients, the digital processor can calculate coefficients to transform that ellipse to a circle to removes biases and/or offsets in the components such as the modulators, digitizers, etc.

What is claimed is:

1. An optical encoder with improved bandwidth requirements, comprising:

an optical splitter configured to receive a first optical signal and to produce N output optical signals, wherein N is greater than or equal to 2;

a pump source configured to generate the first optical signal and having a repetition rate;

N optical delay components, each configured to receive a corresponding train of optical pulses having a repetition rate that is $1/N^{th}$ of the repetition rate of the pump source, each of the optical delay components providing a different delay amount for each of the corresponding trains of optical pulses that is received by the optical delay component;

N optical multiplexers, each configured to receive one of the N output optical signals from the optical splitter and an output from a corresponding one of the N optical delay components;

N non-linear optical media, each coupled to a corresponding one of the N optical multiplexers to effect phase modulation onto the corresponding train of optical pulses in accordance with an intensity of the corresponding one of the N output optical signals from the optical splitter; and N demultiplexers, each coupled to an output of a corresponding one of the N non-linear optical media to produce N phase modulated optical signals.

2. The optical encoder of claim 1, wherein the corresponding trains of optical pulses are offset in time relative to one another based on the different delay amounts provided by the N optical delay components.

3. The optical encoder of claim 1, wherein the first optical signal is an output of the pump source having a repetition rate that is N times the repetition rate of each train of optical pulses.

4. The optical encoder of claim 1, wherein the pump source is a laser light source.

5. The optical encoder of claim 1, wherein each of the N optical delay components is configured to produce a time delay that is equal to n times $\Delta t$, where $0 \leq n \leq N-1$, and $\Delta t$ is a predetermined time separation interval having an inverse relationship to the repetition rate of the pump source.

6. The optical encoder of claim 1, wherein each of the N phase modulated optical signals has a bandwidth that is reduced relative to a phase modulated optical signal produced using a train of optical pulses having a repetition rate equal to the repetition rate of the pump source.

* * * * *